United States Patent
Cheng et al.

(10) Patent No.: US 10,270,665 B2
(45) Date of Patent: *Apr. 23, 2019

(54) MECHANISM FOR AUTOMATIC NETWORK FORMATION AND MEDIUM ACCESS COORDINATION

(71) Applicant: Leidos, Inc., Reston, VA (US)

(72) Inventors: Ana M. Cheng, Odessa, FL (US); Norbert J. Riviere, Seminole, FL (US)

(73) Assignee: Leidos, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,302

(22) Filed: Jan. 19, 2018

(65) Prior Publication Data
US 2018/0159742 A1    Jun. 7, 2018

Related U.S. Application Data

(63) Continuation of application No. 14/987,273, filed on Jan. 4, 2016, now Pat. No. 9,876,686, which is a
(Continued)

(51) Int. Cl.
*H04L 12/24* (2006.01)
*H04W 84/18* (2009.01)
*H04W 72/04* (2009.01)

(52) U.S. Cl.
CPC ........... *H04L 41/12* (2013.01); *H04W 72/044* (2013.01); *H04W 84/18* (2013.01);
(Continued)

(58) Field of Classification Search
CPC ............................ H04L 41/12; H04W 72/044; H04W 72/0446; H04W 72/046; H04W 72/0486; H04W 84/18
See application file for complete search history.

(56) References Cited

U.S. PATENT DOCUMENTS 5,606,551 A   2/1997  Kartalopoulos
6,640,087 B2  10/2003 Reed et al.
(Continued)

FOREIGN PATENT DOCUMENTS

JP    2004289836 A    10/2004

OTHER PUBLICATIONS

Wei, et al., "Interference-Aware IEEE 802.16 WiMax Mesh Networks", IEEE Vehicular Technology Conference (VTC 2005 Spring), Stockholm, Sweden, May 29-Jun. 1, 2005, pp. 1-5.
(Continued)

*Primary Examiner* — Kevin D Mew
(74) *Attorney, Agent, or Firm* — Banner & Witcoff, Ltd.

(57) ABSTRACT

The invention provides a set of mechanisms by which a wireless mobile mesh node equipped with a directional antenna may self form and self adapt its steady-state communications schedule. A link establishment handshake is carried out over an ongoing subtemplate-based discovery scan. During time not reserved for steady-state communications with previously discovered neighbors, nodes continue to search for an establish links with new neighbors. Initial and subsequent bandwidth allocation protocols may be utilized to allow peer nodes to coordinate communication opportunities between the peer nodes without impacting or having knowledge about reservations for communications with other peers. The link establishment and initial bandwidth allocation protocols may be piggy-backed for readily establishing an initial steady-state schedule with a peer upon link establishment without impact on previous steady state reservations by other nodes or on ongoing link establishment attempts elsewhere.

15 Claims, 62 Drawing Sheets

Related U.S. Application Data continuation of application No. 13/795,725, filed on Mar. 12, 2013, now Pat. No. 9,247,580, which is a continuation of application No. 13/233,612, filed on Sep. 15, 2011, now Pat. No. 8,422,473, which is a continuation of application No. 11/624,452, filed on Jan. 18, 2007, now Pat. No. 8,045,505.

(52) U.S. Cl.
CPC ...... *H04W 72/046* (2013.01); *H04W 72/0446* (2013.01); *H04W 72/0486* (2013.01)

(56) References Cited

U.S. PATENT DOCUMENTS

| | | | |
|---|---|---|---|
| 6,879,574 B2 | 4/2005 | Naghian et al. | |
| 6,904,279 B1 | 6/2005 | Lilja et al. | |
| 6,963,747 B1 | 11/2005 | Elliott | |
| 6,965,568 B1 | 11/2005 | Larsen | |
| 7,224,685 B2 | 5/2007 | Proctor, Jr. | |
| 7,333,458 B2 | 2/2008 | Cain | |
| 7,502,354 B1 | 3/2009 | Maufer | |
| 7,522,540 B1 | 4/2009 | Maufer | |
| 7,586,880 B2 | 9/2009 | Proctor, Jr. | |
| 7,609,648 B2 | 10/2009 | Hoffmann et al. | |
| 7,664,054 B2 | 2/2010 | Adya et al. | |
| 7,719,972 B2 | 5/2010 | Yuan et al. | |
| 8,045,505 B2 | 10/2011 | Cheng et al. | |
| 8,422,473 B2* | 4/2013 | Cheng | H04W 84/18 370/252 |
| 8,945,505 B2* | 2/2015 | Yang | A61K 45/06 423/601 |
| 9,247,580 B2* | 1/2016 | Cheng | H04W 84/18 |
| 2001/0046872 A1* | 11/2001 | Masuda | H04W 56/0005 455/502 |
| 2002/0181427 A1 | 12/2002 | Sparr et al. | |
| 2003/0109285 A1* | 6/2003 | Reed | H04W 88/02 455/562.1 |
| 2003/0235175 A1 | 12/2003 | Naghian et al. | |
| 2004/0047293 A1 | 3/2004 | Arrakoski | |
| 2004/0259597 A1* | 12/2004 | Gothard | H01Q 1/241 455/562.1 |
| 2005/0030968 A1 | 2/2005 | Rich et al. | |
| 2005/0068902 A1 | 3/2005 | Rath | |
| 2005/0153725 A1 | 7/2005 | Naghian et al. | |
| 2005/0201340 A1 | 9/2005 | Wang et al. | |
| 2005/0282494 A1 | 12/2005 | Kossi et al. | |
| 2006/0013178 A1 | 1/2006 | Seguin | |
| 2006/0052125 A1 | 3/2006 | Falck et al. | |
| 2006/0068822 A1 | 3/2006 | Kalhan | |
| 2006/0072535 A1 | 4/2006 | Ito | |
| 2006/0077985 A1 | 4/2006 | Erwin et al. | |
| 2006/0203784 A1* | 9/2006 | Cromer | H04W 48/16 370/338 |
| 2006/0215581 A1* | 9/2006 | Castagnoli | H04L 41/0663 370/254 |
| 2006/0215582 A1* | 9/2006 | Castagnoli | H04L 45/02 370/254 |
| 2006/0215583 A1* | 9/2006 | Castagnoli | H04L 45/02 370/254 |
| 2006/0215624 A1 | 9/2006 | Adya et al. | |
| 2006/0251119 A1 | 11/2006 | Ramesh | |
| 2006/0256737 A1 | 11/2006 | Choi et al. | |
| 2007/0087758 A1* | 4/2007 | Norris | H04W 16/28 455/456.1 |
| 2007/0206528 A1 | 9/2007 | Walton et al. | |
| 2008/0069029 A1 | 3/2008 | Chow | |
| 2008/0151833 A1 | 6/2008 | Natarajan | |
| 2008/0171519 A1* | 7/2008 | Tegreene | H01Q 3/00 455/73 |
| 2008/0198829 A1* | 8/2008 | Cheng | H04W 84/18 370/342 |
| 2010/0039933 A1* | 2/2010 | Taylor | H04L 67/12 370/217 |
| 2011/0287796 A1* | 11/2011 | Jain | H04W 72/046 455/509 |
| 2016/0330571 A1* | 11/2016 | Tegreene | G01D 21/00 |
| 2017/0141952 A1* | 5/2017 | Inohiza | H04L 5/0055 |

OTHER PUBLICATIONS

Zhu, et al., "A Five-Phase Reservation Protocol (FPRP) for Mobile Ad Hoc Networks", 1998, IEEE, pp. 1-10.

Zhu, et al. "A New Protocol for Scheduling TDMA Transmissions i Mobile Ad Hoc Networks", Institute for Systems Research, University of Maryland, pp. 1-11, 2001.

Zhu, et al., "An Evolutionary-TDMA Scheduling Protocol for Mobile Ad Hoc Networks", Institute for Systems Research, University of Maryland, pp. 1-11, 1998.

Benveniste, et al., Performance Evaluation of a Medium Access Control Protocol for IEEE 802.11s Mesh Networks, pp. 1-5, Jan. 1, 2006.

Macker, et al., "Mobile Ad Hock Networking and the IETF", Mobile Computing and Communications Review, vol. 1, No. 1, pp. 9-14, Jan. 1998.

Disclosure Regarding Contracts Prior to Filing Date or Patent Application, Dec. 11, 2007, pp. 1-3.

\* cited by examiner

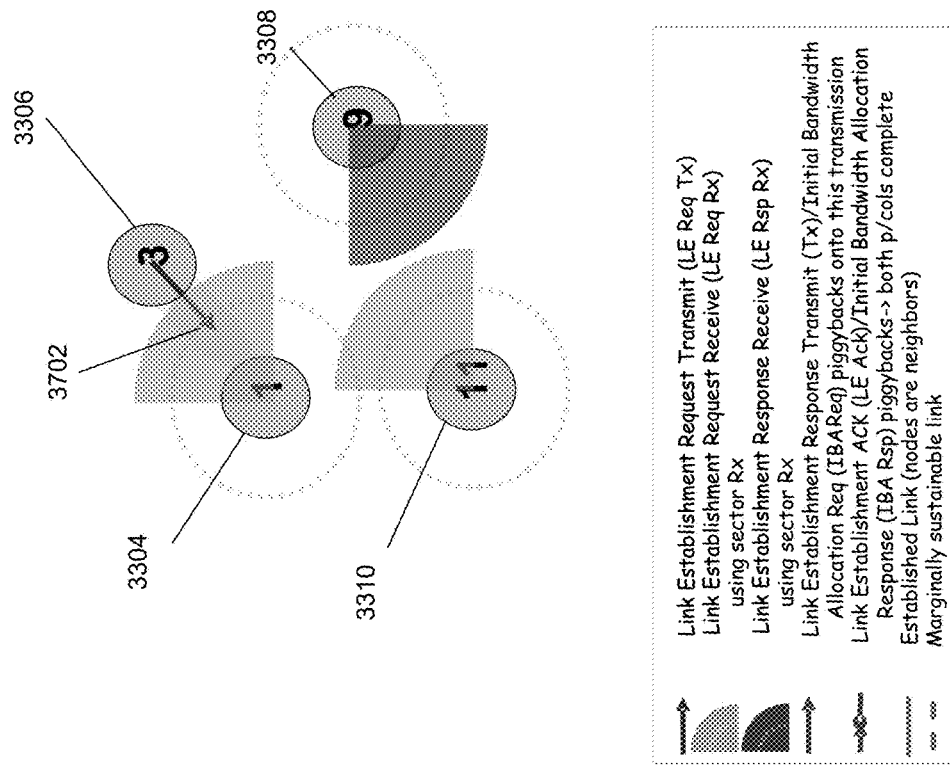
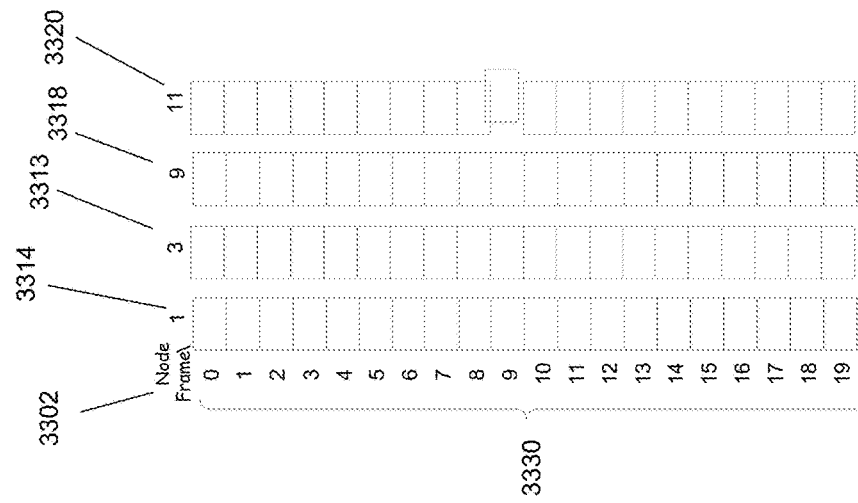
FIG. 37

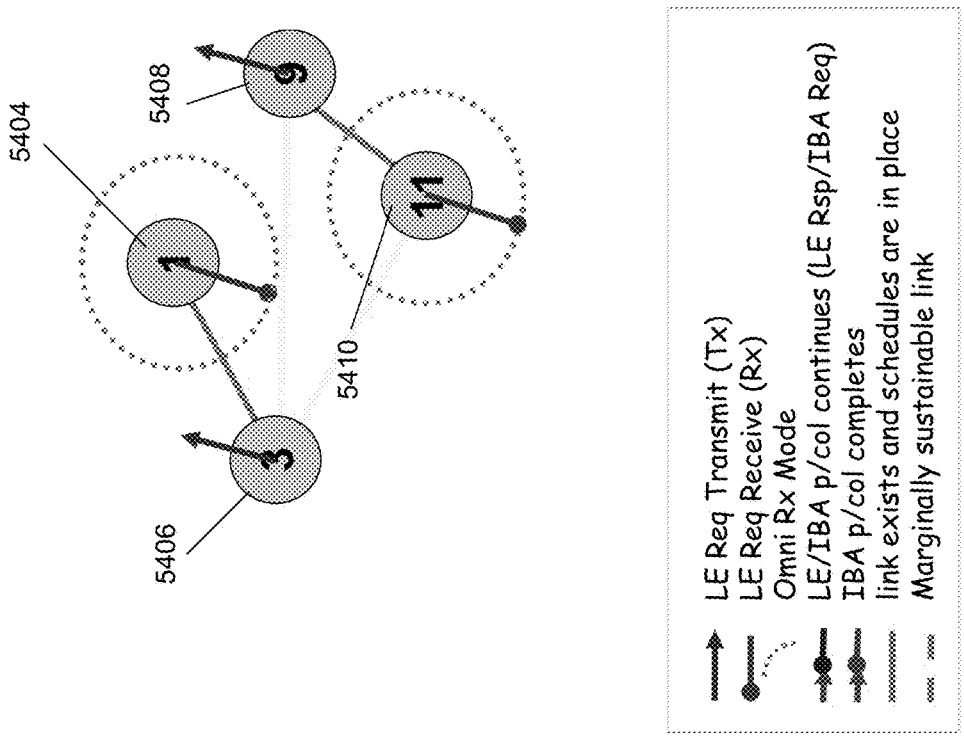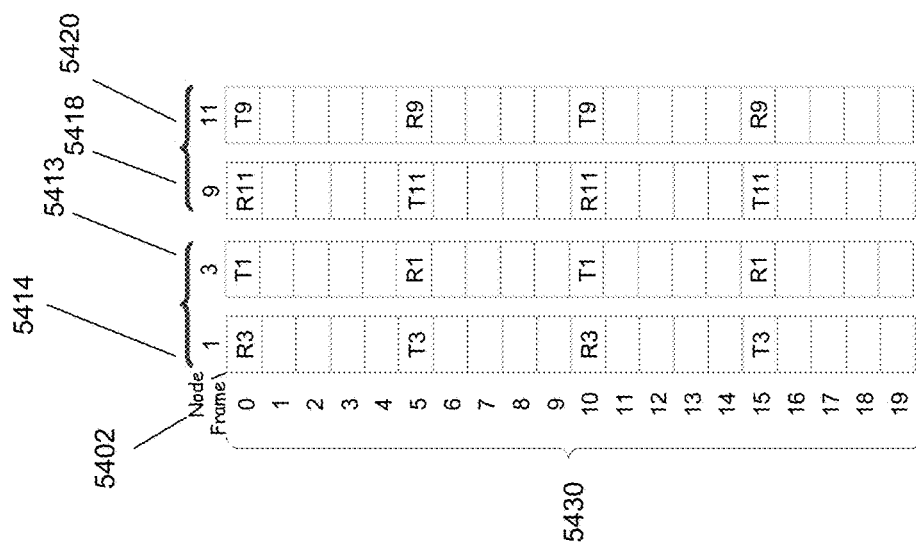
FIG. 60

MECHANISM FOR AUTOMATIC NETWORK FORMATION AND MEDIUM ACCESS COORDINATION

This application is a continuation of U.S. patent application Ser. No. 14/987,273 (U.S. Pat. No. 9,876,686), filed Jan. 4, 2016, titled "Mechanism for Automatic Network Formation and Medium Access Coordination", which is a continuation of U.S. patent application Ser. No. 13/795,725 (U.S. Pat. No. 9,247,580), filed Mar. 12, 2013, titled "Mechanism for Automatic Network Formation and Medium Access Coordination", which is a continuation of U.S. patent application Ser. No. 13/233,612 (U.S. Pat. No. 8,422,473), filed Sep. 15, 2011, titled "Mechanism for Automatic Network Formation and Medium Access Coordination", which is a continuation of U.S. patent application Ser. No. 11/624,452 (U.S. Pat. No. 8,045,505), filed Jan. 18, 2007, titled "Mechanism for Automatic Network Formation and Medium Access Coordination." The above priority applications are incorporated herein by reference.

The U.S. Government has a paid-up license in this invention and the right in limited circumstances to require the patent owner to license others on reasonable terms provided for by the terms of contract number DASG60-02-D-0006 awarded by U.S. Army Space and Missile Defense and contract number N00421-03-D-0007 awarded by Naval Air Warfare Center AD (Pac).

FIELD OF THE INVENTION

The invention relates generally to forming and maintaining a mobile mesh network. More particularly, the invention provides a set of mechanisms by which a directional wireless mobile mesh network may self form and self adapt.

BACKGROUND

The field of mobile mesh networks, often referred to interchangeably with Mobile Adhoc Networks (MANETs) is attracting increasing interest as a field of research because of their suitability to a variety of military and commercial applications. Specifically, mesh networks are important in settings where telecommunication facilities must be installed quickly, as in disaster recovery or in combat, and in areas where a large coverage footprint is desirable.

Conventional wireless (e.g., 802.11, 802.16) and cellular networks are infrastructure-based networks which utilize a hub-and-spoke model (point-to-multipoint topology). In the hub-and-spoke model, all wireless devices must be within broadcast range of a central access point (AP) to communicate. All data traffic must pass through this point as no two host devices communicate directly. In addition, mobility is supported only by a subset of the nodes (end host devices), while infrastructure nodes are often still assumed to be fixed.

For example, FIG. 1 depicts a hub-and-spoke model (102) which may be used by conventional wireless networks using 802.11 and/or 802.16. In an 802.11 environment, an access point (104) may communicate directly with a client station 106. In terms of network formation, to enter a Basic Service Set (BSS), client stations (STA) such as client station (106) must obtain synchronization information from access point (104). This may be done through one of two methods: (1) Passive scanning—where a client station waits to hear a beacon packet which is sent periodically from the access point containing the synchronization information, or (2) Active scanning—where the client station tries to find an access point by transmitting probe requests and waiting for probe responses from the access point. Either method may be chosen according to power consumption/performance trade-offs. An authentication exchange may follow so a client station (106) may prove its knowledge of a password. Finally, the association process may allow client station (106) and access point (104) to become aware of eachother's capabilities. Not until this process is complete is the client station (106) capable of transmitting and receiving data frames.

For coordination of medium access, the 802.11 standard relies on Carrier Sense Multiple Access with Collision Avoidance (CSMA/CA) with a random backoff mechanism. Namely, when a node receives a packet that is to be sent, it checks to be sure the channel is clear (no other node is transmitting at the time). If the channel is clear, then the packet is sent. If the channel is not clear, the node waits for a randomly chosen period of time, and then checks again to see if the channel is clear. This period of time is called the backoff factor, and is counted down by a backoff counter. If the channel is clear when the backoff counter reaches zero, the node re-transmits the packet. If the channel is not clear when the backoff counter reaches zero, the backoff factor is set again, and the process is repeated. Because the probability that two nodes will choose the same back off factor is small, collisions between packets are minimized. However, transmission of a streamy burst of traffic by one node may result in temporarily monopolizing the medium at the cost of all other nodes being held off.

Although conventional wireless networking standards such as 802.11 claim to provide a mesh capability through Independent Basic Service Sets (IBSS), this requires that all nodes be directly connected by virtue of being within omni-directional antenna range from each other, because traffic cannot be forwarded, thus restricting network topology. The 802.11s proposal is aimed at true mesh networks where nodes now route information. However the 802.11s proposal does not discuss nor tackle mesh networks that use highly directional antennas. The use of highly directional antennas improves reach of the network over networks using omni-directional antennas. However, with the narrower beam of highly directional antennas, each node may theoretically communicate with only one other node at a time. The nodes must point their respective antenna toward each other. Thus, nodes must assume a schedule in which communications to their neighbors are organized in a way that maximizes medium sharing but still reduces interference. Specifically, each node in a set of nodes may communicate simultaneously with another node in a mutually exclusive set of nodes. The mechanism for accessing the medium is referred to as Time Division Pairwise Access (TDPA). Issues of scheduling brought on by directivity are described as "the antenna problem" or the "directivity scheduling problem."

In the 802.11s proposal, medium access is strictly contention-based through use of virtual carrier sensing. Contention-based medium access approaches utilize bandwidth and reserved frequency channels merely for sensing the medium and by requiring the reservation of the medium each time a node wants to communicate—bandwidth and frequencies that could otherwise be used for transporting user data. Furthermore, the risk of monopolizing the medium remains when a node that is granted the medium is the source of a large burst of traffic.

The 802.16 standard is another infrastructure-based network that implements at least one Subscriber Station (SS) communicating with a Base Station (BS) via a point-to-multipoint air interface. For example, FIG. 1 depicts a hub-and-spoke model (102) which may be used by a conventional wireless 802.16 network. In FIG. 1, subscriber stations (110, 112, 114, and 116) communicate with a Base Station (BS) (108) via a point-to-multipoint air interface.

The downlink (i.e., the link from the base station (108) to the client stations) operates on a point-to-multipoint basis. In this sense, the medium is truly shared, much as it is in a wired LAN such as Ethernet. Using sectorized antennas, within a given frequency channel and antenna sector, all stations receive the same transmission. The base station (108) is the only transmitter operating in this direction, so it transmits without having to coordinate with other stations, except for the overall time division duplexing that may divide time into uplink and downlink transmission periods. Depending on the class of service provided, subscriber stations (110-116) may be issued continuing rights to transmit or the right to transmit may be granted by the BS (108) after receipt of a request from the user.

In the 802.16 world, WiMax mesh extensions seem to only address fixed mesh networks with the option to have centralized or distributed slot allocation for TDMA-based scheduling. In the former, slot allocation is determined at a single node known as the "Mesh Base Station"—an infrastructure-based approach, while the latter approach requires the distribution of schedules to all neighbors since nodes "compete" for available slots and must find out when "their bid" is unsuccessful.

In directional mobile mesh (Ad-hoc) networks, highly directional antennas are used giving the network longer reach than networks using omni-directional antennas. Each node must "take a turn" to communicate with each of its neighbors, but a set of nodes can communicate simultaneously with a mutually exclusive set of nodes.

A legacy approach to network formation involves use of a lengthy and complex approach for network formation. In the legacy approach, semi-centralized control, and frequent operator intervention were required. Specifically, a single unit was designated as the Network Control Unit (NCU) and this unit was commanded to initiate the network formation process. The NCU conducted a discovery scan by assuming the role of "interrogator" while all other nodes would be placed in the "responder" role. This implied that initially, the NCU conducted a discovery scan by transmitting a sequence of messages initiating what could become multiple instances of a link establishment handshake.

In this 360-degree "Alert" scan, covering n distinct bearings, the interrogator would transmit an "Alert" message in each direction, and all responders would be "listening" (receiving) in the opposite (reciprocal) direction. This way, whether the scan consisted of sequential or a predetermined order of bearings to be visited, there was a 1/n probability that if the interrogator and a responder were within communications range of each other, at some point during the scan, they would "face each other" and the responder would "hear" the interrogator.

The network expanded in this fashion, thus building up the connectivity in phases, where nodes formed concentric rings or levels, each said level executing a different phase of the process. Once no nodes were found by the nodes at the last level, and the nodes at every level estimated every other node had learned of the identity of every node and of the network's connectivity (a process referred to as reaching network closure), every node would compute a global schedule (a schedule for every node) that was a function of the network topology and specific time-late and throughput requirements.

This was based on the premise that because every node had the same input knowledge, by applying the same algorithm, every node computed the same schedule. Furthermore, this process required that nodes transition to using the local portion of this schedule (i.e., the portion of the schedule pertaining to that node and its neighbors) simultaneously and doing so would also incur large delays that were a function of the worst case network topology. All this time, nodes were not permitted to exchange user data. The only exchanges constituted link establishment protocols and network management knowledge propagation.

Once nodes were participating in steady-state communications via this TDPA schedule (i.e., nodes had transitioned to the operational state of the node and were finally permitted to exchange user data), and as nodes would move within or beyond communications range of others, links would form and/or drop. In addition, a set of acquisition functions were required in order to bring additional nodes into the network, or to re-acquire recently lost links. Most of these functions required operator intervention and the resulting changes in connectivity would imply the need for recalculation of the global schedule, which in turn implied another lengthy delay as knowledge about these changes again had to be propagated to every node in the network prior to the recalculation of a new schedule and eventual transition to it.

The activities taking place in this lengthy process are illustrated in FIG. 2. Image (202) of FIG. 2 shows a central node (204) searching for peers as an interrogator. Links are established with each discovered node as shown in image (206). Responding nodes as illustrated in image (208) become interrogators. Previously established links are maintained on a temporary maintenance schedule. The next levels of links are then established as shown in image (210). In image (212), a new level of interrogators may begin searching for peers. A network forms in concentric rings or levels using temporary schedules until no other peer can be found at the last level encountered. As nodes learn about each other and determine that unconnected peers are within range, cross links are established as shown in image (214). Information from every node (identity, position, connectivity, etc.) is propagated until every node determines that it knows about every other node. As shown in image (216) every network node calculates an identical global TDPA schedule and synchronizes its transition to the local portion of that schedule. Once nodes begin using their newly computed schedule, lost and newly acquired links trigger a lengthy network-wide propagation of the event and the recalculation of any transition to a new schedule as shown in image (218).

This complex and long process must take place merely for the purpose of forming the network and establishing a schedule, at which time, nodes are finally permitted to begin exchanging user data. Furthermore, any later changes in network connectivity or link attributes require yet again, the lengthy network-wide propagation of these changes and subsequent recalculation of, and transition to, a new global schedule.

Thus, it would be advancement in the art to provide mechanisms for self-forming, self-maintaining a directional mobile mesh network, where medium access coordination and adaptation is such that it impacts a minimal number of nodes.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

The invention provides a self-forming, self-maintaining directional mobile adhoc network. In an aspect of the invention, a link establishment handshake is carried out over an ongoing subtemplate-based discovery scan. In an embodiment, during time not reserved for steady-state communications with previously discovered neighbors, nodes continue to search for and establish links with new neighbors thus increasing the number of possible paths resulting in increased aggregate bandwidth.

In an aspect of the invention, link establishment (LE) and the initial bandwidth allocation (IBA) protocols may be piggy-backed for readily establishing an initial steady-state schedule with a peer upon link establishment.

In another aspect of the invention, a fixed length schedule for steady-state communications representing each node's pool of available and currently reserved bandwidth is continually used for peer discovery and link establishment.

In yet another aspect of the invention, coordination of these schedules may take place between a node and a peer as they discover each other, simultaneously and independently from other nodes also coordinating schedules between them without affecting communications with any previously acquired neighbors, without requiring the distribution of knowledge about any other nodes with which links are being created, without requiring the time-consuming calculation of a schedule based on having achieved identical global knowledge at every node, and without the incurred additional delay for transitioning to a newly calculated schedule. Global network management knowledge (knowledge of network connectivity and link attributes) may still be propagated but is no longer essential for the purpose of network formation/maintenance or schedule calculation.

In a further aspect of the invention, initial and subsequent bandwidth allocation protocols may be utilized to allow peer nodes to coordinate communication opportunities between the peer nodes without impacting or having knowledge about reservations for communications with other peers or by any node further removed.

BRIEF DESCRIPTION OF THE DRAWINGS

FIG. 37 illustrates receipt of a transmission from a node in accordance with an aspect of the invention.

FIGS. 59-60 illustrate lost link processing among nodes in accordance with an aspect of the invention.

DESCRIPTION

Network Formation & Steady-State Schedule Coordination

Figure 1:
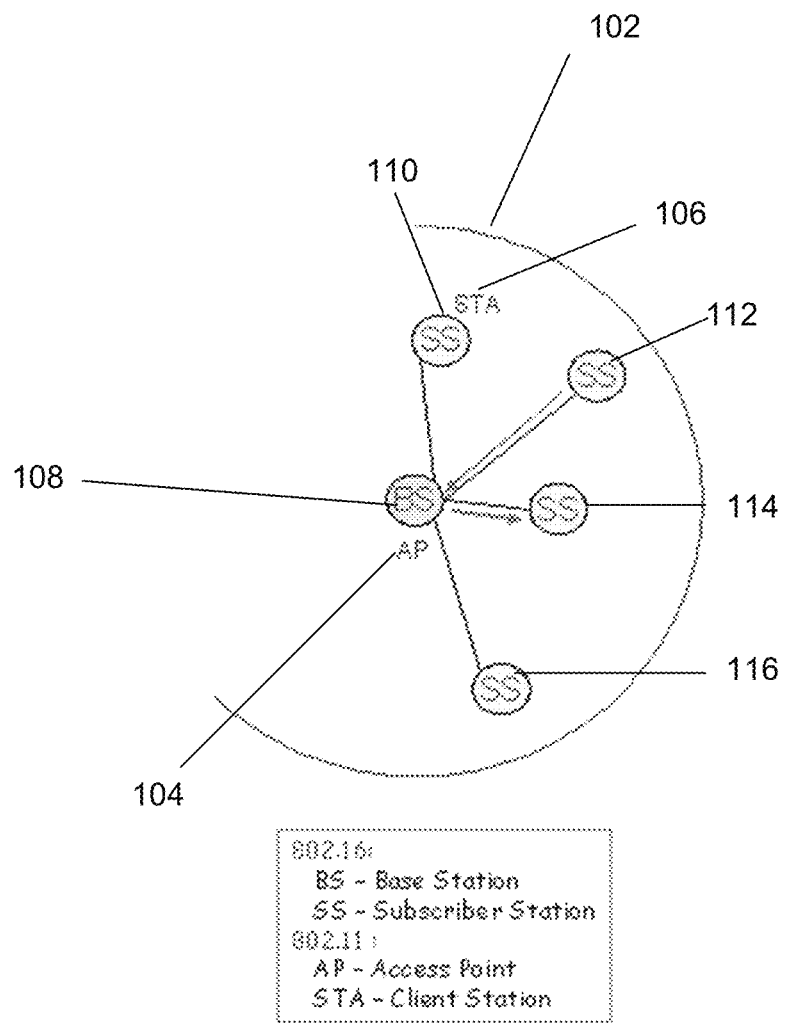
FIG. 1 illustrates prior art conventional wireless networks.
Figure 2:
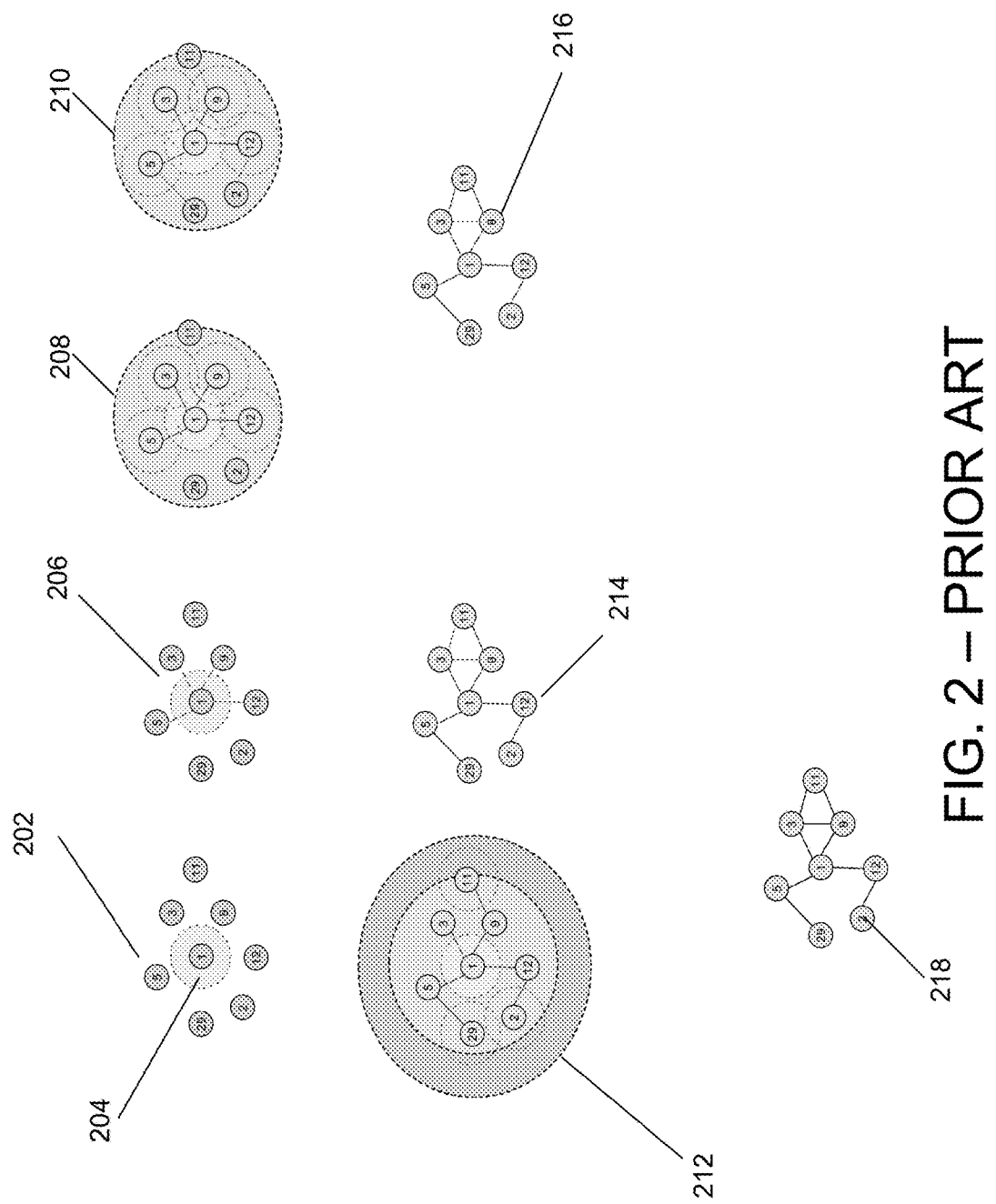
FIG. 2 represents a prior art network formation process.

In an aspect of the invention, rather than having a central node designated as the initiator of network formation, every node may be an equal participant in the process and it merely needs to be powered "on" and configured for the process to automatically begin. For link establishment purposes, nodes may randomly assume the interrogator or responder role, and as two nodes discover each other, they also coordinate their steady-state communications per a configured initial bandwidth allocation. The allocation may correspond to the initial reservation of communication opportunities between the two nodes in each direction of the link and should correspond to at least the required link maintenance rate (how often a node must receive from a peer in order to track its position to maintain communications).

Once a short handshake completes, the two nodes become neighbors and may immediately transition to use their mutually coordinated steady-state communications schedule without dependency or impact on schedules previously established with any other peers. Once on steady-state communications, two nodes may begin to exchange network traffic. In an aspect of the invention, an initial bandwidth allocation protocol may be piggy-backed onto the link establishment exchange to quickly begin steady-state communications.

During time not reserved for steady-state communications with its neighbors, every node continues to attempt instances of the link establishment handshake as it continues to search for additional potential neighbors. This takes place, in the greatest extent possible without preemption of previously reserved steady-state communications. In addition, nodes may periodically monitor traffic loads over each of their links and may update bandwidth allocations accordingly using a similar handshake as was used for coordinating the initial allocations. These bandwidth allocation updates may be carried out over the already coordinated steady-state communication opportunities between the two nodes and may result in increasing or decreasing the number of communication opportunities within a steady-state schedule cycle between the two nodes involved.

As a node is powered "on" and becomes operational, the node may participate in a discovery scan. This corresponds to assuming a semi-randomized pattern of communications. Specifically, on each frame of day, the operation to perform (transmission or reception) may be selected by a node randomly, while the direction in which to point is a function of the frame of day and the selected operation, where frame of day may be defined as "time of day" in unit of frames. Specifically, each second of a day is further subdivided into a number of frames, say F, thus there are 24 hours*60 (minutes/hour)*60 (seconds/minute)*F (frames/second)=86400*F frames in one day. Namely, if on frame f a node randomly chooses to transmit, it will do so in the direction given by bearing b(f), whereas, a node that is to receive on frame f would do so on its omni-directional antenna for the first portion of the link establishment handshake, but for the latter portion, it would point in the direction given by bearing b(f)+180 degrees (adjusted perhaps from knowledge of the node's own and its peer's positions). During the scan, the pointing direction covers 360 degrees in equally spaced bearings in a pre-determined order, which may or may not be sequential. The number of bearings b to cover in a 360-degree scan and by that token, the width of the increment, may be a configurable resource. The order in which these bearings are visited (sequential or not) may be arbitrary but known uniformly by every node.

Initially, a node may schedule three contiguous sets of frames (or subtemplates) of s frames each, where s may be at least the amount of time it takes for a node to "turn around" a received message, i.e., the sum of any inbound delays during reception, and outbound delays during transmission. The size of the subtemplates s (in units of frames) may be configurable. In "transmit" frames of the first subtemplate, the node may transmit the first message in the link establishment handshake. Throughout the handshake, in each transmission requiring the reception of a subsequent message, the node identifies the "receive" frames within the next subtemplate during which the node will be "listening" so that the peer node that receives this message may select when to respond. Additionally, in every message, nodes may exchange their positions so that pointing angles may be computed for pointing the directional antenna toward a peer.

When a subtemplate boundary is reached, a new subtemplate may be randomly scheduled. The pattern in one subtemplate may be modified according to received messages in the previous subtemplate aiming at reducing the degree to which a node's steady-state communications are preempted. As the handshake progresses, nodes may continue to coordinate the times in which a node will be listening for the next message in the handshake and in the direction of the peer. By exchanging position information with each message, the link establishment handshake may be a simple three-way handshake, since by the second message, each node knows where its peer is located and may thus compute where to point to transmit and listen.

The subtemplate may allow for a node to "look ahead" s frames in advance and determine randomly scheduled reception opportunities to offer a peer. If none are available due to all being previously reserved for steady-state communications, as a last recourse, the node overwrites a previously reserved steady-state communication opportunity with reception operations for the purpose of completing the link establishment handshake, thus temporarily preempting some steady-state communication opportunities, but not for an extended period of time, as this would affect only a single subtemplate which may be much shorter than the minimum maintenance cycle length. Similarly, when a node is offered a set of "receive" frames by its peer and all of them coincide with frames the node has already reserved for steady-state communications with other peers, the nodes may preempt. Scheduling of selected frames among those offered by a peer may be done such that a node has sufficient time to process the received frame and to build the message to be transmitted as a result.

As any two nodes establish a link, they may also coordinate the schedule between them. Upon completion of the link establishment handshake, the nodes may immediately transition to using their mutually reserved communication opportunities for steady-state communications and begin exchanging data. During time not yet reserved for steady-state communications, nodes continue to schedule the random scan pattern described for link establishment or complete link establishment hand-shakes in progress.

By "piggy backing" the link establishment (LE) and the initial bandwidth allocation (IBA) handshakes, steady-state communications schedules may be coordinated on a link by link basis by two peer nodes as the link is being established, without the need to propagate global knowledge and the need to use multiple temporary schedules used for maintaining a link until a schedule for steady-state communications can be globally computed. Additionally, rather than building a steady-state (TDPA) schedule that is of minimum length, in an aspect of the invention, a maximum fixed-length steady-state schedule initially representing a pool full of idle frames at every node may be used.

The following illustrative example is being used to show various aspects of the invention and is not meant to be limiting to the scope of the invention.

Figure 3:
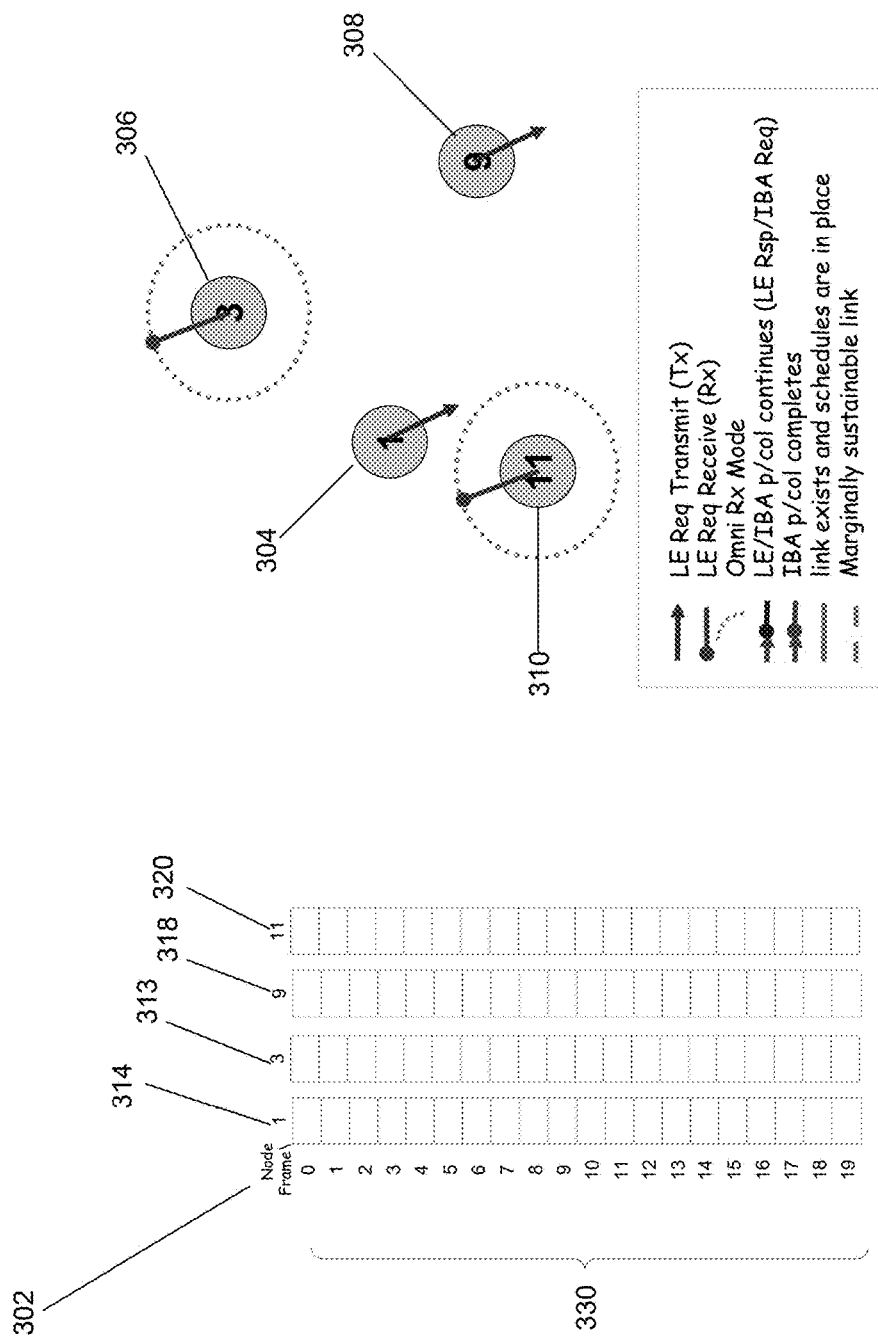
FIG. 3 illustrates exemplary nodes prior to network formation and steady-state schedule coordination in accordance with an aspect of the invention.

FIG. 3 illustrates nodes prior to network formation and steady-state schedule coordination in accordance with an aspect of the invention. In FIG. 3, a scheduled cycle (302) is depicted for node 1 (304), node 3 (306), node 9 (308), and node 11 (310). The schedule cycle (302) for the illustrated nodes begins with a pool (an array) of L idle frames (330), where L is a configurable parameter that may accommodate the worst case anticipated network topology. L may be based on empirical data, perhaps even starting with a schedule that is in the order of the legacy network's maximum schedule length. In an embodiment, L may be the length of one steady-state schedule cycle. As a link is established between two nodes, the nodes coordinate the frames within that array during which each node may transmit to the peer thus quickly and easily allocating the initial bandwidth between them. The initial bandwidth allocation (IBA) handshake may be conducted such that communications over each direction of the link are agreed upon without risk of conflicting reservations between a node and its multiple neighbors.

Each node's steady-state communications schedule may be viewed as an array of frames for communication with each neighbor, which initially, contains only idle frames since a node has yet to form links. The length L of this schedule may be configurable and fixed for the entire session a system is operational, as is the maintenance cycle length m (i.e., maximum time in frames required between communications in each direction over a link in order to properly track and point to a neighbor as it moves, i.e., maintain the link). L may also be validated with respect to b (the number of bearings covered in the discovery scan) so that L is not a factor or a multiple of b (i.e., b mod L< >0 and L mod b< >0). This may prevent the possibility of neglecting a bearing during the discovery scan that takes place when a node is conducting steady-state communications with at least one neighbor. Thus, L could be validated as Repeat If $b \bmod L=0$ or $L \bmod b=0$, then $L=L+1$ (or $b=b+1$, one or the other)

until ($b \bmod L< >0$ and $L \bmod b< >0$), where, b is the configured number of bearings to be visited during the discovery scan, and L is the configured steady-state schedule length.

Once L is validated with respect to b, an initially assumed load d may be used which corresponds to the minimum number of equally spaced transmissions that may satisfy the maintenance requirement for a particular direction of the link in a schedule cycle of the configured length L. During the initial bandwidth allocation protocol, each node may be assigned a number of frames during which it is to transmit to its neighbor. As such, during link establishment, this number of frames corresponds to the configured and validated initial load d.

In order to satisfy the maintenance requirement m, it may be seen that within an L-frame schedule cycle, a node may transmit to each of its neighbors at least ceiling (L/m) times. Ideally, these transmissions may be staggered in time so that they occur steadily at most every m frames. Namely, the scheduling of multiple transmissions may be such that in searching for the next idle frame to assign each transmission, the starting point is at most m frames away from a previously scheduled frame, wherein the offset may be given by ceiling (L/d). The same applies to receptions to accommodate the reverse direction of the link. Correspondingly, the configured initial (network-wide) link load d may be validated such that $d >= \mathrm{ceiling}(L/m)$ where, d is the number of like operations with a specific neighbor needed within a cycle (i.e., there will be d transmissions to the neighbor and d receptions from the neighbor). If d were configured such that $d < \mathrm{ceiling}(L/m)$, then it should be overwritten as $d = \mathrm{ceiling}(L/m)$ so as to ensure the link maintenance cycle requirement is satisfied, specifically, if $d < \mathrm{ceiling}(L/m)$ then $d = \mathrm{ceiling}(L/m)$.

The corresponding offset value as mentioned above is determined as $o=\text{ceiling}(L/d)$ where, o is the offset between like operations to a specific neighbor, (i.e., like operations may be scheduled every o frames).

Furthermore, as a measure toward improving the latency of protocols, receptions may be scheduled such that they are evenly interleaved with the transmissions, and thus the starting offset for searching for idle frames when scheduling receptions is given by $Rx\_start\_o=\text{ceiling}(o/2)$, where Rx_start_o is the approximate separation between a transmission and a subsequent reception to the same neighbor.

This may allow a two-way handshake between two nodes to complete within one maintenance cycle from the time of the first sent message, where in effect, there are d such maintenance cycles of length o within a single steady-state communications (TDPA) schedule cycle. The starting offset may exceed whatever time is required to "turn a message around" in a protocol, and thus by definition, the maintenance cycle length should, at a minimum, be twice that "turn around" time. By offsetting the receptions, time for a two-way handshake to complete is reduced which may help latency of any multi-message protocol.

In an aspect of the invention, an "LE interrogator" may be defined as the node which sends the first message in the handshake and the "LE responder" as the node that receives and hears it. Because nodes may potentially hear multiple other nodes during their scan, a node that initially hears the first message in the link establishment protocol attempt, sets up to complete that protocol attempt with that particular peer before entering the handshake with any other (i.e., nodes ignore any other LE interrogators while a handshake in the role of responder is in progress). Because in doing this, a single LE interrogator may have multiple nodes responding to it, while at the same time the LE interrogator may be itself a responder to a received LE interrogation, orderly coordination of bandwidth allocations may be achieved if the LE responder initiates the IBA protocol. This may allow the LE Interrogator to be the single point making the final bandwidth allocation. Specifically the LE responder is the IBA interrogator. In the IBA handshake, a node may present its peer with the list of frames that are currently unreserved (idle) within its steady-state schedule. The peer looks at its own steady-state schedule to identify frames that are commonly idle and selects among those the requested number of frames for communicating in each direction of the link. This number represents the initial bandwidth allocations.

Returning to FIG. 3, upon being powered "on," each of node's (304-308) steady-state schedules begins as a pool of L idle frames (330). In the example of FIG. 3, twenty frames have been selected as the fixed length schedule (302) but those skilled in the art will realize that L may be a configurable parameter and may be configured to any number of frames. In addition, an initial bandwidth allocation may be configured which may determine the number of opportunities a node may attempt to communicate with other nodes during a cycle of the steady-state schedule. In this example, the initial bandwidth allocation may be set to two attempts per schedule cycle.

As shown in FIG. 3, during a discovery scan, nodes 1, 3, 9, and 11 (304-308) search for peers using a randomized subtemplate approach in which communications operations (transmissions—Tx vs. receptions—Rx) are randomized, while Tx bearings are a function of frame of day (Rx may take place on the omni-directional mode as illustrated in FIG. 3). In particular, FIG. 3 shows nodes 1 (304) and 9 (308) transmitting a link establishment request, whereas nodes 3 (306) and 11 (310) are waiting to receive a link establishment request.

As also shown in FIG. 3, transmission of data occurs when the transmit and receive arrows for the various nodes are pointed at or towards each other representing that the highly directional antennas for both nodes have been pointed in each other's direction. As illustrated in FIG. 3, the various nodes are transmitting with their respective directional antennas in different directions at different times so as to make contact with other peers.

Figure 4:
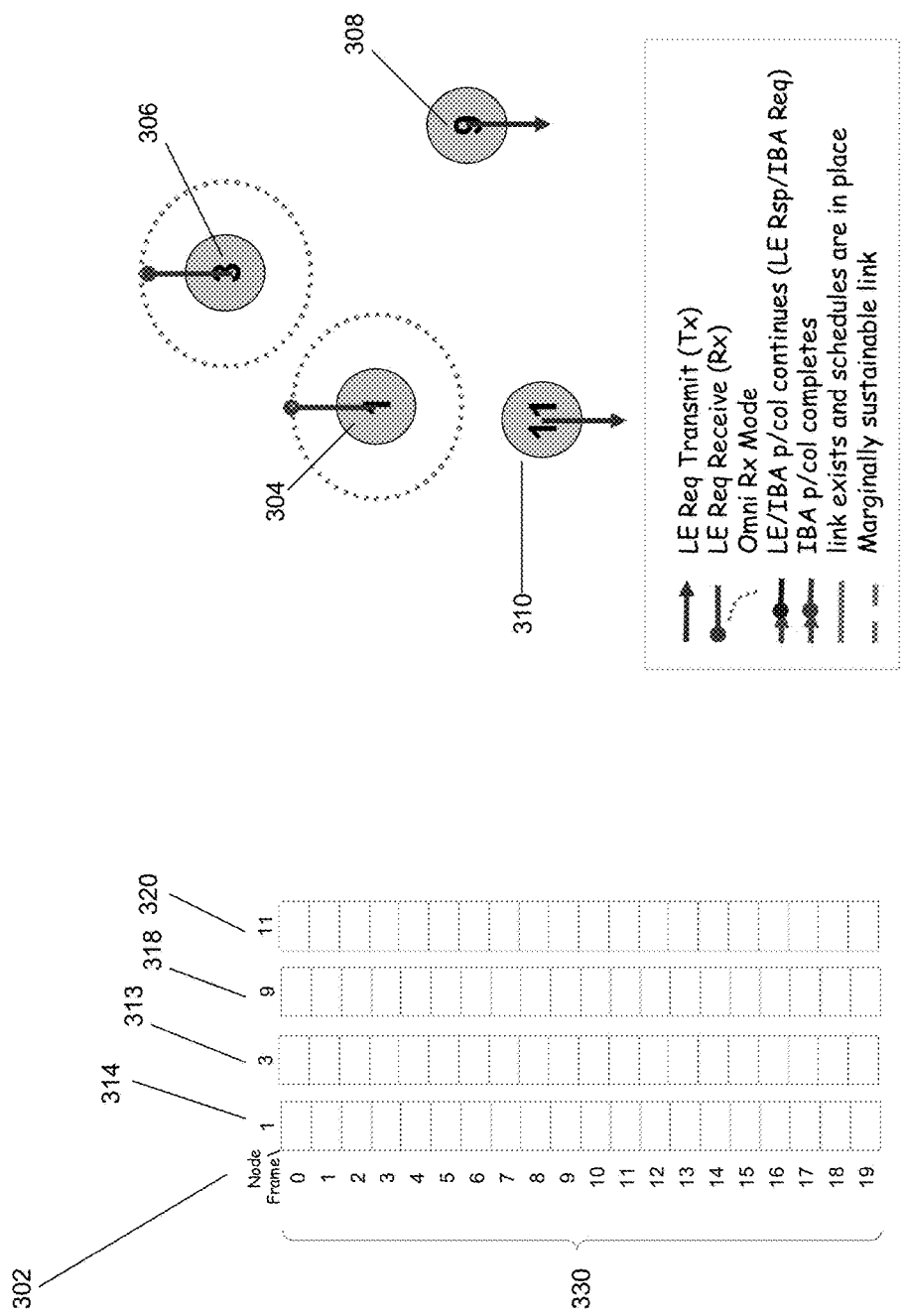
FIG. 4 illustrates another diagram depicting exemplary nodes prior to network formation and steady-state schedule coordination in accordance with an aspect of the invention.

FIG. 4 illustrates nodes prior to network formation and steady-state schedule coordination in accordance with an aspect of the invention. In FIG. 4, nodes 1, 3, 9, and 11 (304-308) have yet to find any peers to communicate with but they continue to search via the randomized discovery scan. However, nodes 9 (308) and 11 (310) are now transmitting a link establishment request, whereas nodes 1 (304) and 3 (306) are waiting to receive a link establishment request.

Figure 5:
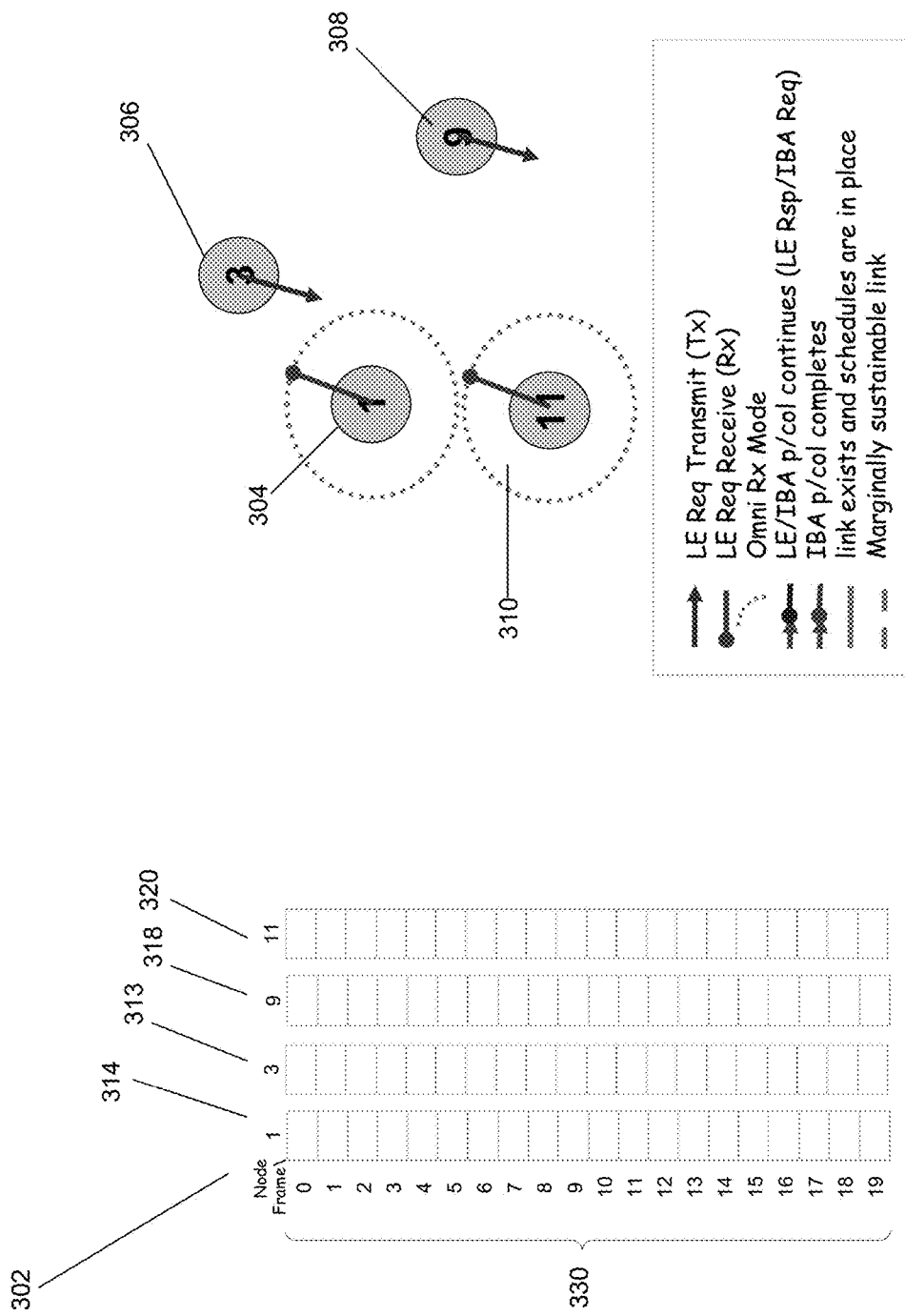
FIG. 5 illustrates exemplary nodes participating in a randomized discovery scan in accordance with an aspect of the invention.

FIG. 5 illustrates nodes 1, 3, 9, and 11 (304-308) participating in a randomized discovery scan in accordance with an aspect of the invention. As shown in FIG. 5 nodes 1, 3, 9, and 11 (304-308) may still be looking for peers to establish communications with via the randomized discovery scan. In FIG. 5, nodes 1 (304) and 11 (310) are waiting and listening for a link establishment request, whereas nodes 3 (306) and 9 (308) are transmitting a link establishment request. Furthermore, nodes 1, 3, 9, and 11 (304-308) as shown in FIGS. 4-5 are illustrated with their respective directional antennas transmitting in different directions at different times so as to make contact with other peers. Those skilled in the art will realize that the though the patterns in FIGS. 4-5 have been shown sequential in a clockwise manner, antenna direction for each of the nodes may be randomized (non-sequential) in different embodiments.

Figure 6:
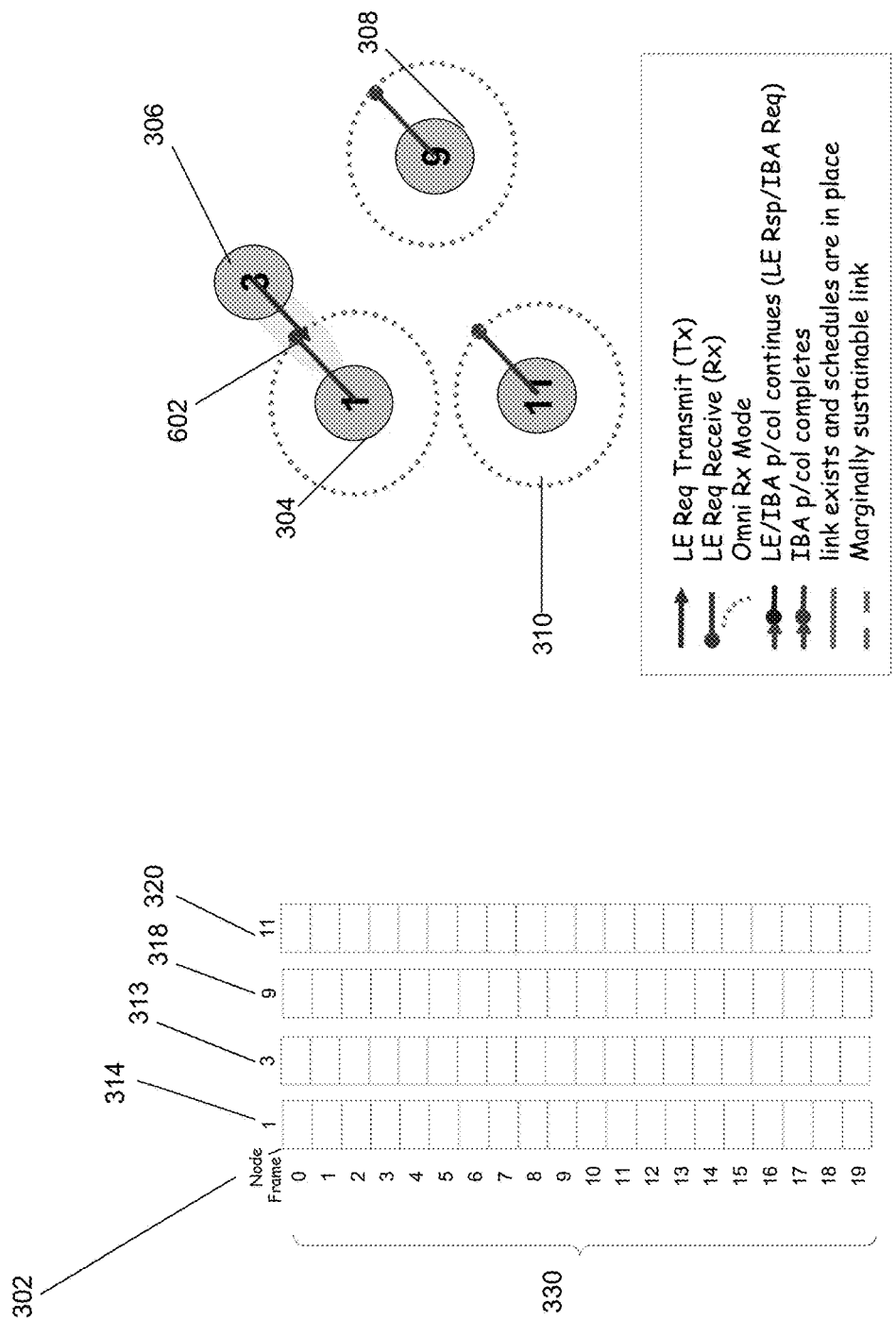
FIG. 6 illustrates a method of receiving a link establishment request from a node in accordance with an aspect of the invention.

FIG. 6 illustrates receipt of a transmission (602) from node 3 (306) to node 1 (304) in accordance with an aspect of the invention. In FIG. 6, node 1 (304) hears the link establishment request from node 3 (306). For this instance of the handshake, node 3 (306) is the link establishment interrogator and node 1 (304) is the link establishment responder.

Figure 7:
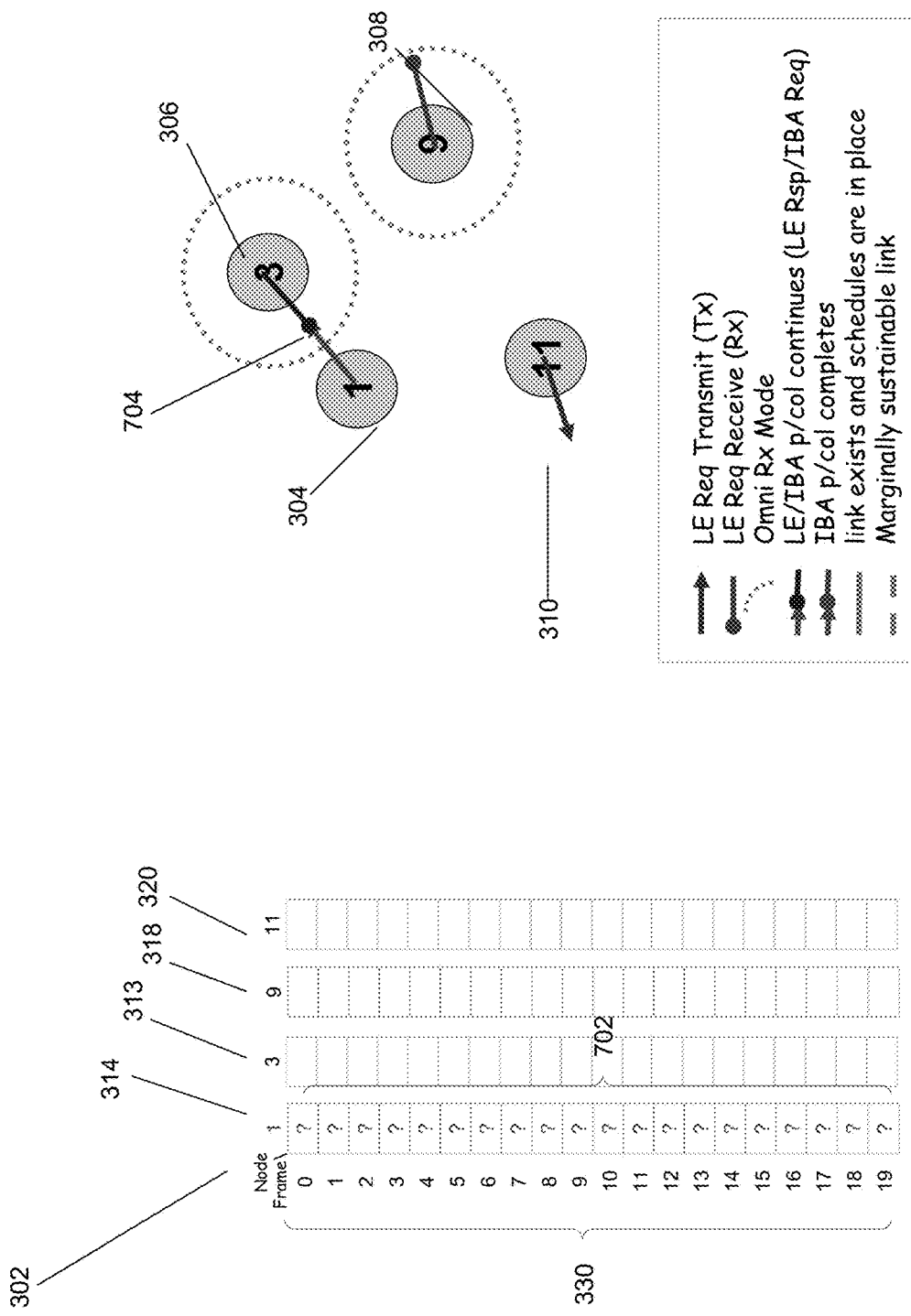
FIG. 7 illustrates a method of communicating nodes idle frames in accordance with an aspect of the invention.

In FIG. 7, the link establishment responder node 1 (304) may also be the initial bandwidth allocation interrogator. In an aspect of the invention, node 1 (304) may offer all of its idle frames 0-19 (702) to link establishment interrogator (IBA responder) node 3 (306) in the initial bandwidth allocation request (IBA Req.). The idle frames in FIG. 7 (702) may be represented by the question marks. In FIG. 7, two messages 704 may be communicated between node 1 (304) and node 3 (306). The first message may be a link establishment response and the second message may be an initial bandwidth allocation request.

Figure 8:
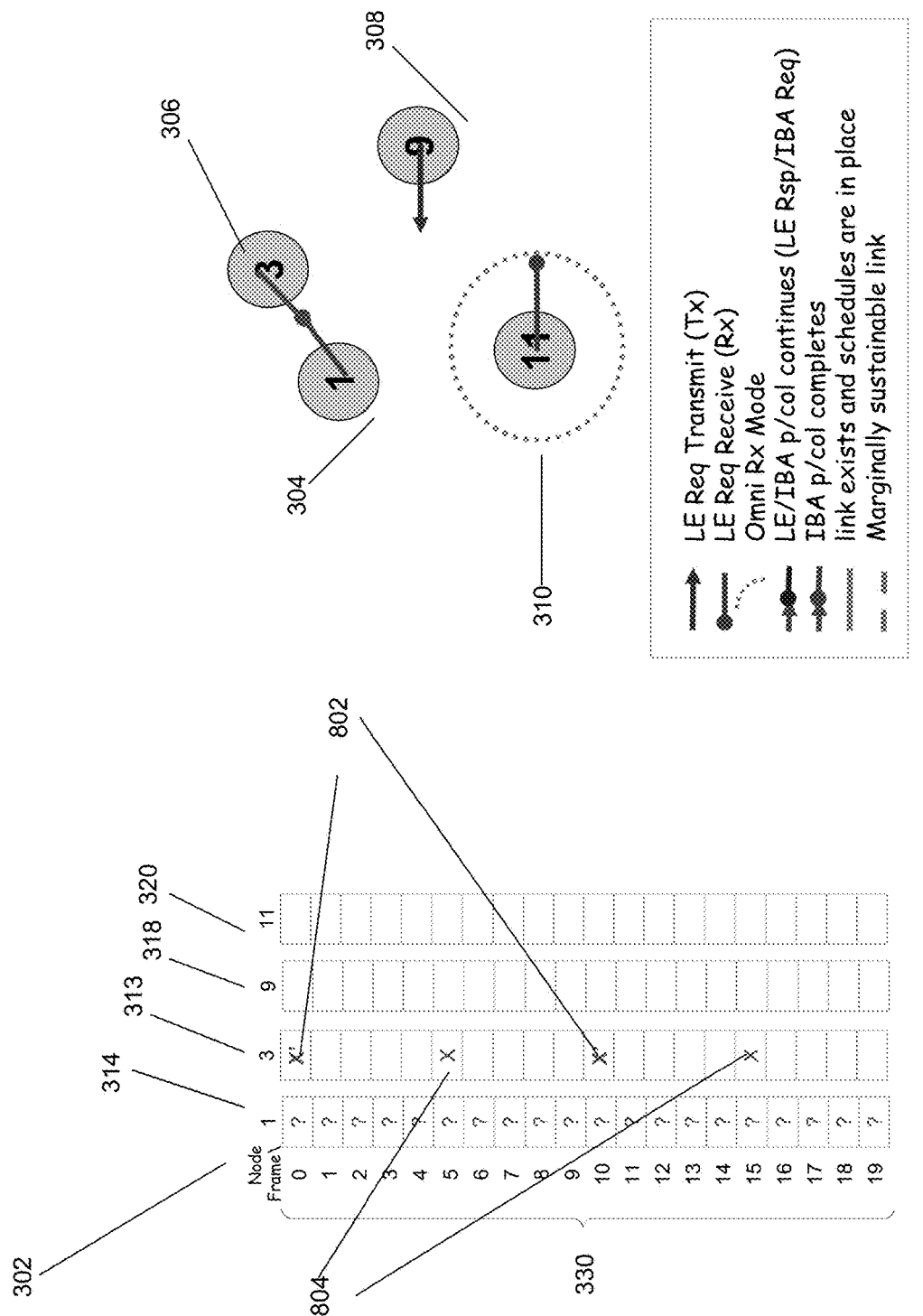
FIG. 8 illustrates selection of common idle frames between two nodes in accordance with an aspect of the invention.

In FIG. 8, the LE interrogator (IBA responder) node 3 (306) may select a few common idle frames between its schedule and node 1's schedule to allocate initial bandwidth over both directions of the link with node 1 (304). The selection may be included in the IBA Rsp. For example, node 3 (306) may select frames 0 and 10 for transmission to Node 1 (304) represented by X' (802) and frames 5 and 15 for receiving information represented by X (804) from node 1 (304). Moreover, node 3 (306) may strive to stagger like operations in order to satisfy maintenance cycle requirements. In an embodiment, the idle frames may be selected to level the transmission load and avoid jitter and/or latency problems.

Figure 9:
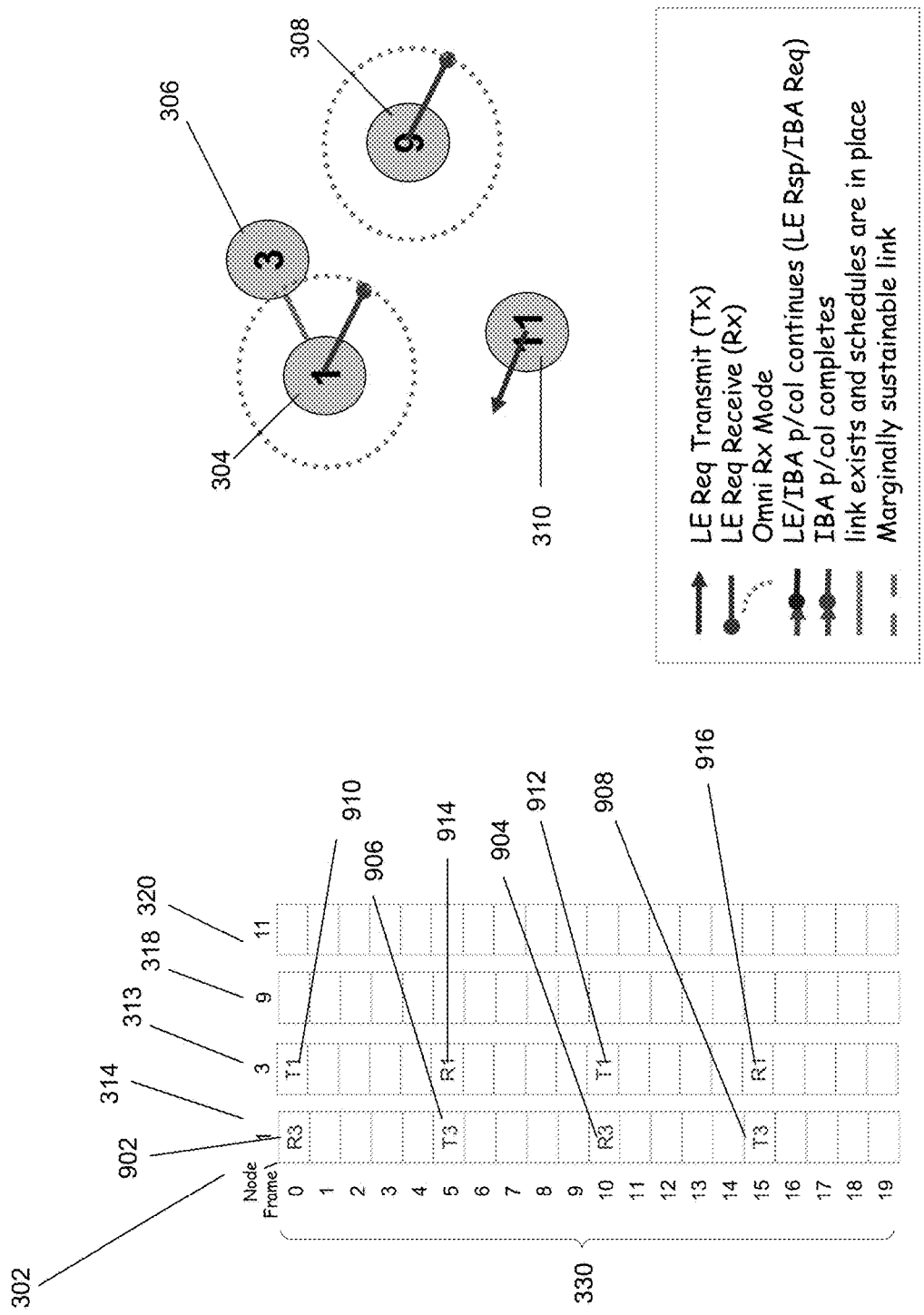
FIG. 9 illustrates a method of updating steady-state schedules in accordance with an aspect of the invention.

In FIG. 9, upon successful completion of the LE and IBA handshakes, both nodes may update their steady-state schedule accordingly. During time not reserved for steady-state communications with neighbors, nodes may continue to search for peers. For example, node 1 (304) has reserved time frame 0 and 10 (902 and 904) for receiving information from node 3 (306). In addition, node 1 (304) has reserved time frame 5 and 15 (906 and 908) for transmitting information to node 3 (306). Also, as shown in FIG. 9 node 3 (306) has reserved time frame 0 and 10 (910 and 912) for transmitting information to node 1 (304) and time frames 5 and 15 (914 and 916) for receiving information from node 1 (304). Furthermore, in FIG. 9 during the time not reserved for steady-state communications node 11 (310) may be transmitting or listening for a link establishment request.

Figure 10:
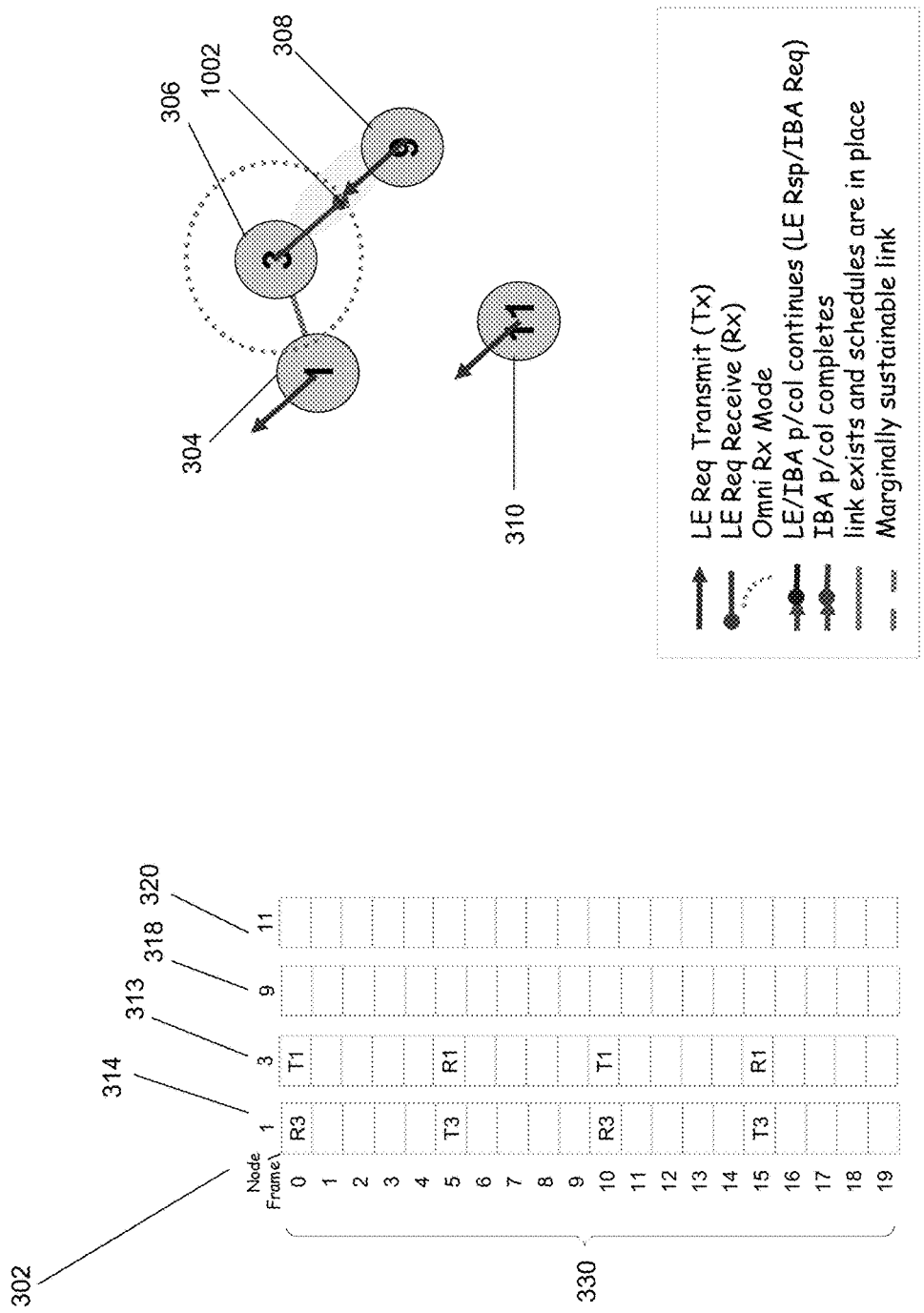
FIG. 10 illustrates a method of receiving a link establishment transmission request in accordance with an aspect of the invention.

The steady-state schedules of nodes 1 (304) and node 3 (306) have been updated. In FIG. 10, node 3 (306) hears the link establishment request transmitted (1002) from node 9 (308) in accordance with an aspect of the invention. For this instance of the handshake, node 9 (308) may be a LE interrogator and node 3 (306) a LE responder. During the handshake between nodes 9 (308) and 3 (306) communications may take place between nodes 1 (304) and 3 (306) without any effect on the link establishment and initial bandwidth allocation between nodes 9 and 3.

Figure 11:
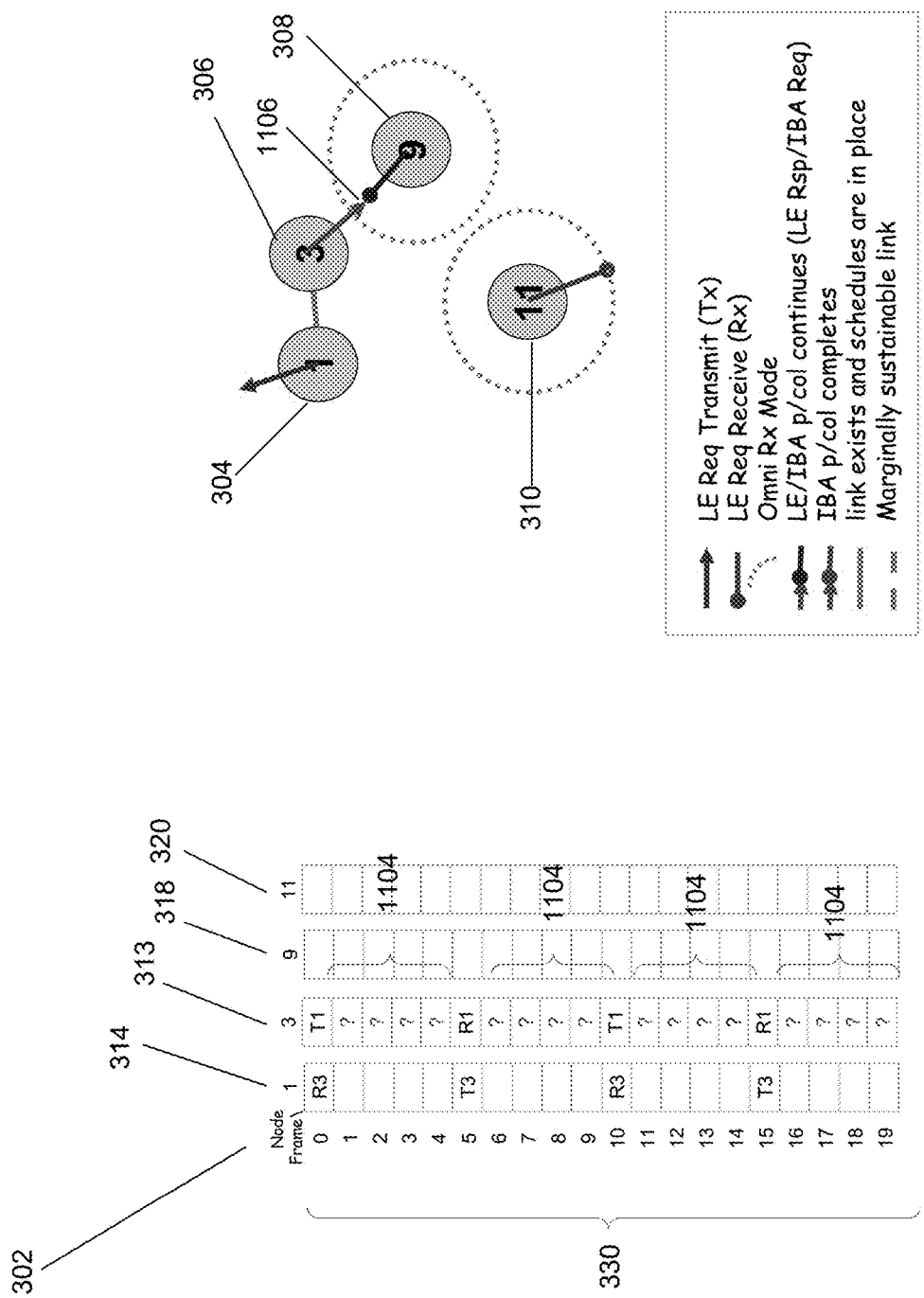
FIG. 11 illustrates a method of piggybacking two messages between nodes in accordance with an aspect of the invention.

FIG. 11 illustrates that the LE responder node 3 (306) may also be the IBA interrogator. Node 3 (306) may offer all of its idle frames 1104 to its LE interrogator (IBA responder) node 9 (308) in the IBA Req. The idle frames in FIG. 11 may be represented by the question marks. In FIG. 11, two messages 1106 may be communicated between node 3 (306) and node 9 (308) in accordance with an aspect of the invention. The first message may be a link establishment response and the second message may be an initial bandwidth allocation request.

Figure 12:
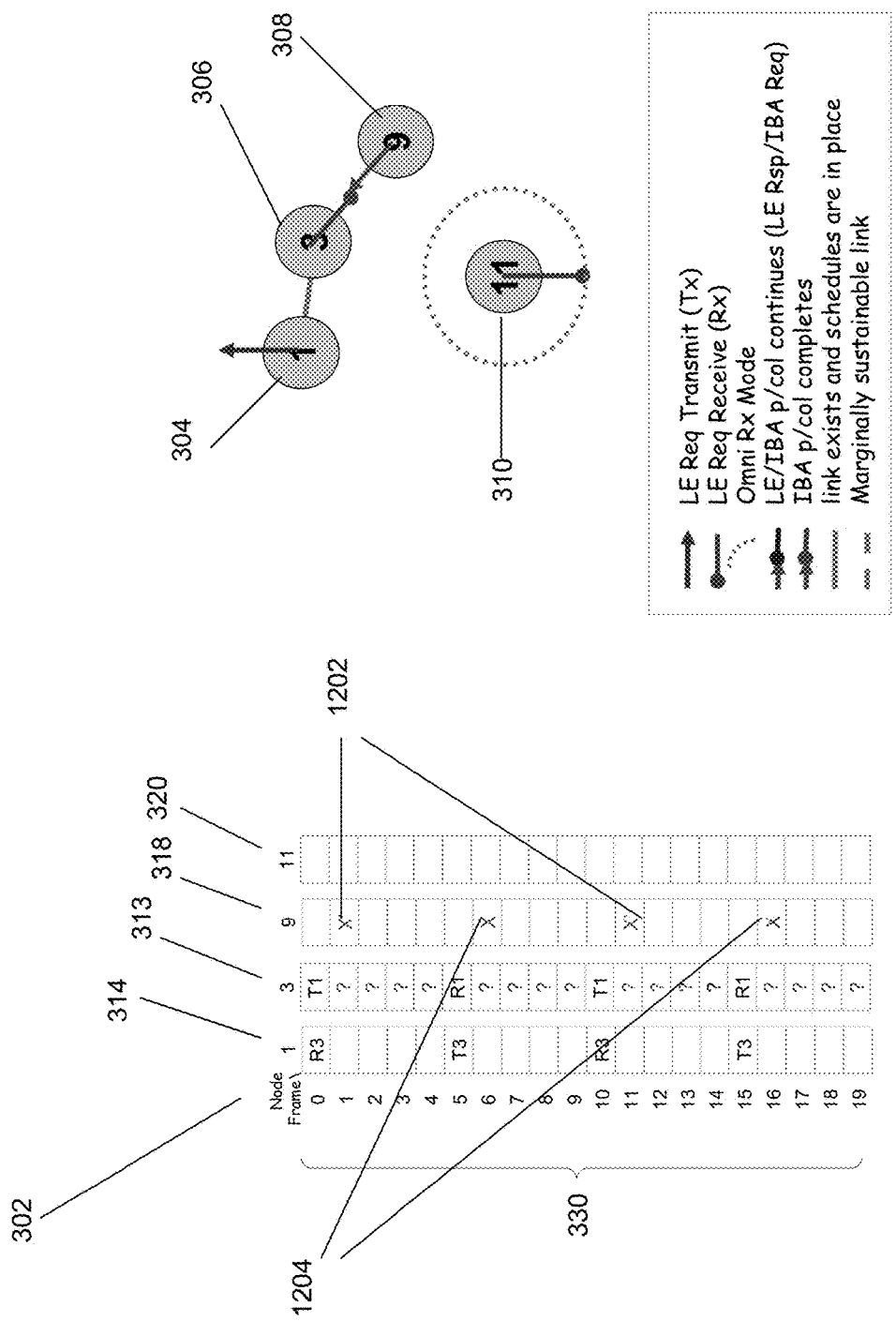
FIG. 12 illustrates an additional method of selecting idle frames from a steady-state schedule of a node in accordance with an aspect of the invention.

In FIG. 12, the LE interrogator (IBA responder) node 9 (308) may select a few common idle frames between its schedule and node 3's schedule to allocate initial bandwidth over both directions of the link with node 3 (306) and includes its selections in the IBA Rsp. For example, node 9 (308) may select idle frames 1 and 11 for transmission to Node 3 (306) represented by X' (1202) and frames 6 and 16 for receiving information represented by X (1204) from Node 3 (306). Moreover, Node 9 (308) may strive to stagger like operations in order to satisfy maintenance cycle requirements. In an embodiment, idle frames may be selected to level the transmission load and avoid jitter and/or latency problems.

Figure 13:
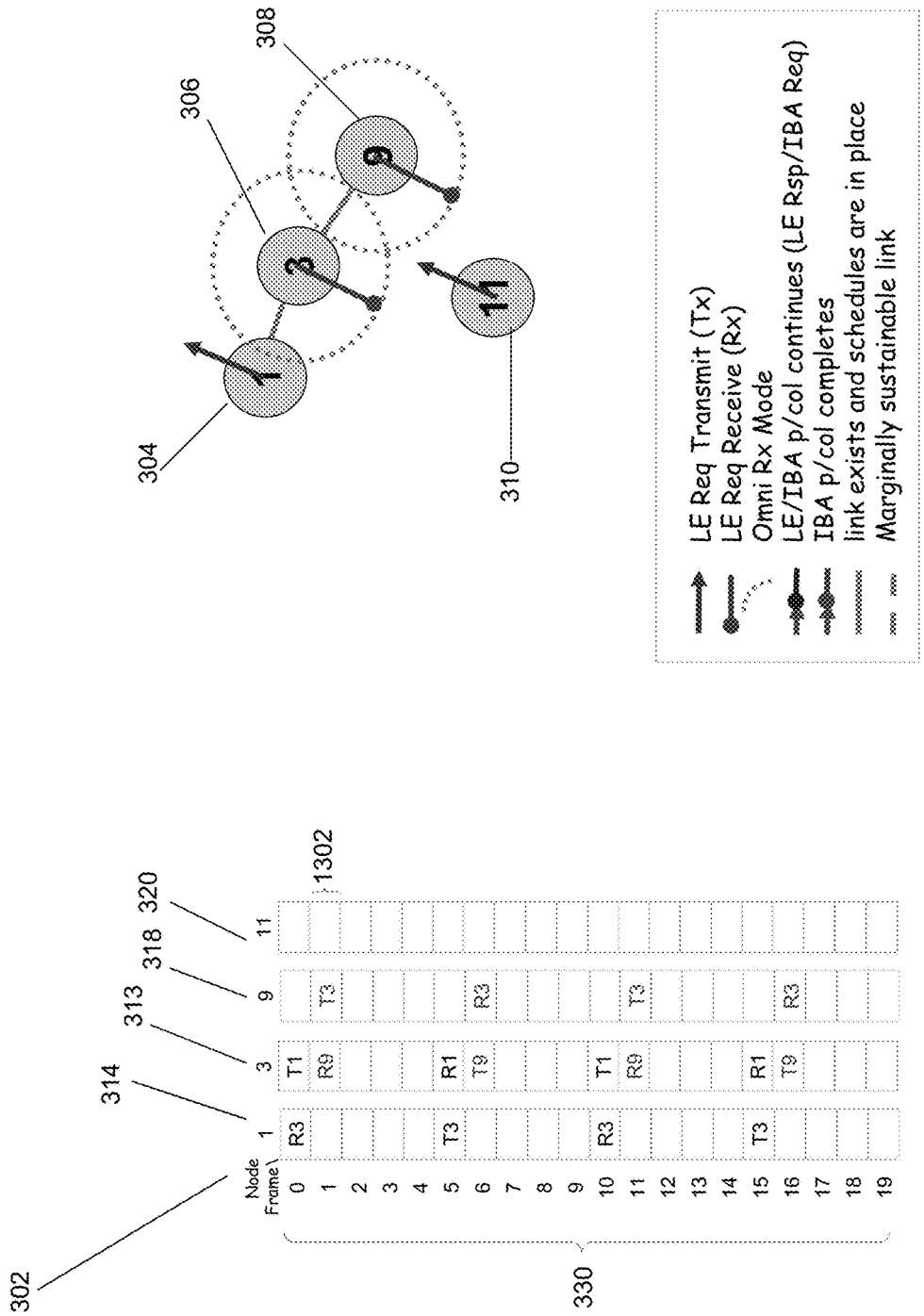
FIG. 13 illustrates a method of transmitting a link establishment request from a node in accordance with an aspect of the invention

Upon successful completion of the LE and IBA handshakes, both nodes may update their steady-state schedule accordingly without having to notify or affect any other node in the network as illustrated in FIG. 13. During time not reserved for steady-state communications with neighbors, nodes continue to search for peers. For example, nodes 1 (304) and 11 (310) as shown in FIG. 13 may be transmitting a link establishment request and nodes 3 (306) and 9 (308) may be listening for such requests at a specific time frame such as time frame 2 (1302). Those skilled in the art will realize that time frame 2 (1302) is merely exemplary and that any time frame not reserved may be utilized.

Figure 14:
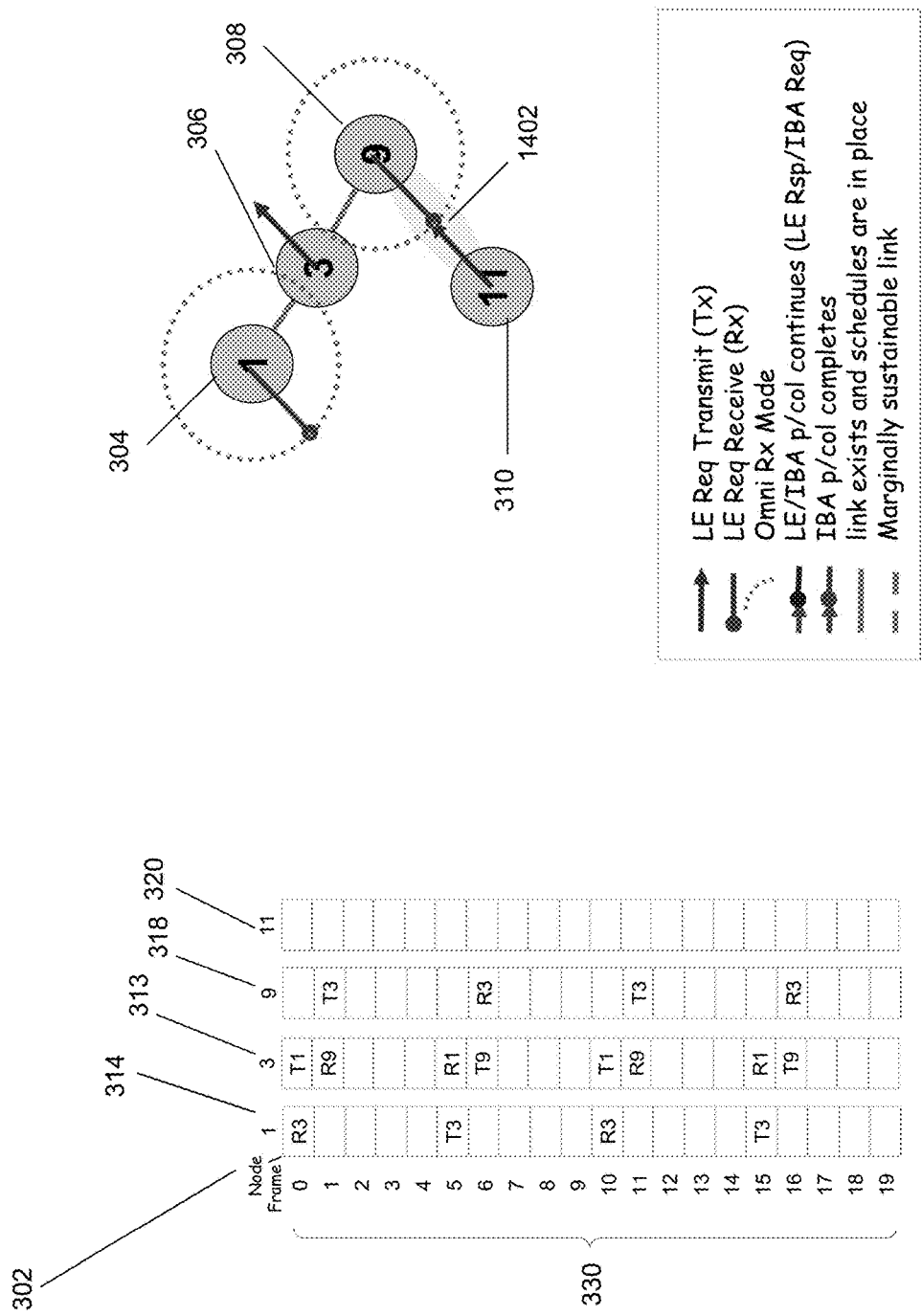
FIG. 14 illustrates another method of receiving a link establishment request from a node in accordance with an aspect of the invention.

Continuing the process of network formation and steady-state schedule coordination, in FIG. 14 node 9 (308) hears the link establishment request (1402) transmitted from node 11 (310). For this instance of the handshake, node 11 (310) may be a LE interrogator and node 9 (308) is a LE responder. During the handshake (1402) between nodes 11 (310) and 9 (308) communications may take place between nodes (1 and 3) and (3 and 9) without any effect of the link establishment and initial bandwidth allocation between nodes 11 (310) and 9 (308).

Figure 15:
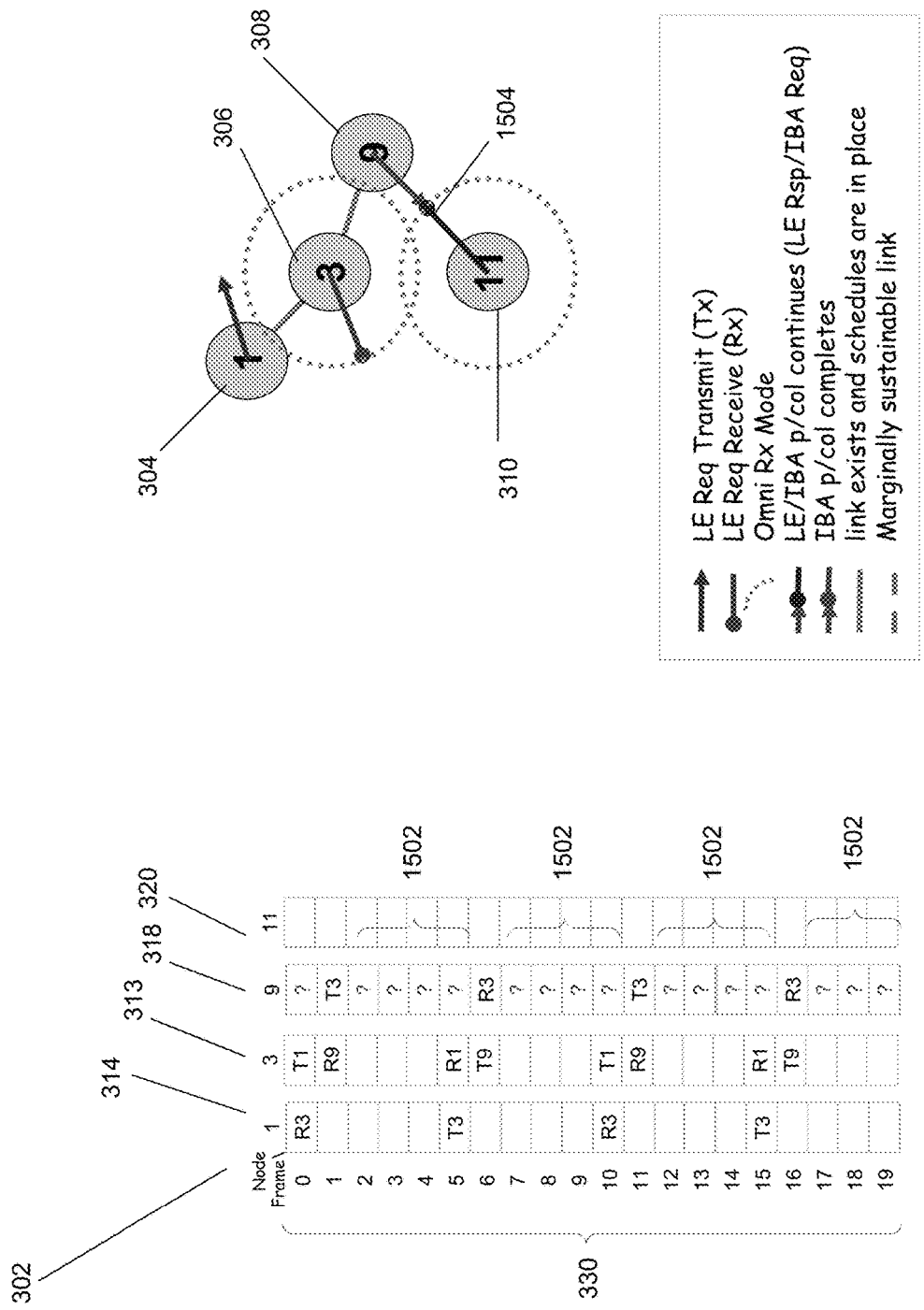
FIG. 15 illustrates an additional embodiment in which a node communicates its idle frames in accordance with an aspect of the invention.

FIG. 15 illustrates that the LE responder node 9 (308) may also be an IBA interrogator. Node 9 (308) may offer all of its idle frames to its LE interrogator (IBA responder) node 11 (310) in an IBA Req. The idle frames (1502) in FIG. 15 may be represented by question marks. In FIG. 15, two messages 1504 may be communicated between node 9 (308) and node 11 (310). The first message may be a link establishment response and the second message may be an initial bandwidth allocation request.

Figure 16:
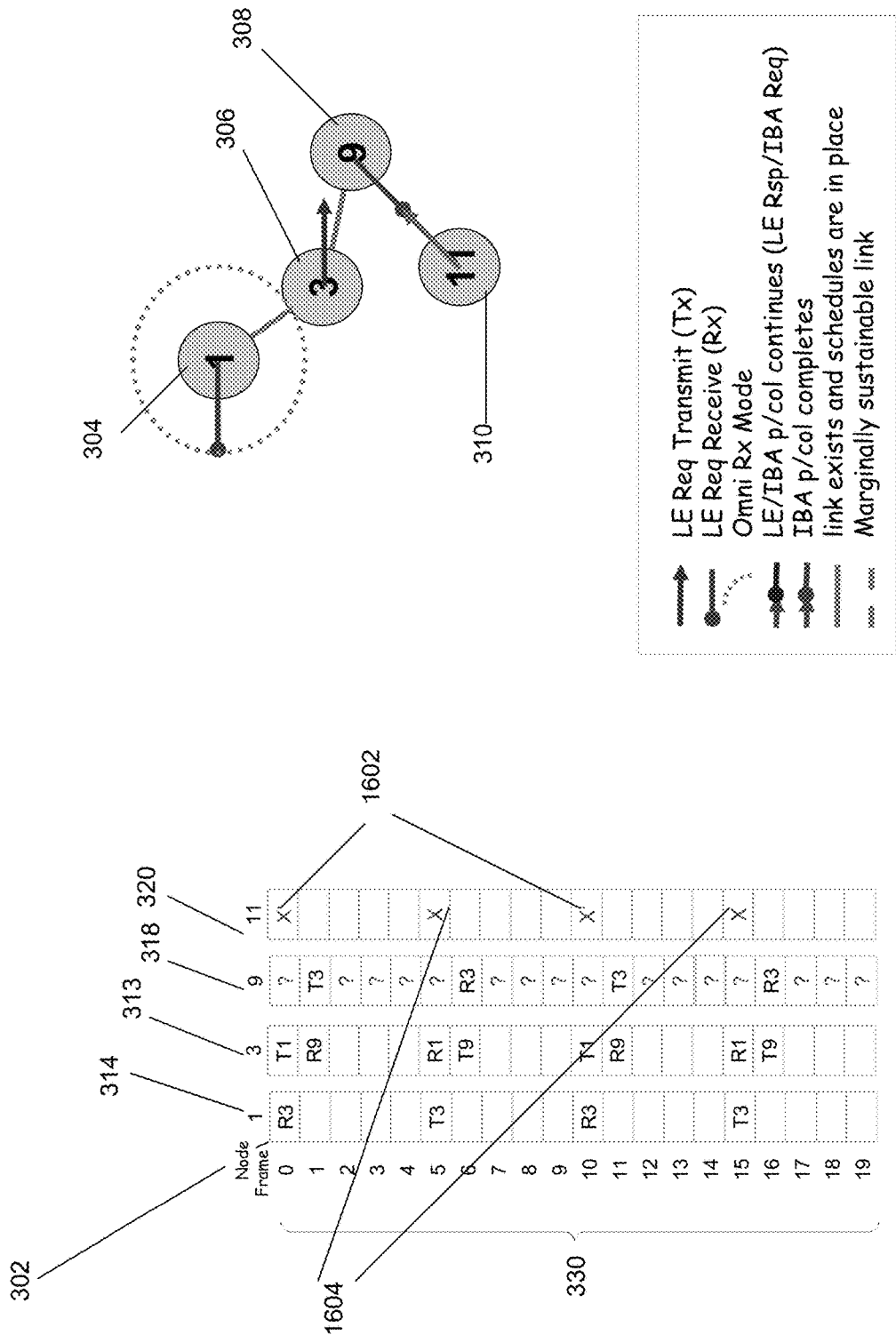
FIG. 16 illustrates an additional embodiment showing selection of common idle frames between two nodes in accordance with an aspect of the invention.

In FIG. 16, the LE interrogator (IBA responder) node 11 (310) may select a few common idle frames between its schedule and node 9's schedule to allocate initial bandwidth over both directions of the link with node 9 (308) and includes its selections in the IBA Rsp. For example, node 11 (310) may select idle frames 0 and 10 for transmission to node 9 (308) represented by X' (1602) and frames 5 and 15 for receiving information represented by X (1604) from Node 11 (310). Moreover, node 11 (310) may strive to stagger like operations in order to satisfy maintenance cycle requirements. In an embodiment, idle frames may be selected to level transmission load and avoid jitter and/or latency problems.

Figure 17:
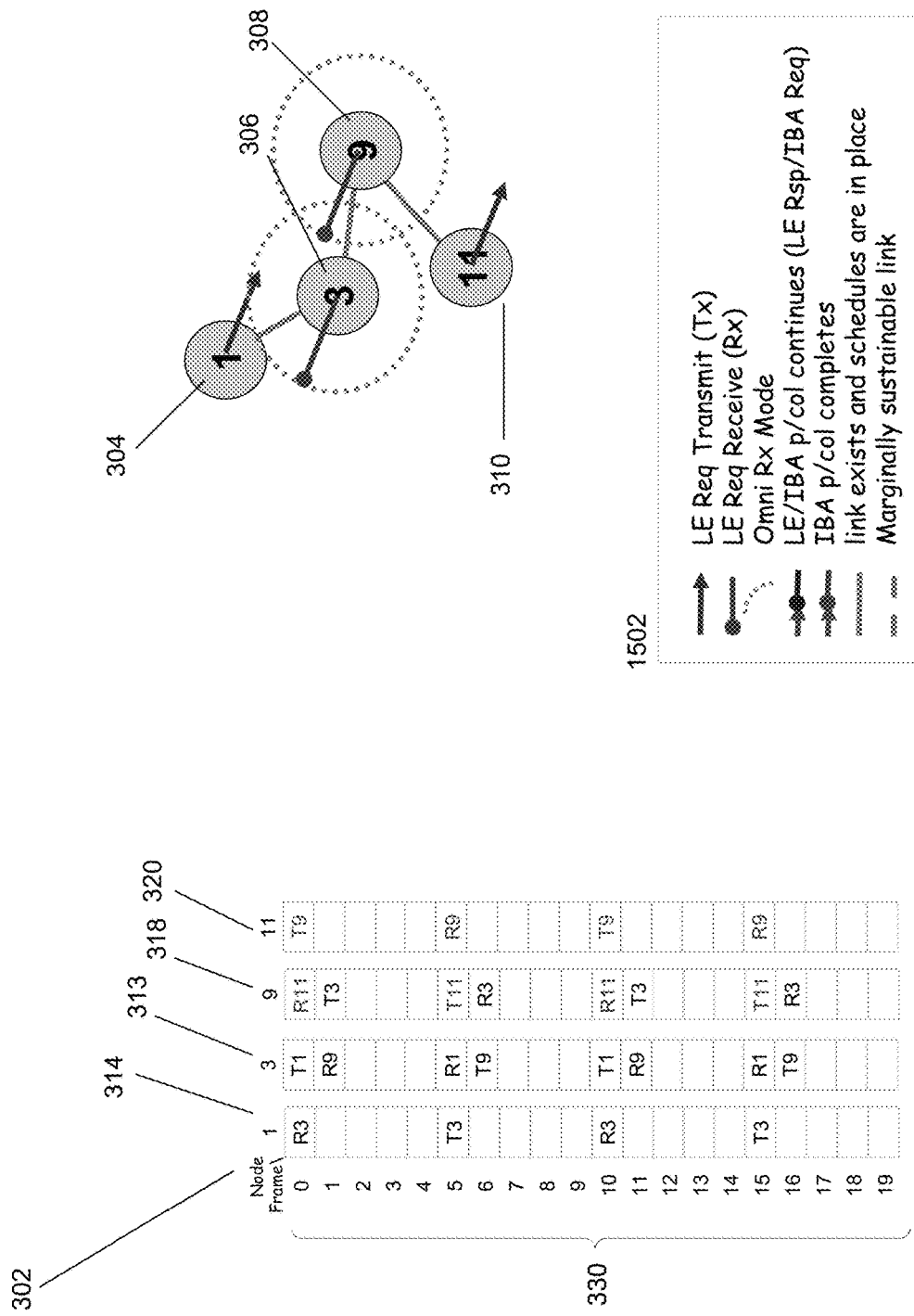
FIG. 17 illustrates a method of updating a node's steady-state schedule without having to notify or affect any other node in the network in accordance with an aspect of the invention.
Figure 18:
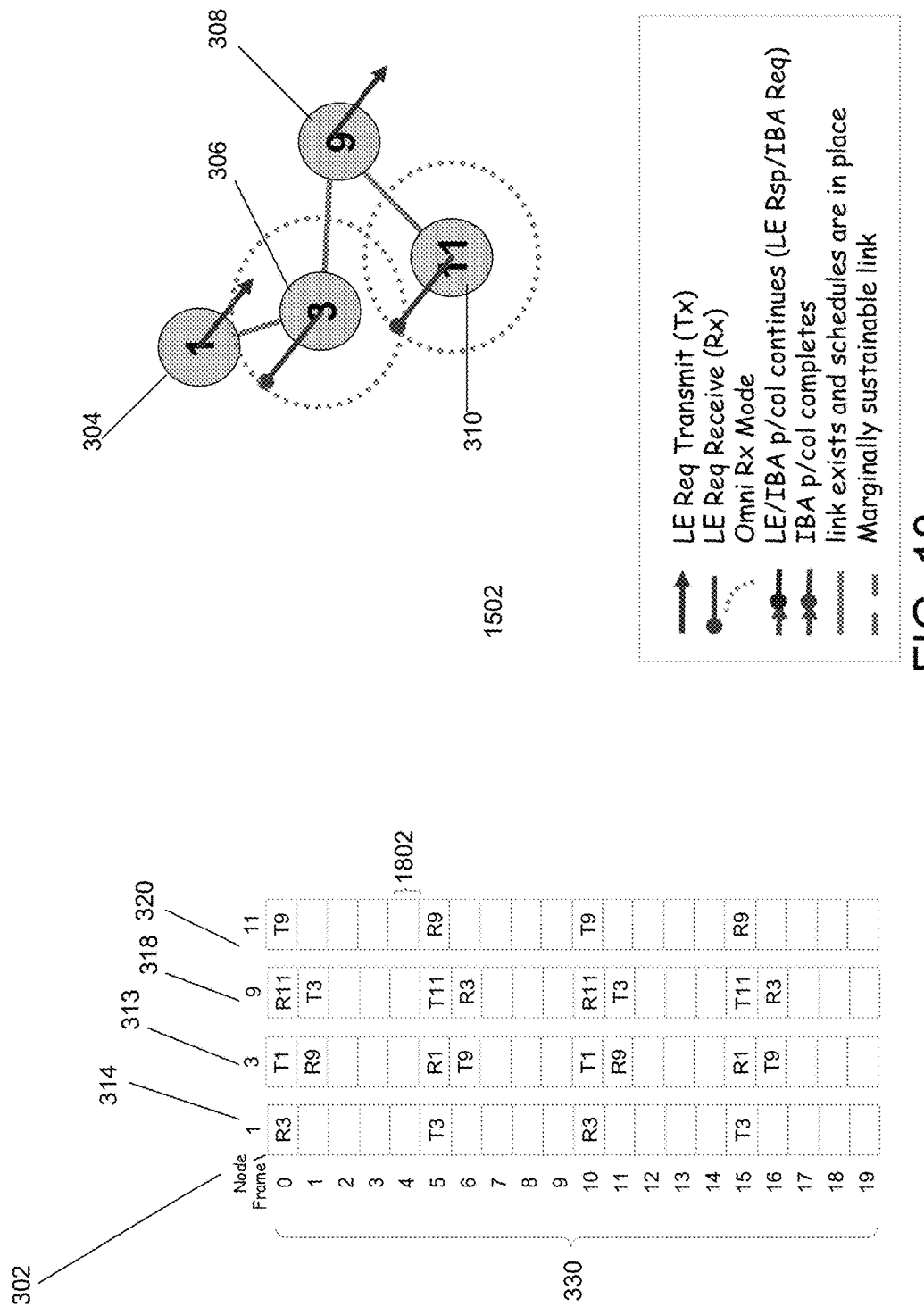
FIG. 18 illustrates a method of searching for additional peers during idle time in accordance with an aspect of the invention.

Upon successful completion of the LE and IBA handshakes, both nodes may update their steady-state schedules (318 and 320) accordingly without having to notify or affect any other node in the network as illustrated in FIG. 17. As illustrated in FIG. 18, during time not reserved for steady-state communications with neighbors, nodes may continue to search for additional peers. For example, nodes 1 (304) and 9 (308) may be transmitting a link establishment request and nodes 3 (306) and 11 (310) may be listening for such a request at a specific time frame such as frame 4 (1802). Those skilled in the art will realize that time frame 4 is merely exemplary and that any time frame not reserved may be utilized.

Figure 19:
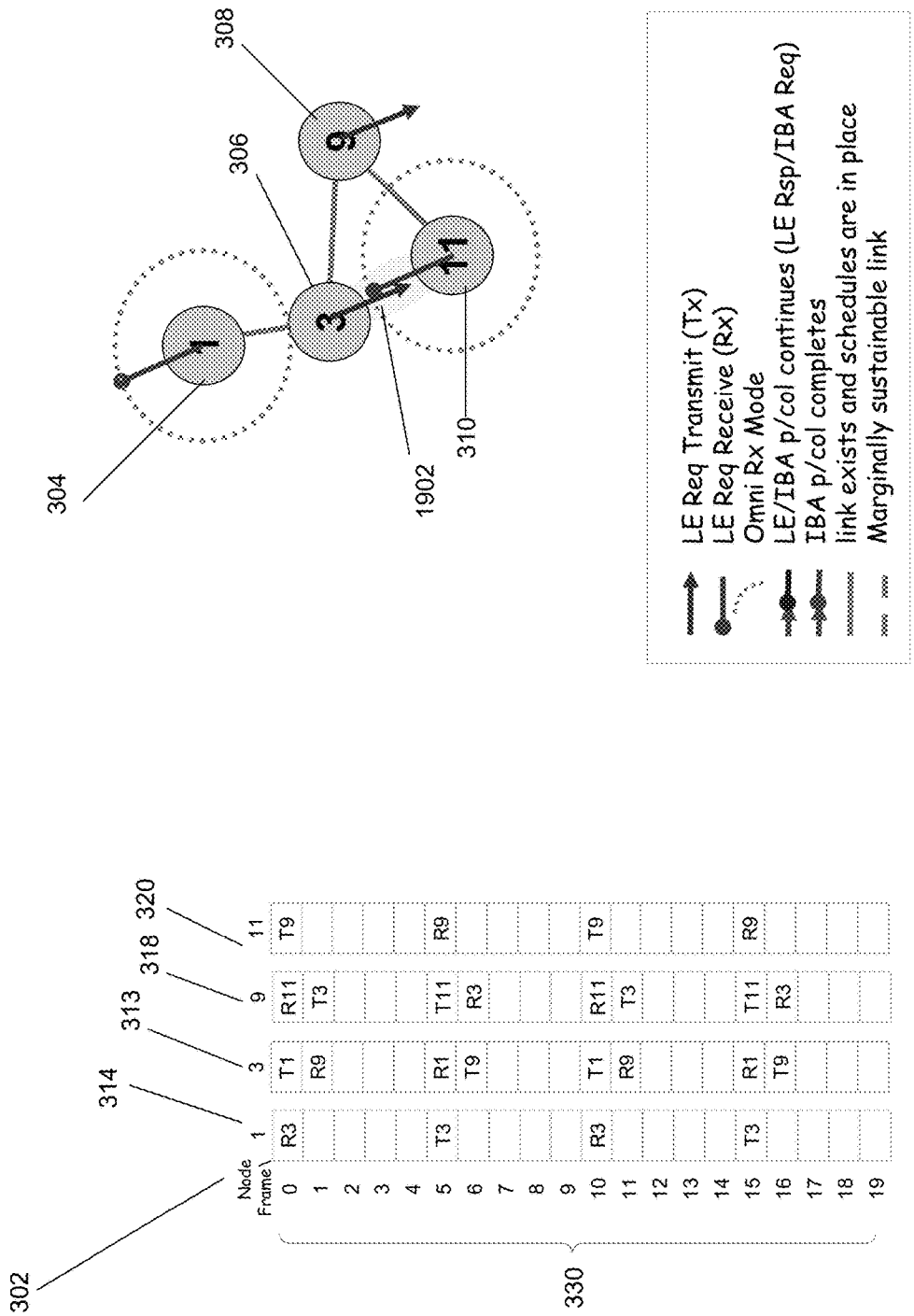
FIG. 19 illustrates a continuing process of network formation and steady-state schedule coordination in accordance with an aspect of the invention.

Continuing the process of network formation and steady-state schedule coordination in FIG. 19, node 11 (310) hears the link establishment request transmitted (1902) from node 3 (306). For this instance of the handshake, node 3 (306) may be a LE interrogator and node 11 (310) is a LE responder. During the handshake between nodes 11 (310) and 9 (308) communications may take place between nodes (1 and 3), (3 and 9), and (9 and 11) without any effect of the link establishment and initial bandwidth allocation between nodes 11 (310) and 3 (306).

Figure 20:
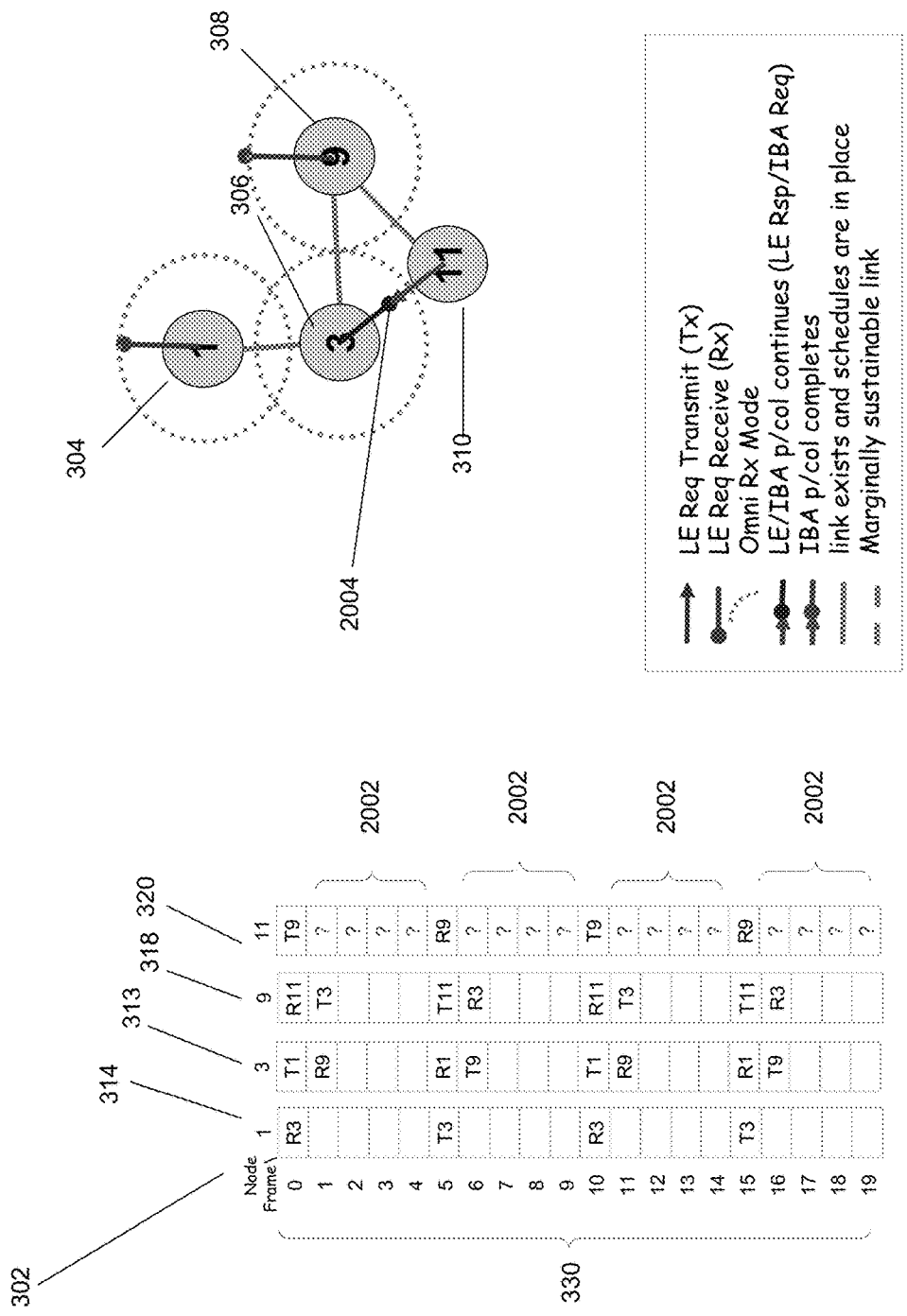
FIG. 20 illustrates another node communicating its idle frames in accordance with an aspect of the invention.

FIG. 20 illustrates that the LE responder node 11 (310) may also be the IBA interrogator. Node 11 (310) may offer all of its idle frames to its LE interrogator (IBA responder) node 3 (306) in the IBA Req. The idle frames (2002) in FIG. 20 may be represented by question marks. In FIG. 20, two messages (2004) may be communicated between node 11 (310) and node 3 (306). The first message may be a link establishment response and the second message may be an initial bandwidth allocation request.

Figure 21:
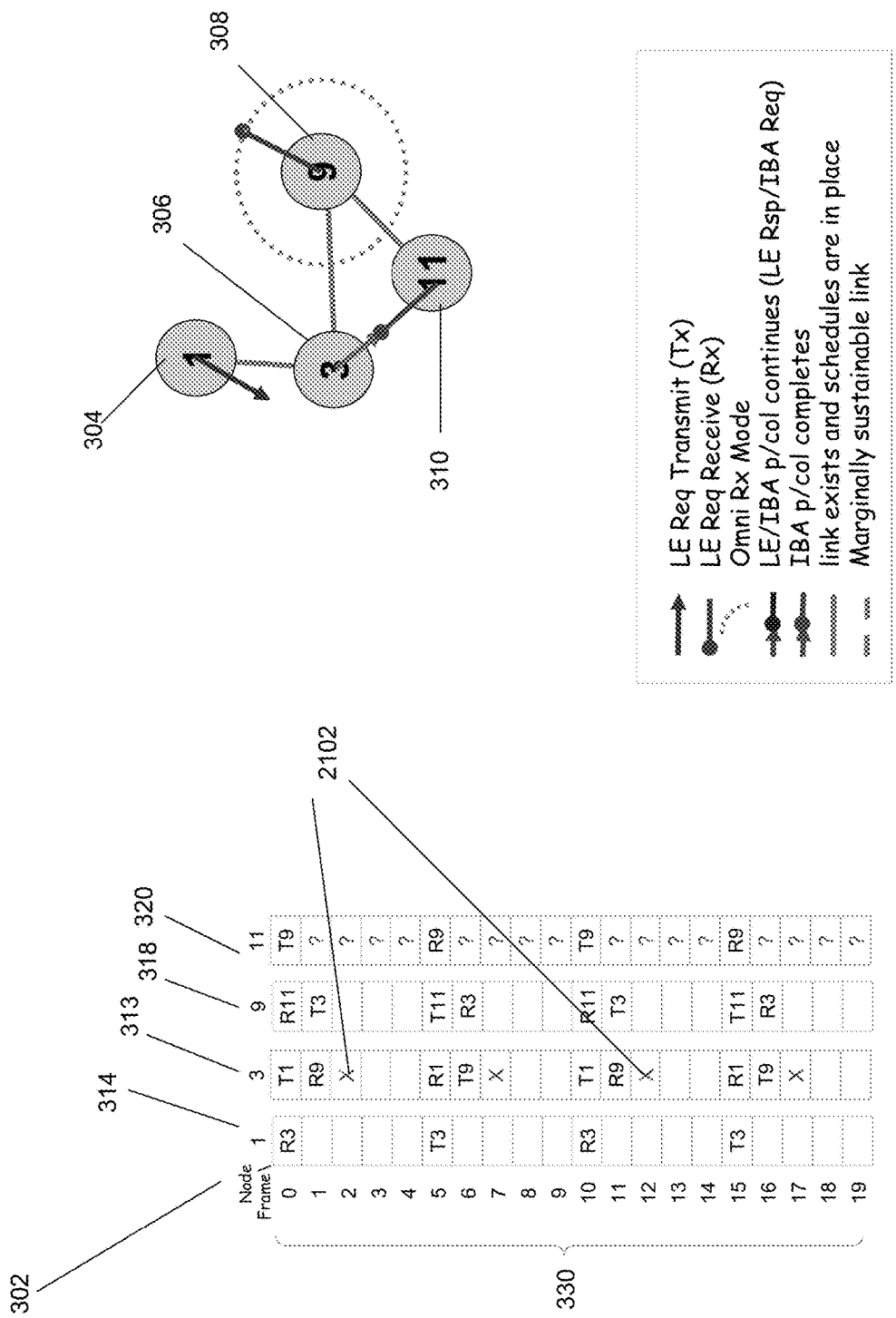
FIG. 21 illustrates a method of selecting common idle frames between the nodes communicated in FIG. 20 in accordance with an aspect of the invention.
Figure 22:
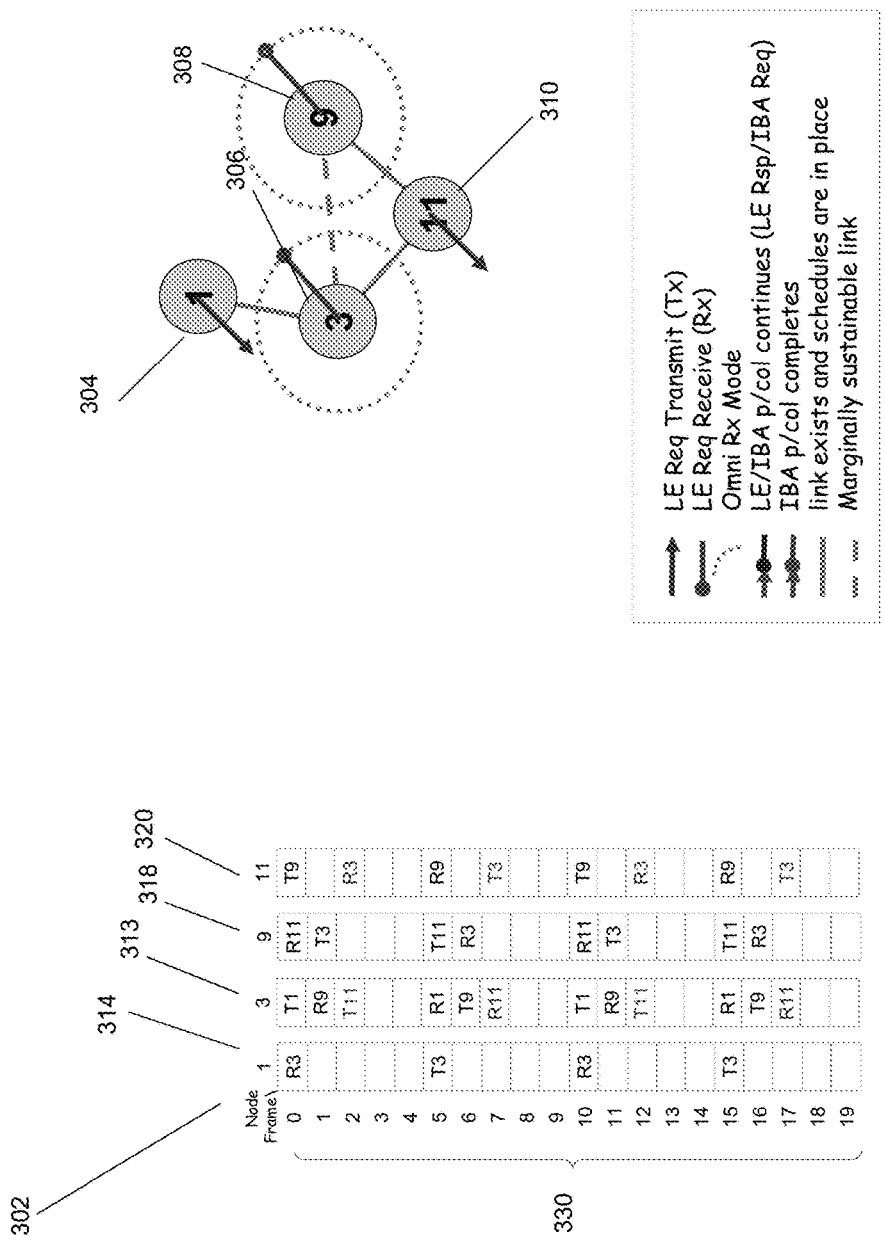
FIG. 22 illustrates a method of updating steady-state schedules based on the frames selected in FIG. 21 in accordance with an aspect of the invention.

In FIG. 21, the LE interrogator (IBA responder) node 3 (306) may select a few common idle frames (2102) between its schedule and node 11 schedule to allocate initial bandwidth over both directions of the link with node 11 (310) and includes its selections in the IBA Rsp. Upon successful completion of the LE and IBA handshakes, both nodes may update their steady-state schedule accordingly without having to notify or affect any other node in the network as illustrated in FIG. 22. During time not reserved for steady-state communications with neighbors, nodes may continue to search for new peers.

In another aspect of the invention, the protocols may be extended to include QoS to make a determination of a value of the nodes data to determine which nodes receives the bandwidth.

Figure 23:
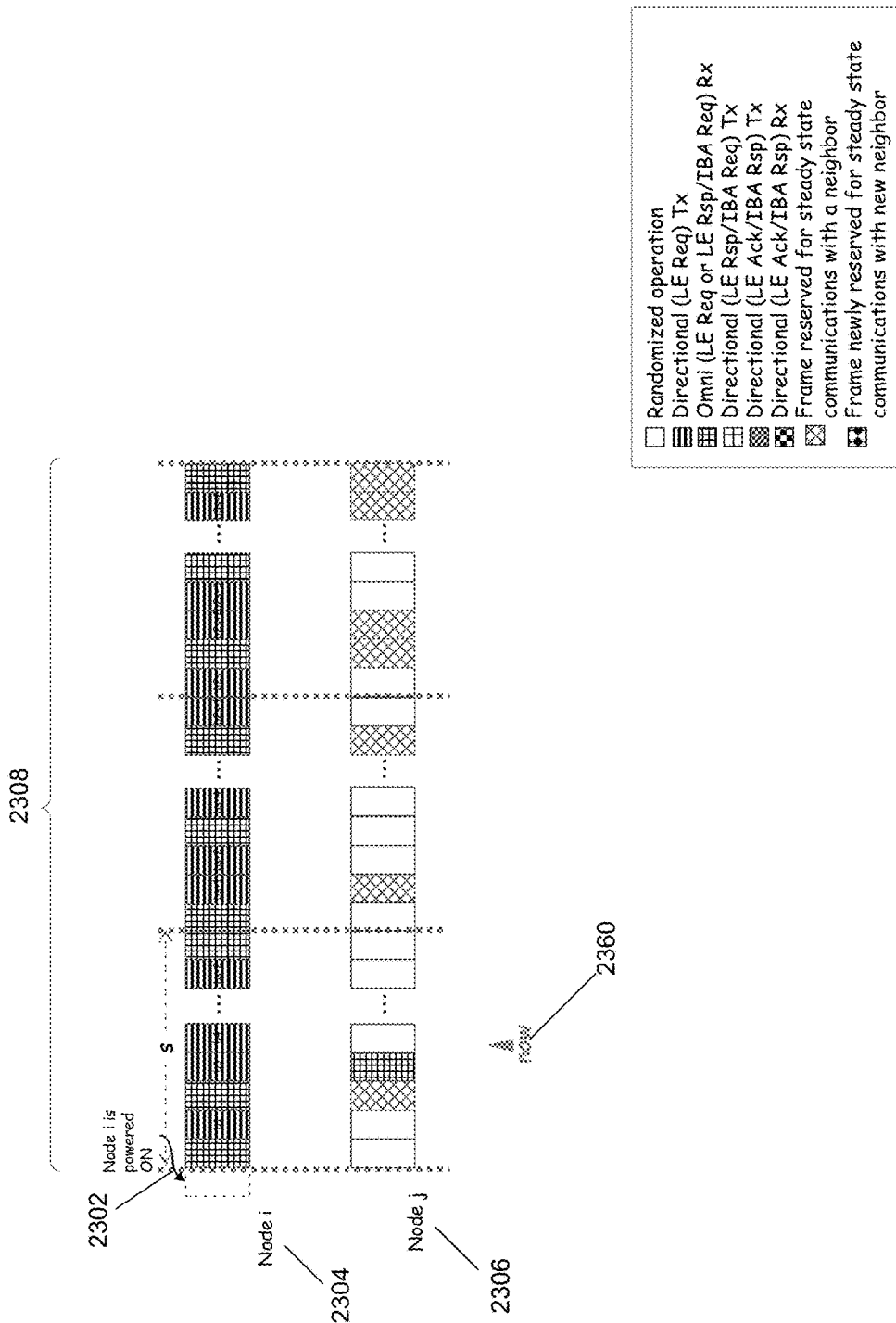
FIG. 23 illustrates another example of link establishment and initial bandwidth allocation in accordance with an aspect of the invention.

Another example of link establishment and initial bandwidth allocation is shown below in FIGS. 23-32. Furthermore, in FIGS. 23-32, the process may be shown using a sub-template based approach. In FIG. 23, a node may be powered "on" and become operational. The node may participate in a discovery scan. The direction of a node's transmission may be represented in each frame using the notation b(f). For example, FIG. 23 illustrates two nodes: a node i (2304) and a node j (2306) wherein in node i (2304) is powered "on" (2302). Initially node i (2304) may schedule three subtemplates (2308) of s frames each, where s may be at least the amount of time it takes for a node to turnaround a received message. The three subtemplates (2308) may be intended for use in either transmitting or receiving a first link establishment message (LE Req.). For illustrative purposes assume in FIG. 23 that node i (2304) is not aware of any other nodes on power up and node j (2306) is a node that is already part of an existing network. Furthermore, the arrow (2360) indicates a time reference to be used throughout the exemplary embodiment to depict time elapsing.

Figure 24:
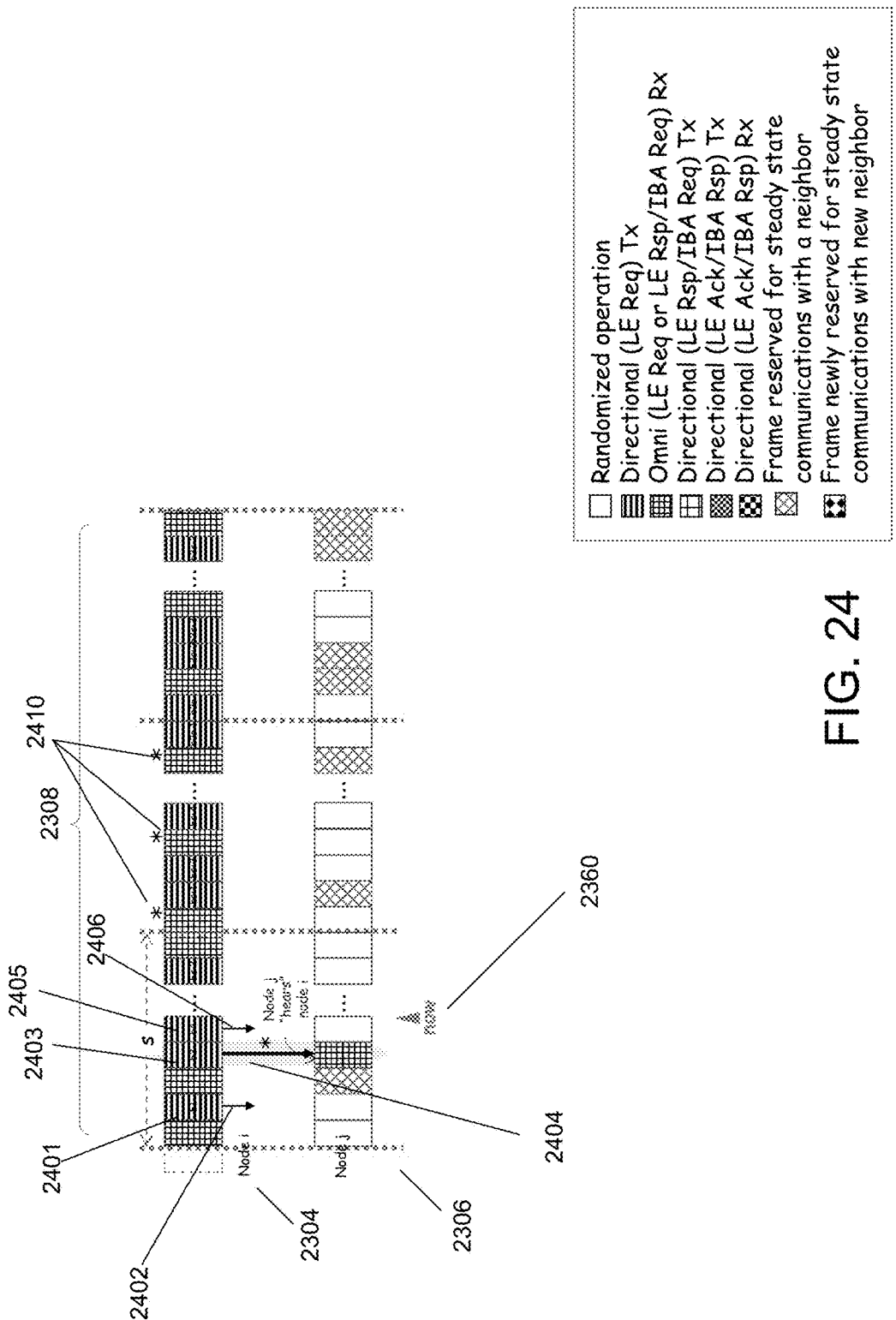
FIG. 24 illustrates a method of transmitting a link establishment request in a first subtemplate in accordance with an aspect of the invention.

In accordance with an aspect of the invention, FIG. 24 shows that on all Tx frames of the first subtemplate, node i (2304) sends a link establishment request (LE Req.). For example, at bearing b1 (2401) a link establishment request is transmitted as shown by 2402. Similarly, at bearing b3 (2403) a link establishment request is transmitted as shown by 2404. Finally, at bearing b4 (2405) a link establishment request is transmitted as shown by 2406. As those skilled in the art will realize, the direction in which each of the nodes points for transmission purposes may be a function of the frame of day. In addition, the arrows (2402) and (2406) depicting transmission by node i (2304) do not get heard or detected by node j (2306) as indicated by the arrows (2402 and 2406) falling short of node j (2306).

In an aspect of the invention, node i's transmitted LE Req includes all unreserved (non-steady-state) Rx frames in the subsequent sub-template as indicated by the asterisks 2410. In other words, node i (2304) may communicate to node j (2306) when it will be listening for a response from node j (2306) (or any node that may have heard a link establishment request during the present subtemplate) during the next subtemplate that corresponds to reception.

Figure 25:
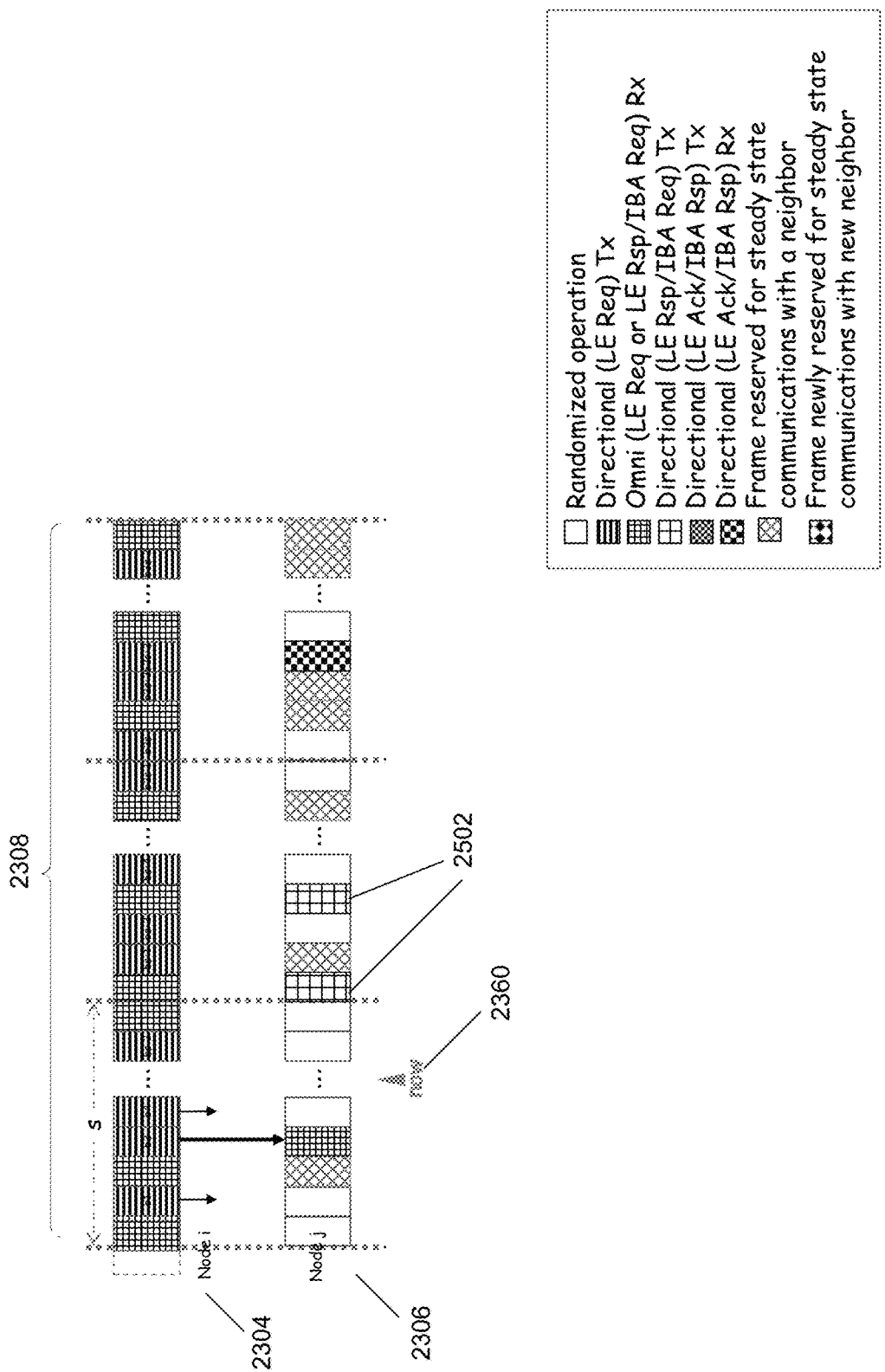
FIG. 25 illustrates a method of receiving a link establishment request in a first subtemplate in accordance with an aspect of the invention.

FIG. 25 illustrates that node j (2306) which is participating in a network hears node i's LE Req and randomly selects n frames (2502) of those offered in the LE Req in which to respond with an LE Rsp in the next subtemplate. Node j (2306) may strive to avoid preemption of its own steady-state communication and overwrites whatever operations it had scheduled prior to receiving the LE Req. Only if all the frames offered in the LE Req are currently being used for node j's steady-state communications with its neighbors, does node j (2306) preempt any frames for responding to node i (2304).

In an aspect of the invention, n may be a function of the maximum number of allowed neighbors and the number of Rx frames offered in node i's LE Req, where its minimum value may be 1. In the example, n=2 as depicted by the two frames that node j selects in which to transmit its response.

Similarly, node j (2306) may also select one of its non-steady-state frames during the third subtemplate in which it is to point in node i's direction for receiving the third and last message in the link establishment handshake (as well as the piggy-backed last message in the initial bandwidth allocation handshake), an LE Ack/IBA Rsp. Node j (2306) may also look at its steady-state schedule so that it may convey to node i (2304) all of its idle frames within the steady-state communications schedule in the IBA Req.

Figure 26:
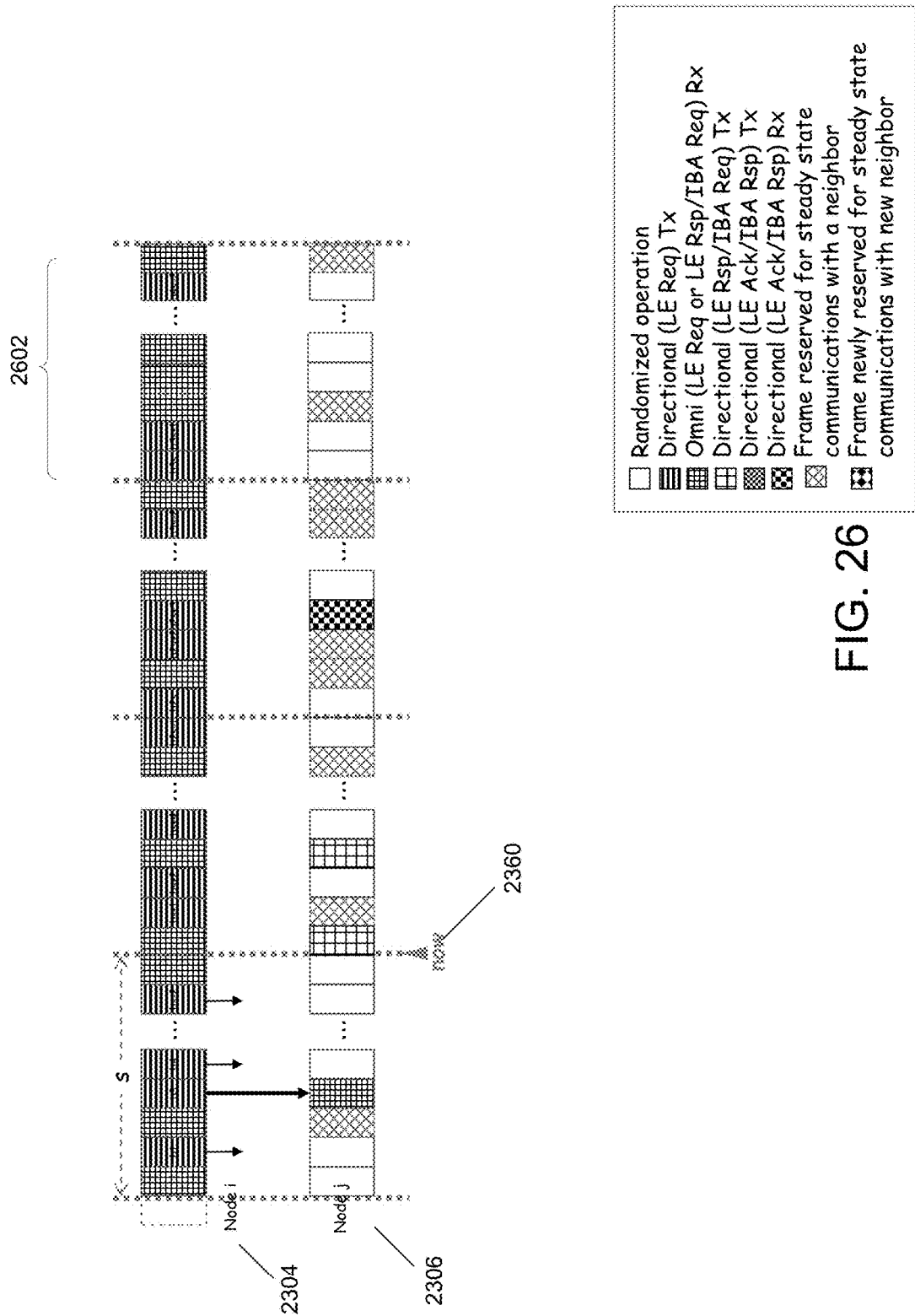
FIG. 26 illustrates a method of randomly scheduling frames not reserved for steady-state communications in accordance with an aspect of the invention.

FIG. 26 illustrates that upon completion of a subtemplate t (we reach a subtemplate boundary) nodes randomly schedule any frames not reserved for steady-state communications (i.e., any idle frames) of subsequent subtemplate t+3. This gives nodes 3 s frames worth of look-ahead time. In an alternative embodiment, nodes may initially schedule 2 s-frame subtemplates and on every frame, schedule a new frame if not reserved for steady-state communications. For example, FIG. 26 shows a new subtemplate (2602) such that three subtemplates are prescheduled in advance.

Figure 27:
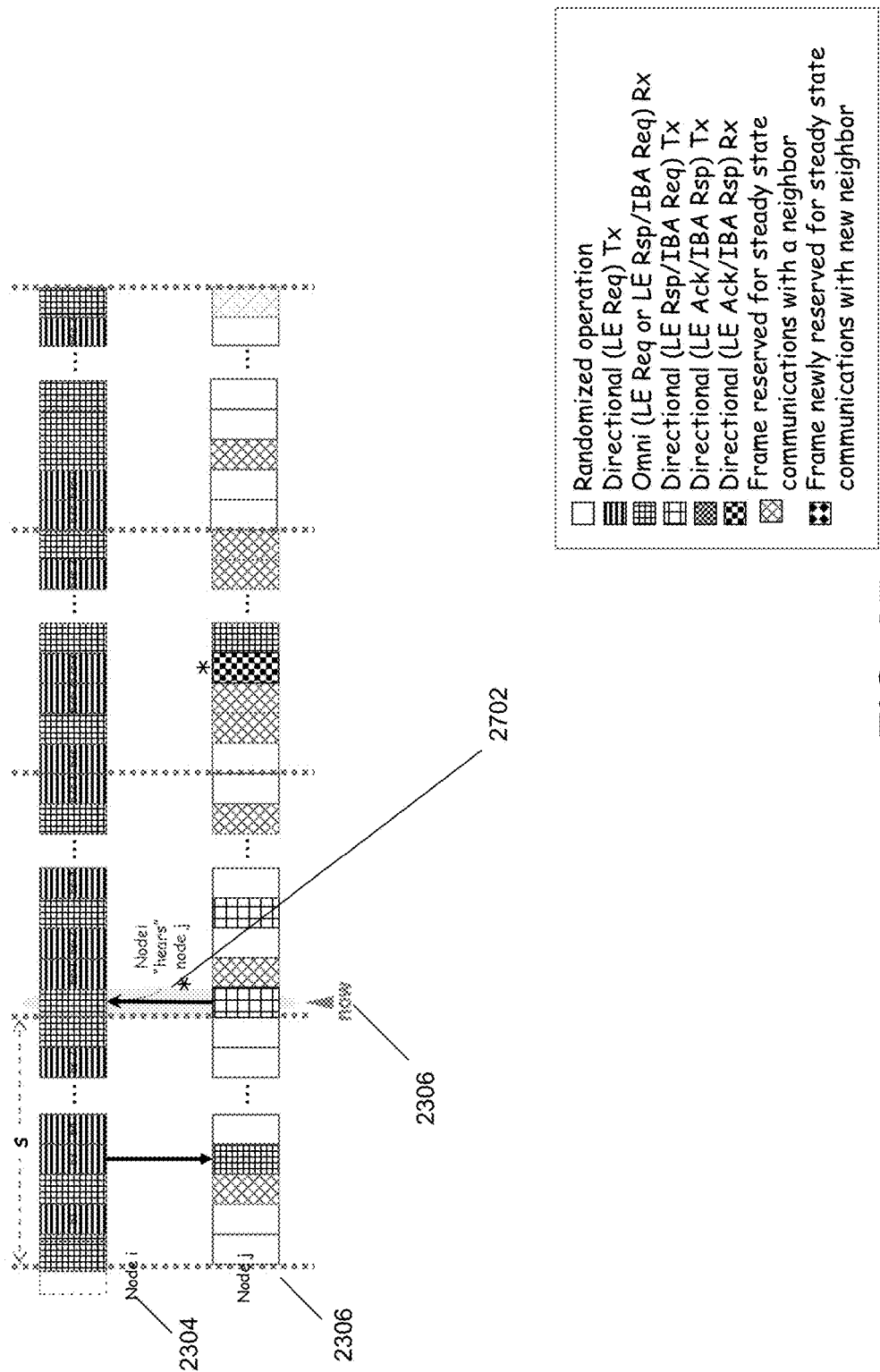
FIG. 27 illustrates a method of transmitting a link establishment response and initial bandwidth allocation request in accordance with an aspect of the invention.

FIG. 27 illustrates that node j (2306) attempts to respond (with the LE Rsp/IBA Req 2702) on multiple opportunities on the frames that node j (2306) may have previously selected for responding to node i (2304). This message conveys both the time in the subsequent subtemplate when node j (2306) is to be listening in node i's direction for its LE Ack/IBA Rsp 2702, and the list of node j's idle frames within its steady-state schedule. As those skilled in the art will realize, in this exemplary embodiment this is the first time node i (2304) hears about node j (2306).

In an aspect of the invention, node i (2304) hears node j's LE Rsp/IBA Req (2702). Node i (2304) may ignore any subsequent responses and possibly LE requests from node j (2306) except maybe to update its knowledge of node j's position and thus its pointing angle toward node i (2304).

Figure 28:
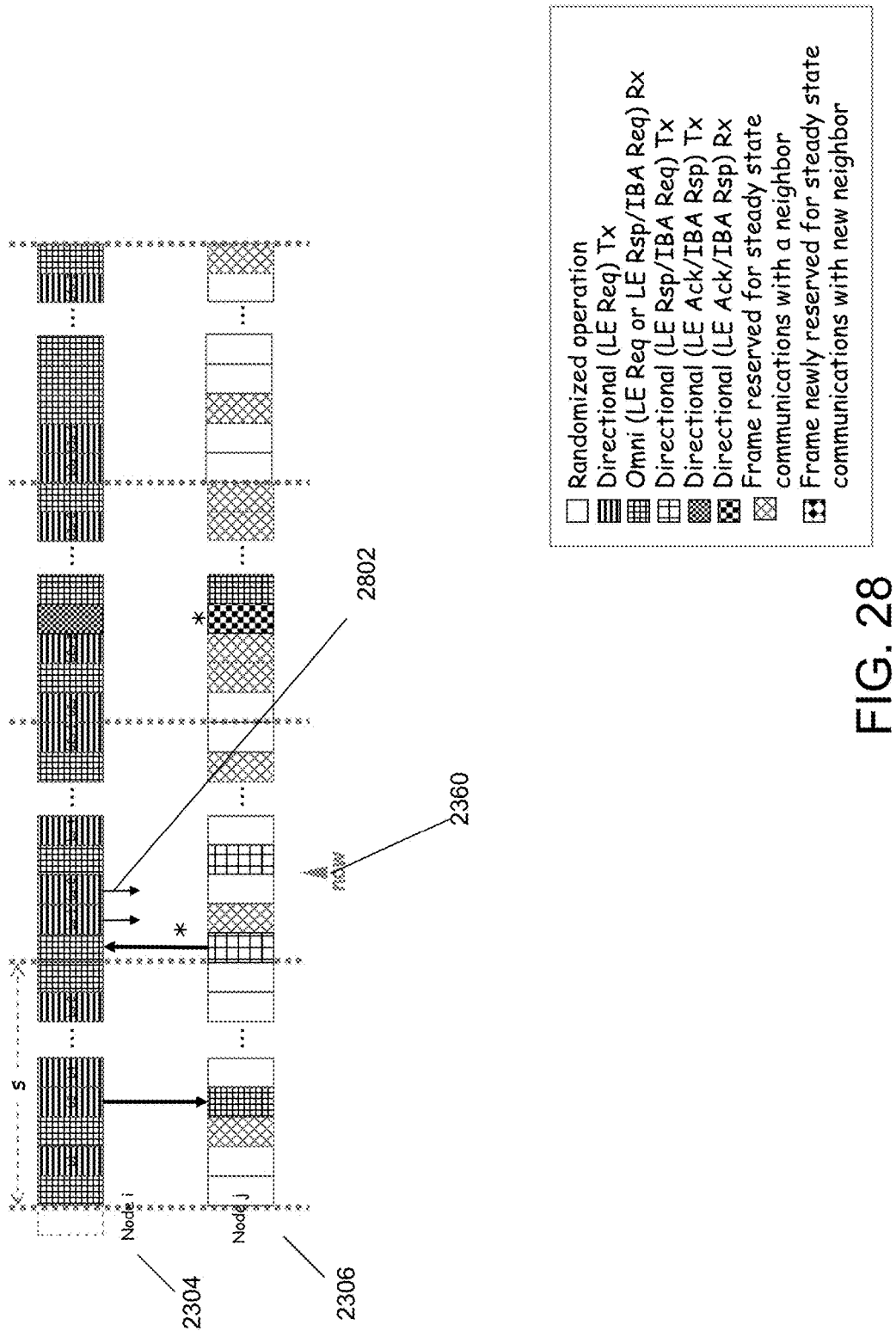
FIG. 28 illustrates further processing steady-state schedules coordination in accordance with an aspect of the invention.

FIG. 28 illustrates that node i (2304) may now be aware (2802) of when node j (2306) may be listening in its direction because of nodes j's transmission. Node i (2304) may look at its steady-state schedule and select 2*d frames that are commonly idle with those offered in the IBA Req, where d is the configured link load representing the initial bandwidth allocation which should correspond to at least the link maintenance rate. In an embodiment, d of those frames may be used for node i (2304) to transmit to node j (2306) and the other d may be for node j (2306) to transmit to node i (2304). Thus, the steady-state communications schedule between nodes i (2304) and node j (2306) is being coordinated (d frames are reserved for each direction of the link).

In addition, node i (2304) may reserve the opportunity within the subtemplate to transmit the LE Ack/IBA Rsp. In one aspect of the invention, if node i (2304) were also participating in a network, node i (2304) may have to preempt a steady-state communication frame, but only for this subtemplate.

Figure 29:
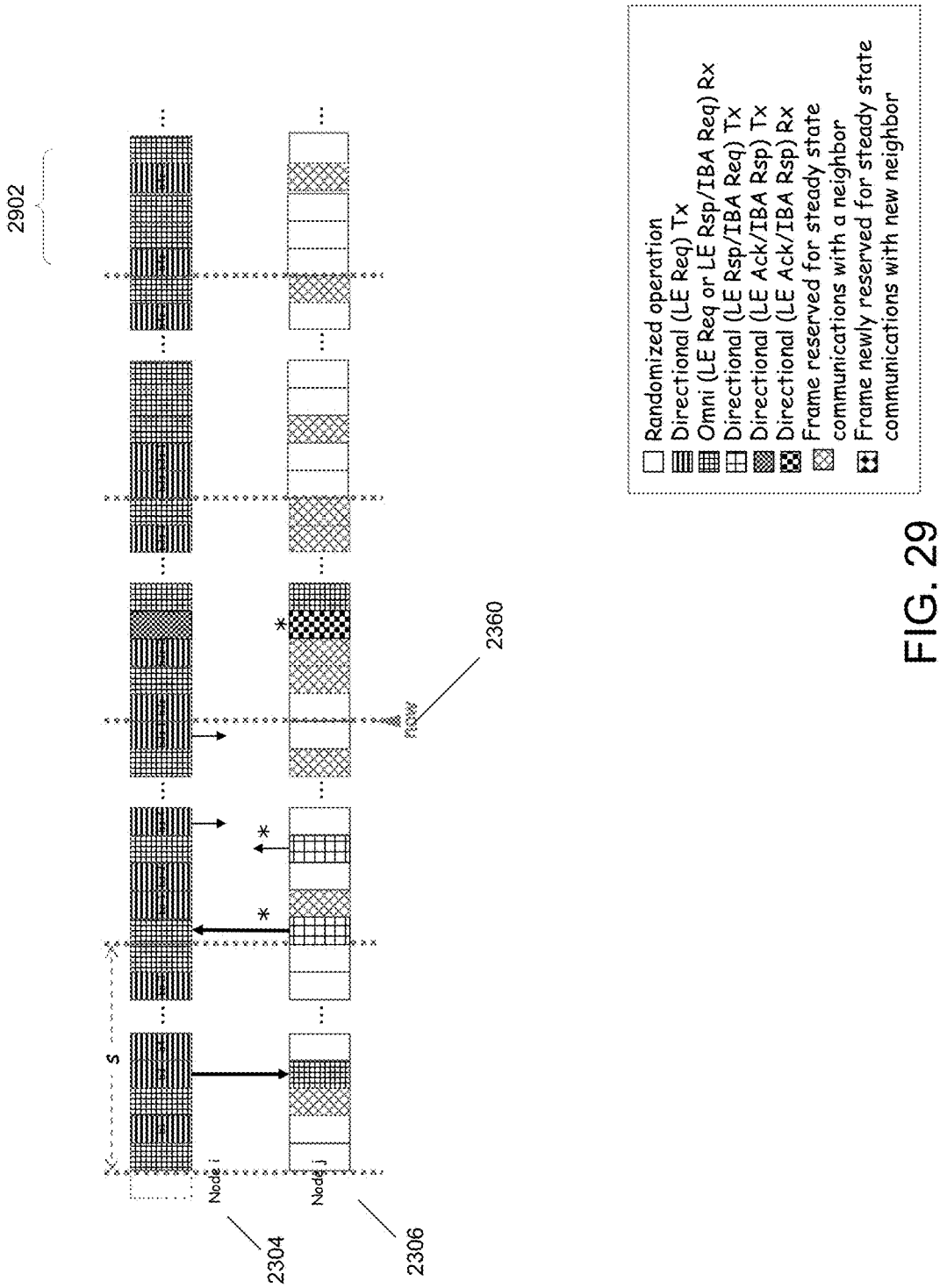
FIG. 29 illustrates an additional method of randomly scheduling frames not reserved for steady-state communications in accordance with an aspect of the invention.

FIG. 29 illustrates that once again upon completion of a subtemplate, nodes randomly schedule any frames not reserved for steady-state communications (i.e., any idle frames) of subsequent subtemplate t+3. This gives nodes 3 s frames worth of look-ahead time. For example, FIG. 29 shows a new subtemplate (2902) such that three subtemplates are prescheduled in advance.

Figure 30:
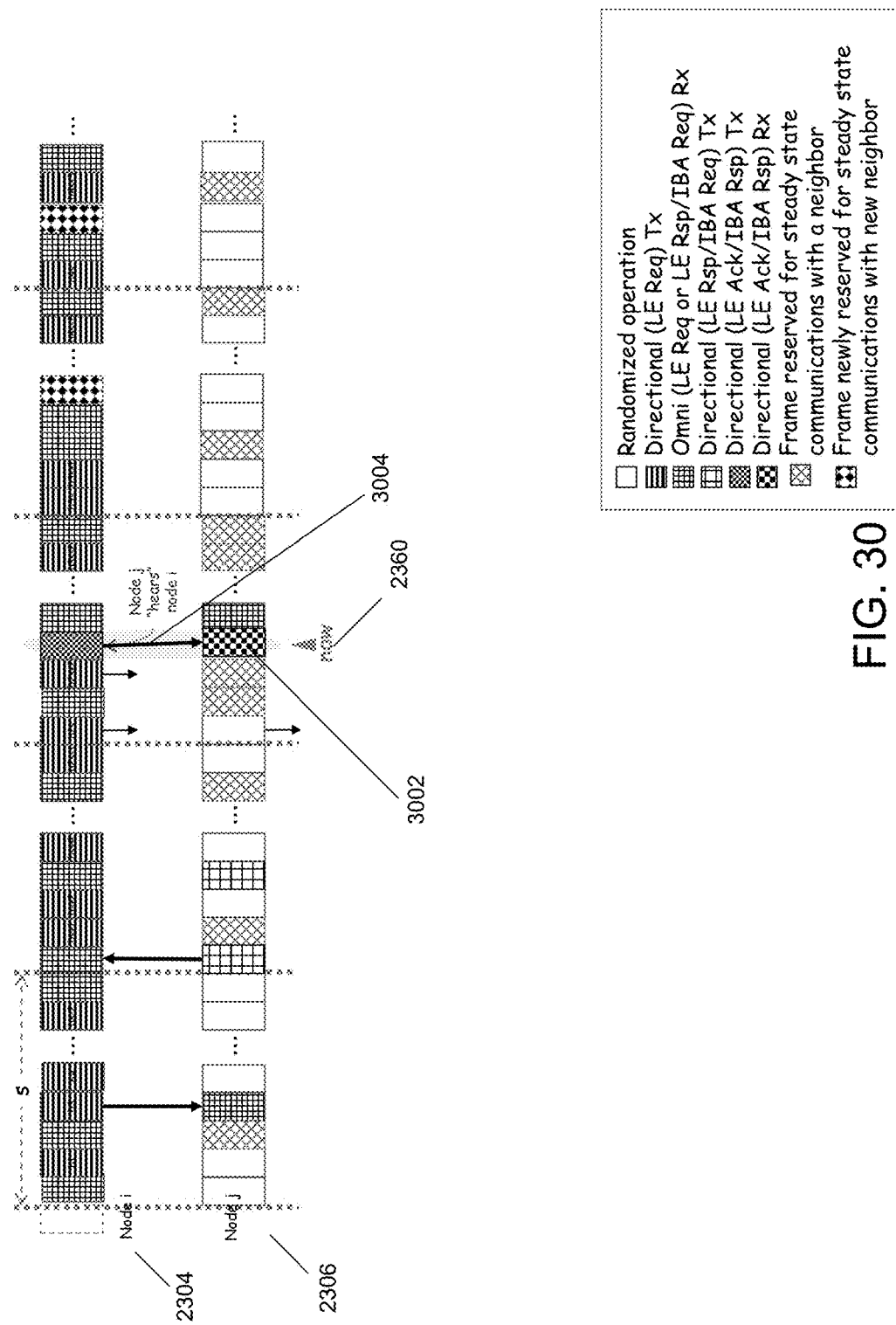
FIG. 30 illustrates another method of transmitting a link establishment acknowledgement and initial bandwidth allocation response in accordance with an aspect of the invention.

FIG. 30 illustrates that at the expected frame (3002), node i (2304) transmits a LE ACK/IBA Rsp (3004). The link may be considered established from node i's point of view and its schedule with node j (2306) may also be established at node i (2304). Node i (2304) may transition to use its steady-state communication opportunities with node j (2306) within the next subtemplate time interval.

Figure 31:
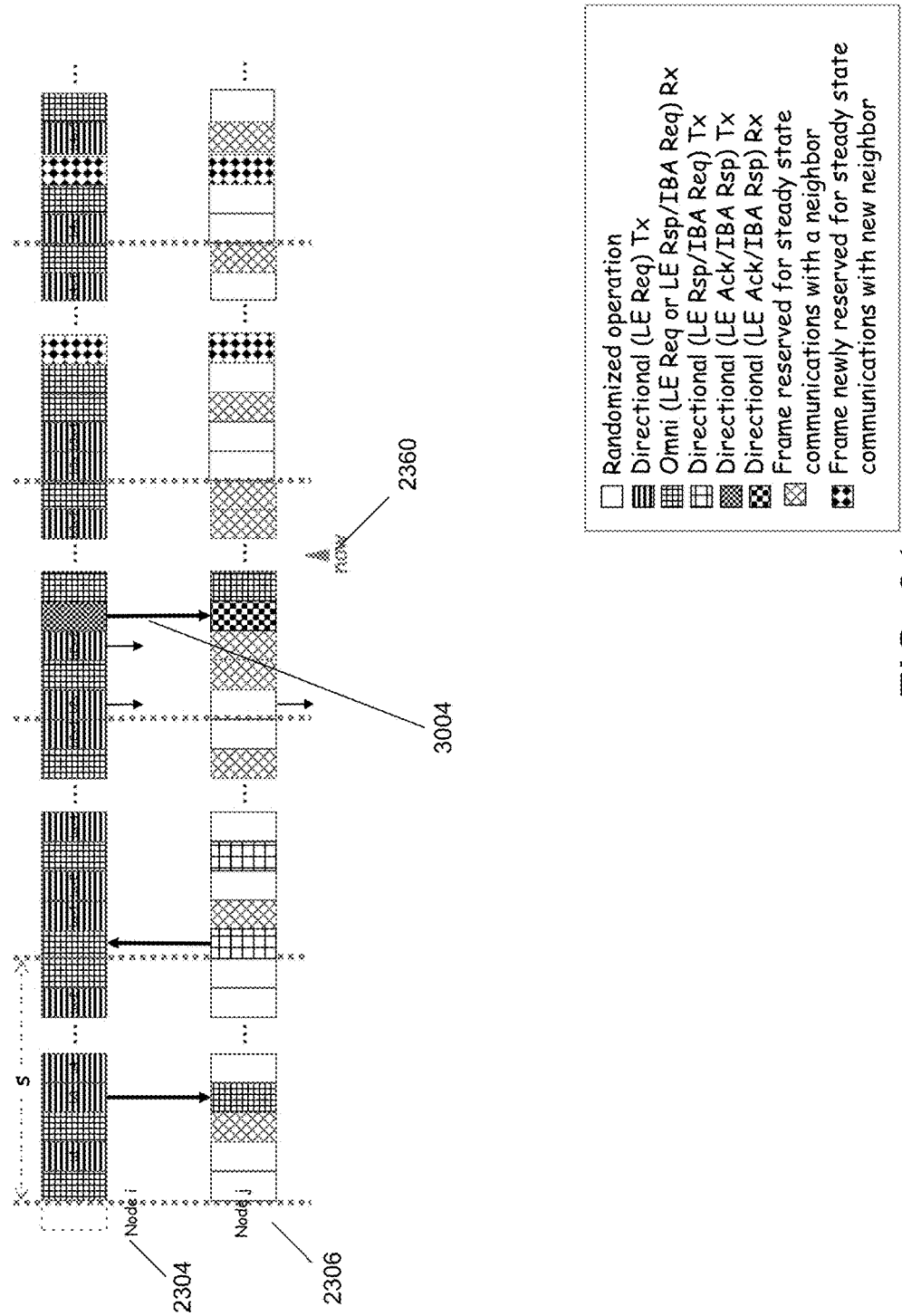
FIG. 31 illustrates an established link in accordance with an aspect of the invention.
Figure 32:
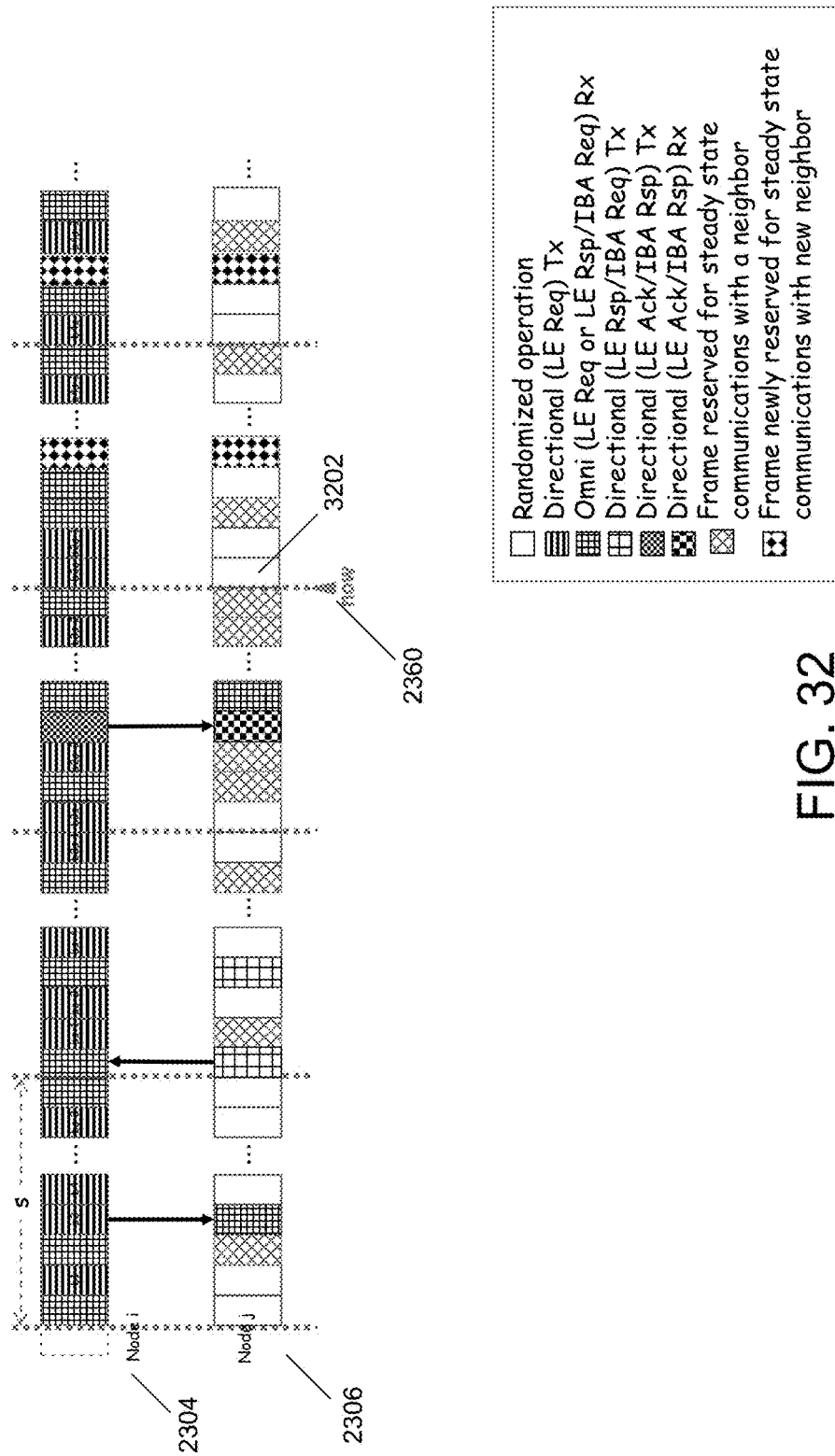
FIG. 32 illustrates a method of participating in additional instances of handshake with other discovered peers in accordance with an aspect of the invention.

As shown in FIG. 31, upon reception of node i's LE Ack/IBA Rsp 3004, the link is considered established from node j's point of view and its schedule with node i (2304) is also established at node j (2303). Regardless of any previously reserved communication opportunities with other peers, node j (2306) may participate in the handshake, establish the link, and coordinate bandwidth allocations with its newly acquired neighbor without disturbing or impacting the rest of the network Finally, FIG. 32 illustrates that upon completion of a subtemplate t at time reference (2360), nodes may randomly schedule any frames not reserved for steady-state communications (i.e., any idle frames) of subsequent subtemplate t+3 (not shown). For example, frame (3202) may be utilized as it is not reserved for steady-state communications. In an embodiment, all prior and those recently reserved frames for steady state communications are in place independent of the link establishment subtemplate patterns. Moreover, both nodes may participate in additional handshakes with other discovered peers.

In another aspect of the invention, a sectorized directional antenna may be used to increase reception range of a node. In an embodiment, a sector of the directional antenna may be activated for reception. The coverage of the signal may be approximately 90 degrees.

The following description along with FIGS. 33-53 describes an aspect of the invention using a sectorized directional antenna during network formation. The networking software implementation may be such that either omni-based or directional sector-based link establishment may be enabled via a configurable parameter in the site configuration database as well as through manual command at runtime.

In an aspect of the invention using sectorized directional reception, allocation of some of the reception frames may be necessary. The reception frames may be allocated specifically for receiving Link Establishment Requests (LE Req) and for receiving Link Establishment Responses (LE Rsp).

The receptions of a link establishment request may be in the opposite direction (reciprocal bearing) in which link establishment requests are sent within the same subtemplate, while the reception of a link establishment response may be as close to the same direction in which a link establishment request was sent in the previous subtemplate. Specifically, if the $B_{LE\ Req\ Tx} = f(FOD)$, it follows that $B_{LE\ Req\ Rx}$ = reciprocal of $f(FOD)$ which we'll denote as $\sim f(FOD)$, and thus $B_{LE\ Rsp\ Rx} = B_{LE\ Req\ Tx(in\ the\ previous\ subtemplate)} = f(FOD-s)$, where,
  $B_{LE\ Req\ Tx}$ is the bearing at which a Link Establishment Request is transmitted and is a function of frame of day when the transmission is to take place, or f(FOD),
  $B_{LE\ Req\ Rx}$ is the bearing at which a Link Establishment Request is to be listened for,
  $B_{LE\ Rsp\ Rx}$ is the bearing at which a Link Establishment Response is to be listened for, and s is the subtemplate length in unit of frames.

Because for Link Establishment requests heard during one subtemplate nodes respond during the subsequent subtemplate, the frame of day to use in determining the angle in which to point for receiving responses corresponds to that used to send requests in the previous subtemplate. Upon receiving a Link Establishment request, a responder node may know exactly where to point to transmit the response as it has knowledge of its own and the interrogator's position. The same applies for the direction in which the acknowledgement is to be sent as now the interrogator may also know the position of the responder. The initial bandwidth allocation protocol is "piggy-backed" onto the link establishment handshake.

Figure 33:
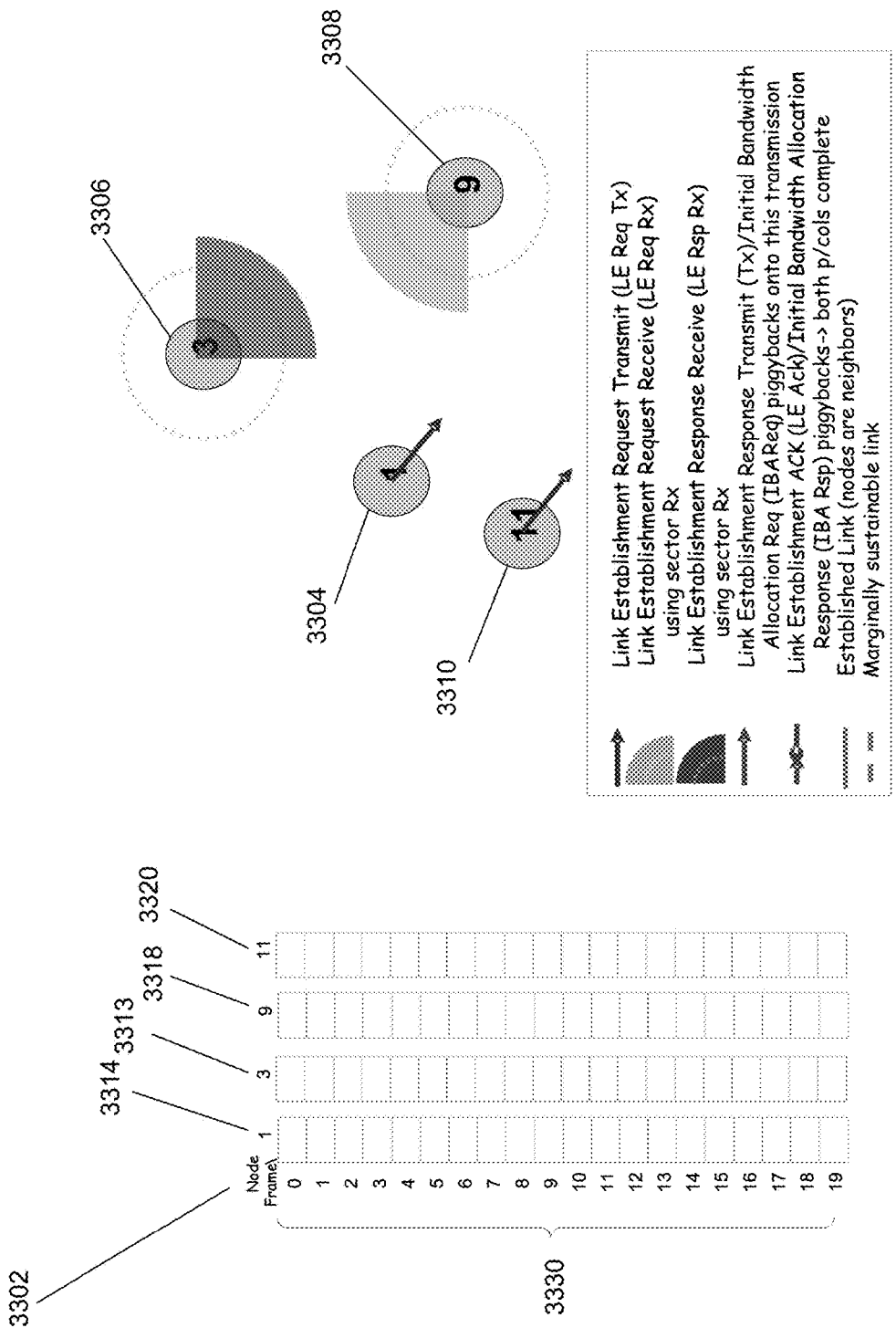
FIG. 33 illustrates nodes prior to network formation and steady-state schedule coordination in accordance with an aspect of the invention.

FIG. 33 illustrates nodes prior to network formation and steady-state schedule coordination in accordance with an aspect of the invention. In FIG. 33, a scheduled cycle (3302) is depicted for node 1 (3304), node 3 (3306), node 9 (3308), and node 11 (3310). The schedule cycle (3302) for the illustrated nodes begins with a pool (an array) of L idle frames (3330), where L is a configurable parameter. L may be based on empirical data, perhaps even starting with a schedule that is in the order of the legacy network's maximum schedule length. In an embodiment, L may be the length of one steady-state schedule cycle. As a link is established between two nodes, the nodes coordinate the frames within that array during which each node may transmit to the peer thus quickly and easily allocating the initial bandwidth between them. The initial bandwidth allocation (IBA) handshake may be conducted such that communications over each direction of the link are agreed upon without risk of conflicting reservations between a node and its multiple neighbors.

In FIG. 33, upon being powered "on," each of node's (3304-3310) steady-state schedules begins as a pool of L idle frames (3330). In the example of FIG. 33, twenty frames have been selected as the fixed length schedule (3302). In addition, an initial bandwidth allocation may be configured which may determine the number of opportunities a node may attempt to communicate with other nodes during a cycle of the steady-state schedule. In this example, the initial bandwidth allocation may be set to two attempts per schedule cycle.

As shown in FIG. 33, during a discovery scan nodes 1, 3, 9, and 11 (3304-3310) search for peers using a randomized subtemplate approach in which communications operations (transmissions—Tx vs. receptions—Rx) are randomized, while Tx bearings are a function of frame of day. For Rx operations, expected messages may also be selected randomly. The Rx bearings for the LE Req Rx may be the reciprocal to that of the LE Req Tx, and the Rx bearings for the LE Rsp Rx may be as close as possible to the bearings used when the LE Req was heard. Directional Rx may be done when the node is aware of the peer's position. In particular, FIG. 33 shows nodes 1 (3304) and 11 (3310) transmitting a link establishment request, whereas nodes 3 (3306) and 9 (3308) are waiting to receive a link establishment request.

Figure 34:
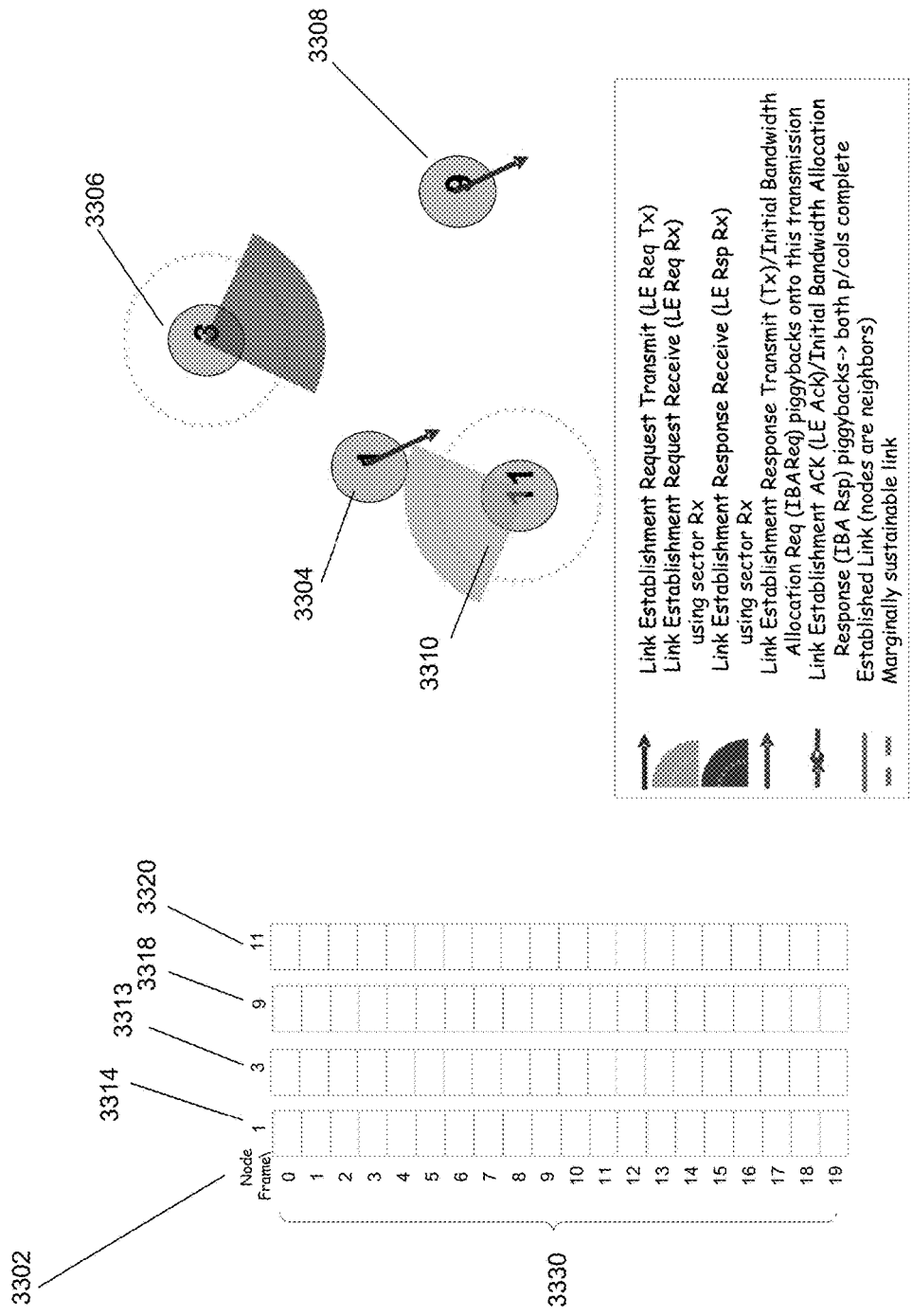
FIG. 34 further illustrates nodes prior to network formation and steady-state schedule coordination in accordance with an aspect of the invention.

FIG. 34 illustrates nodes prior to network formation and steady-state schedule coordination in accordance with an aspect of the invention. In FIG. 34, nodes 1, 3, 9, and 11 (3304-3310) continue to search for potential new neighbors while powered "on." The nodes may continue to search until powered "off."

Figure 35:
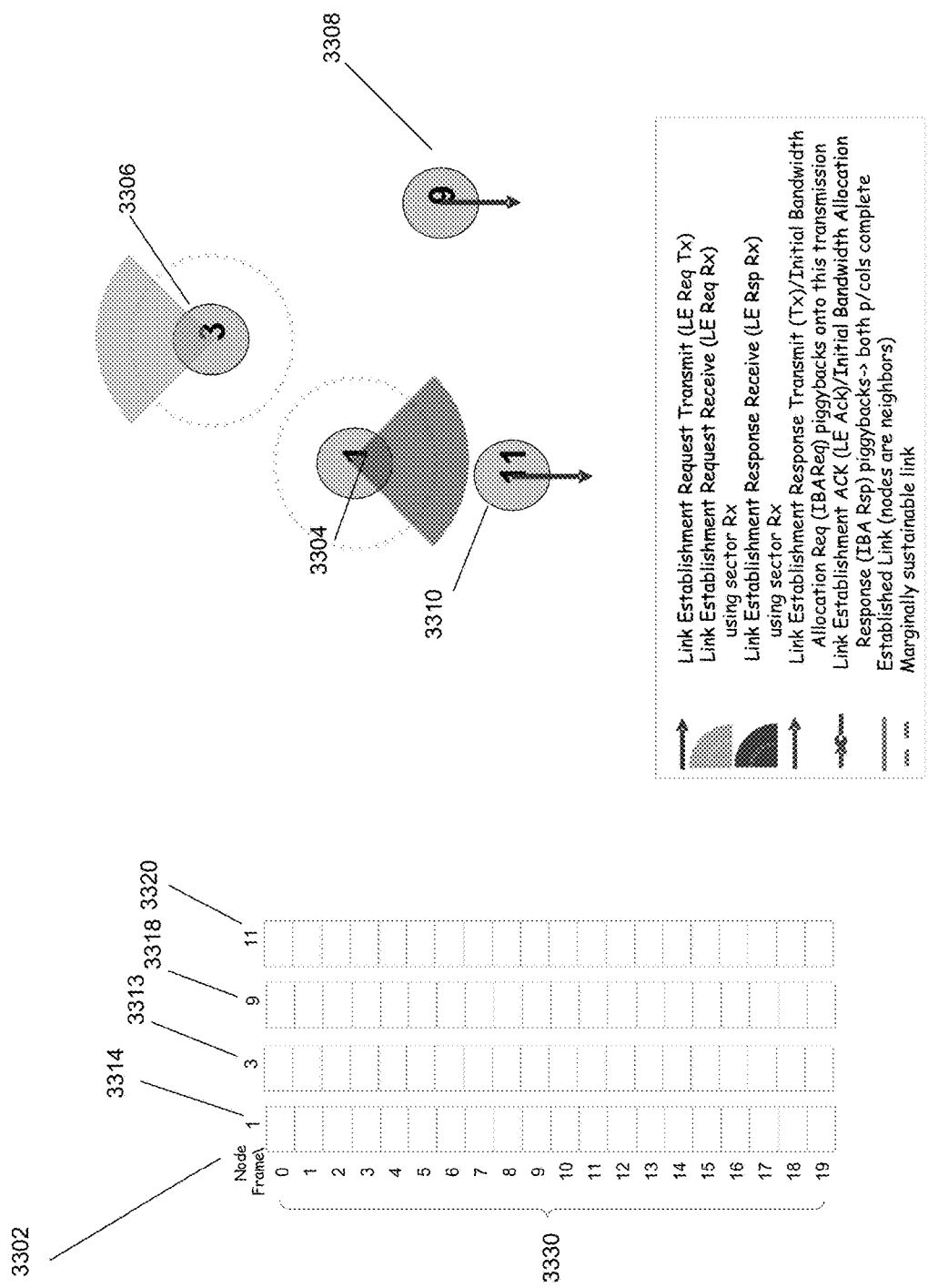
FIG. 35 illustrates nodes participating in a randomized discovery scan in accordance with an aspect of the invention.

FIG. 35 illustrates nodes 1, 3, 9, and 11 (3304-3310) participating in a randomized discovery scan in accordance with an aspect of the invention. As shown in FIG. 35 nodes 1, 3, 9, and 11 (3304-3310) may still be looking for peers to establish communications with via the randomized discovery scan. In FIG. 35, nodes 1 (3304) and 3 (3306) are waiting and listening for a link establishment request, whereas nodes 11 (3310) and 9 (3308) are transmitting a link establishment request.

Figure 36:
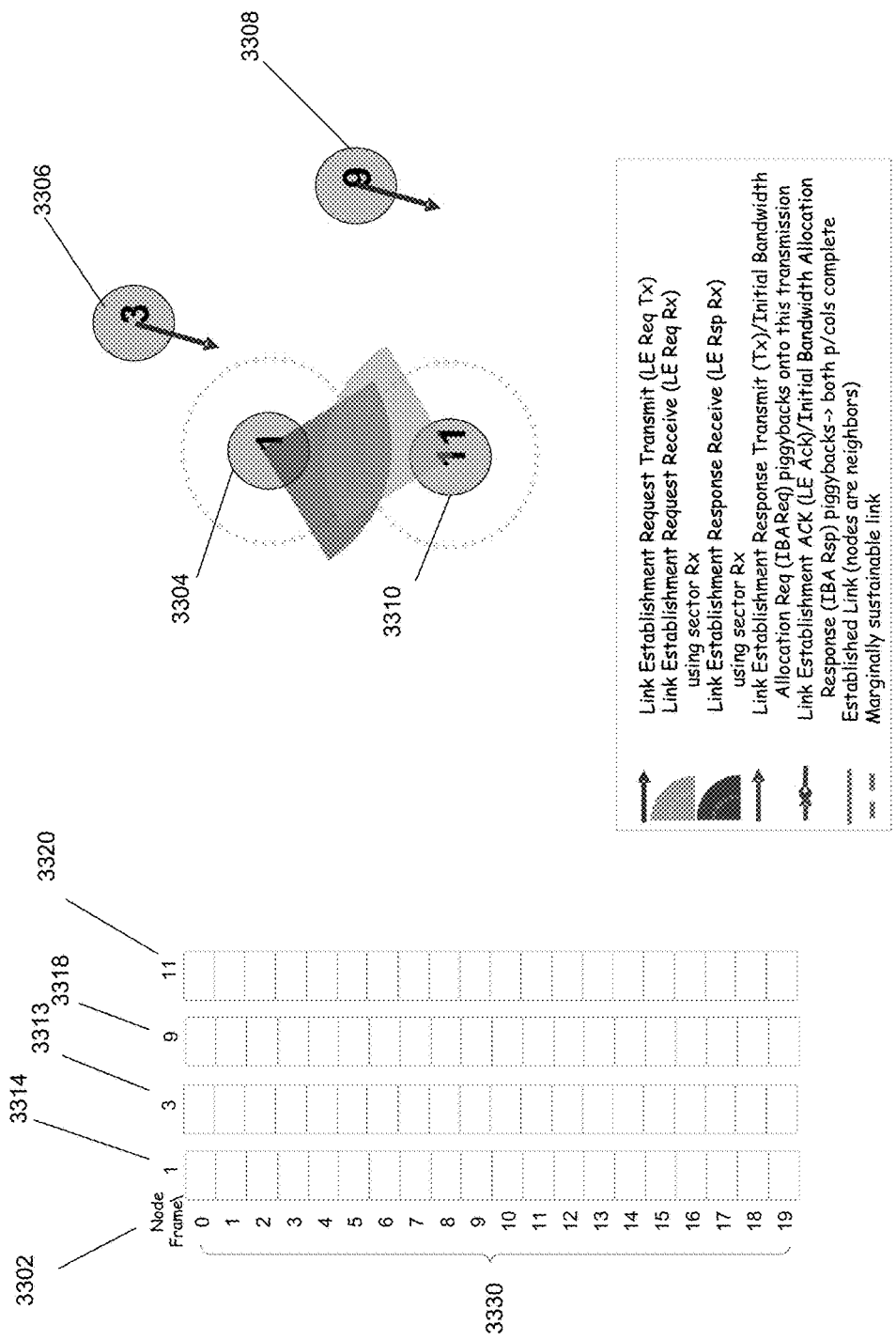
FIG. 36 further illustrates nodes prior to network formation and steady-state schedule coordination in accordance with an aspect of the invention.

FIG. 36 further illustrates nodes prior to network formation and steady-state schedule coordination in accordance with an aspect of the invention. In FIG. 36, nodes 1, 3, 9, and 11 (3304-3310) continue to search for potential new neighbors via a randomized discovery scan while powered "on." In FIG. 36, nodes 1 (3304) and 11 (3310) are waiting and listening for a link establishment request, whereas nodes 3 (3306) and 9 (3308) are transmitting a link establishment request.

FIG. 37 illustrates receipt of a transmission (3702) from node 3 (3306) to node 1 (3304) in accordance with an aspect of the invention. In FIG. 37, node 1 (3304) is in range to hear the link establishment request from node 3 (3306). The nodes may now transition to complete the link establishment protocol by coordinating time for completion of the exchange. In LE Req, node 3 (3306) may identify LE Rsp Rx frames in future subtemplate.

Figure 38:
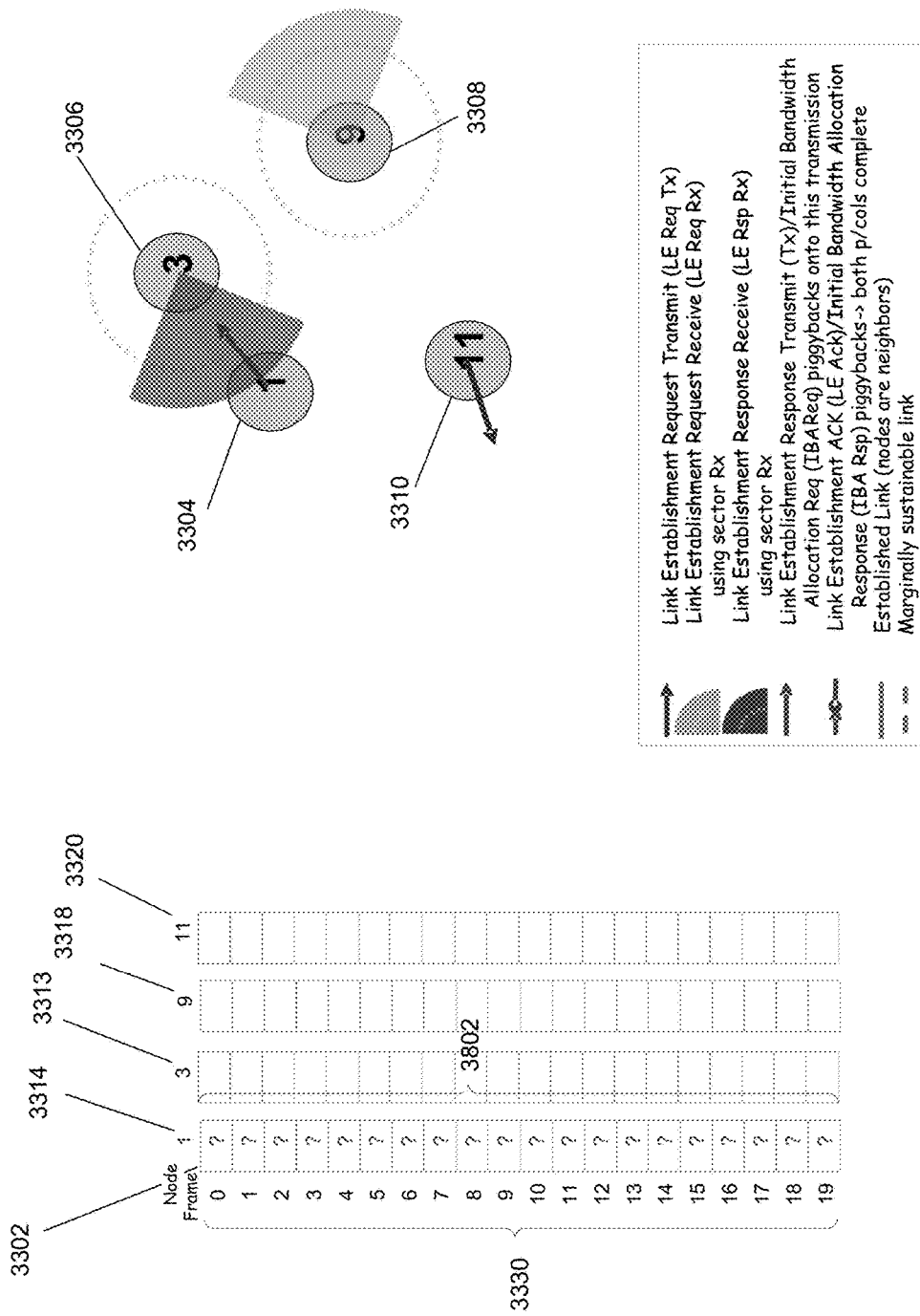
FIG. 38 illustrates selecting available response frames among those offered in accordance with an aspect of the invention.

In FIG. 38, node 1 (3304) selects available response frames among those offered some time in the near future. Node 1 (3304) responds with an LE response. In addition, node 1 (3304) may also initiate an initial bandwidth allocation (IBA) protocol with an IBA Req. In an aspect of the invention, node 1 (3304) may offer all of its idle frames 0-19 (3802) to node 3 (3306). The idle frames in FIG. 38 (3802) may be represented by question marks. During the exchange, nodes may exchange position information that may allow them to more precisely point at each other. The remaining nodes may continue to search for potential neighbors.

Figure 39:
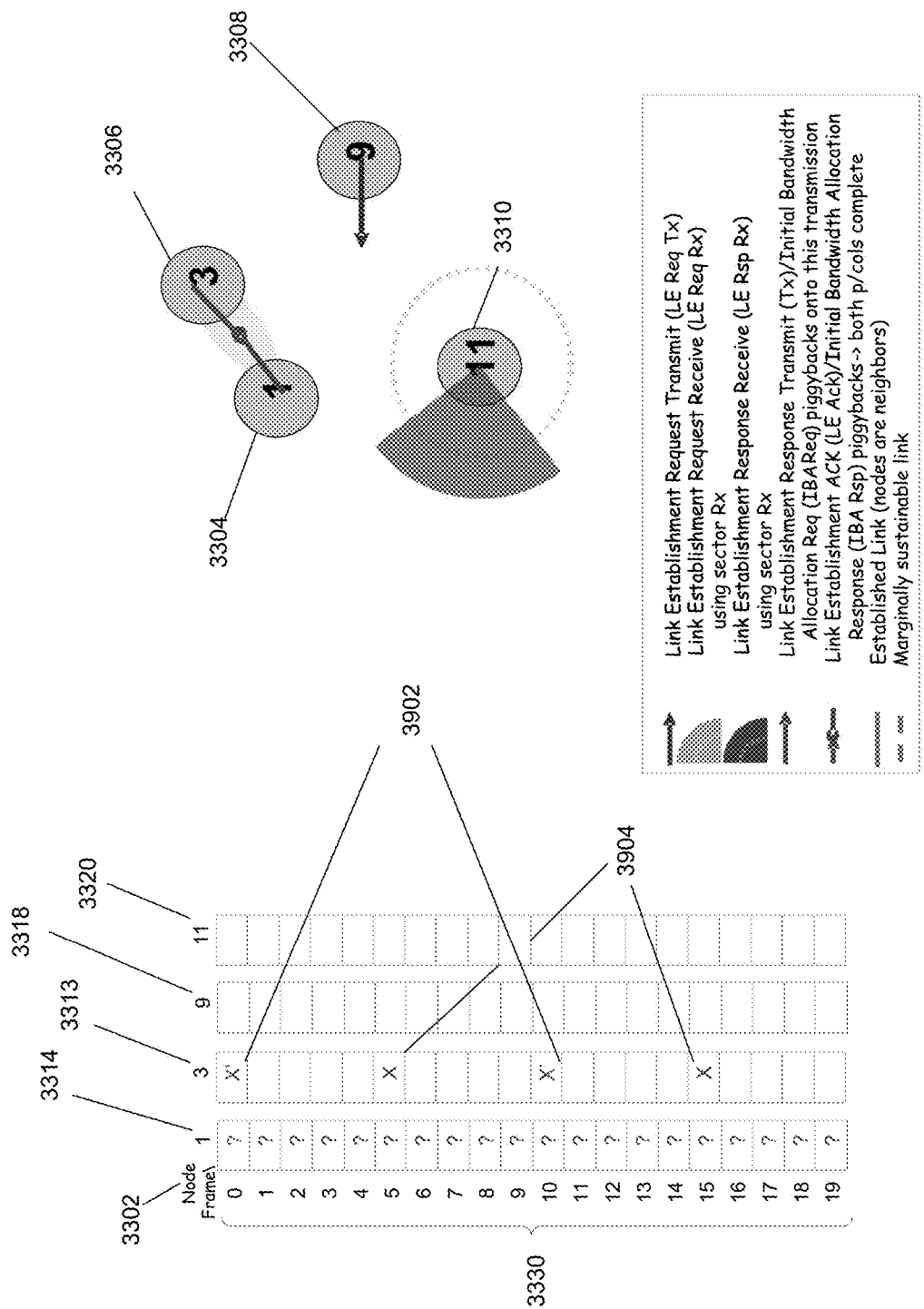
FIG. 39 illustrates completion of messages in accordance with an aspect of the invention.

In FIG. 39, node 3 (3306) sends its LE Ack along with its IBA Rsp to complete both protocols. The IBA Rsp may select a few common idle frames between its schedule and node 1's schedule to allocate initial bandwidth over both directions of the link with node 1 (3304). For example, node 3 (3306) may select frames 0 and 10 for transmission to Node 1 (3304) represented by X' (3902) and frames 5 and 15 for receiving information represented by X (3904) from node 1 (3304). Moreover, node 3 (3306) may strive to stagger like operations in order to satisfy maintenance cycle requirements. In an embodiment, the idle frames may be selected to level the transmission load and avoid jitter and/or latency problems.

Figure 40:
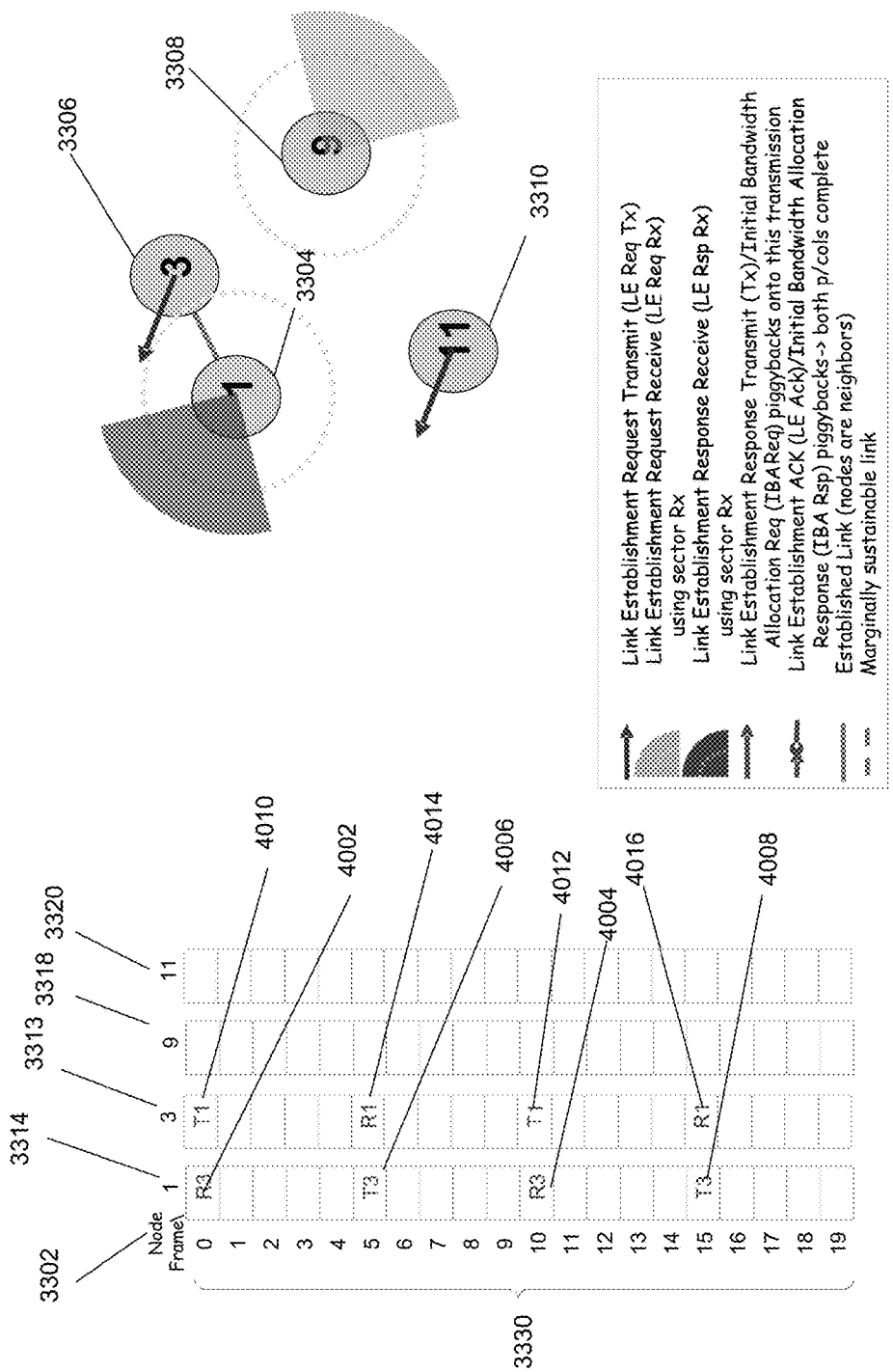
FIG. 40 illustrates nodes having coordinated their steady state communication opportunities between them in accordance with an aspect of the invention.

In FIG. 40, nodes 1 and 3 (3304-3306) have coordinated the steady state communication opportunities between them and have formed a network. The link may be maintained on a TDPA schedule. During time not reserved for steady-state communications with neighbors, nodes may continue to search for peers. For example, node 1 (3304) has reserved time frame 0 and 10 (4002 and 4004) for receiving information from node 3 (3306). In addition, node 1 (3304) has reserved time frame 5 and 15 (4006 and 4008) for transmitting information to node 3 (3306). Also, as shown in FIG. 40 node 3 (3306) has reserved time frame 0 and 10 (4010 and 4012) for transmitting information to node 1 (3304) and time frames 5 and 15 (4014 and 4016) for receiving information from node 1 (3304).

Figure 41:
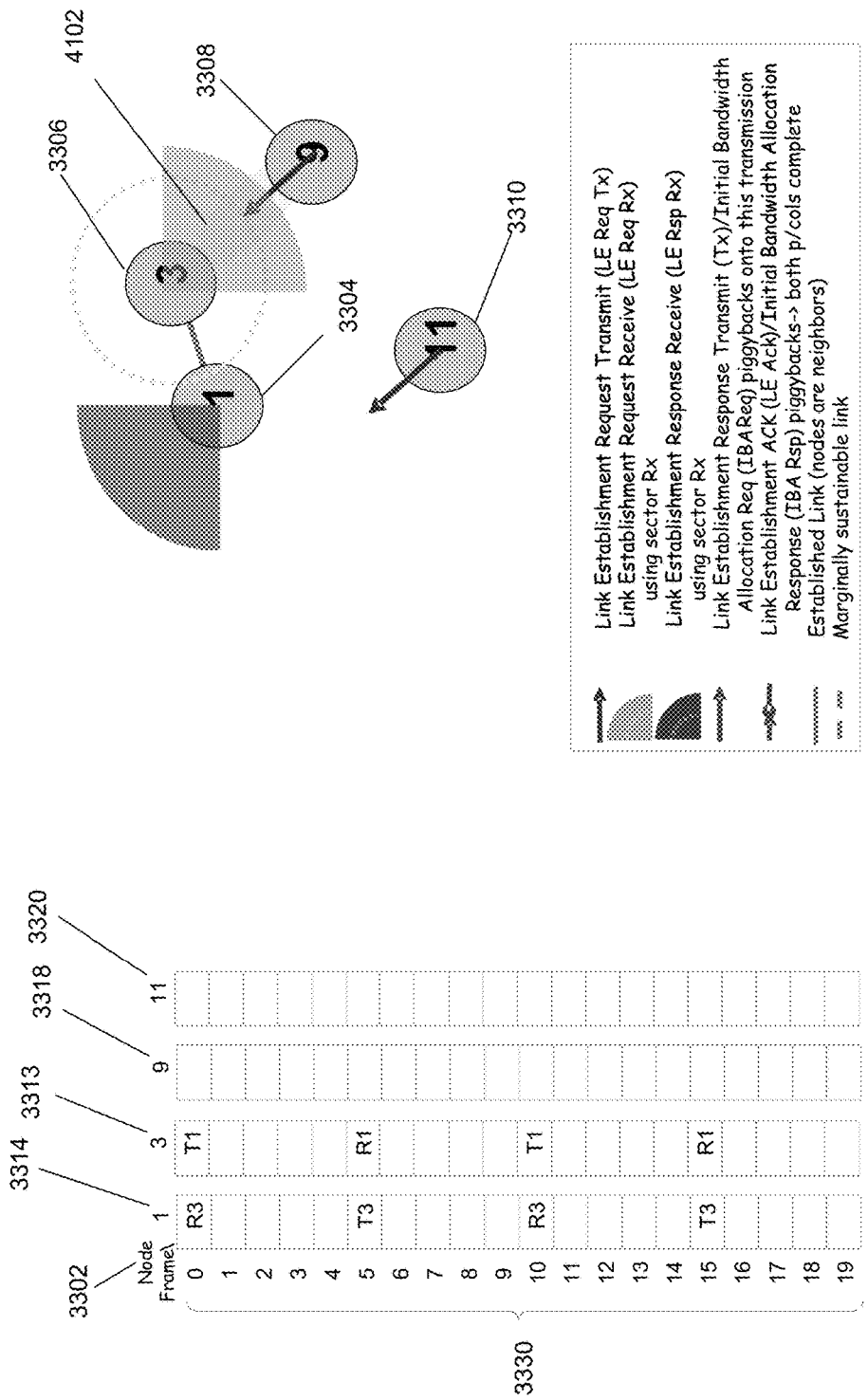
FIG. 41 illustrates further discovery of nodes in accordance with an aspect of the invention.

In FIG. 41, node 3 (3306) discovers (4102) node 9 (3308) in accordance with an aspect of the invention. Node 3 (3306) and node 9 (3308) are in range of each other and node 3 (3306) hears node 9's LE Req. Both nodes may now transition to complete the link establishment protocol by coordinating time for completion of the exchange. In the LE Req, node 9 (3308) may identify LE Rsp Rx frames in the next subtemplate.

Figure 42:
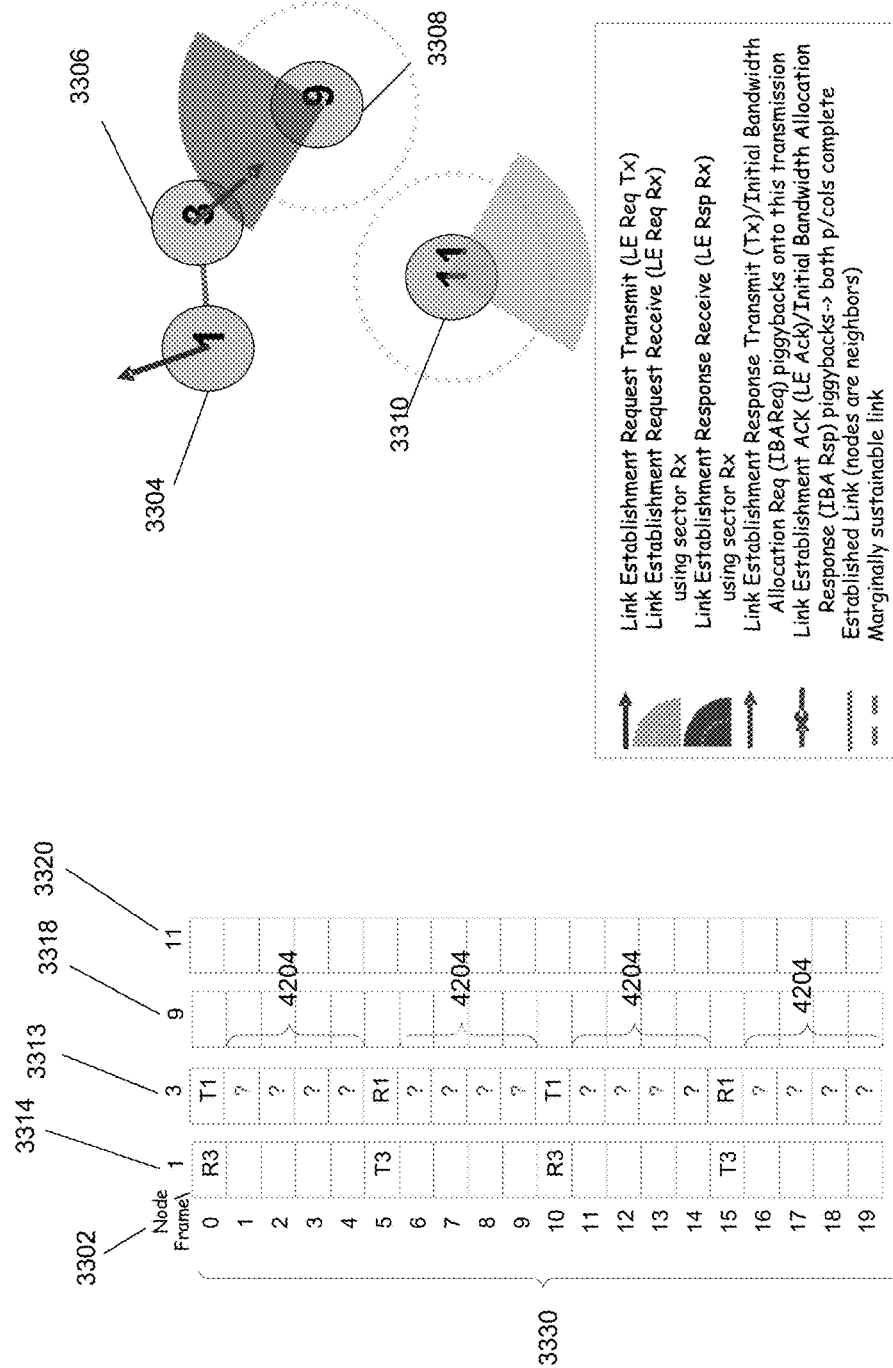
FIG. 42 illustrates selection of response frames in accordance with an aspect of the invention.

FIG. 42 illustrates that node 3 (3306) selects response frames among those offered. Node 3 (3306) responds with an LE Rsp and may also initiate the initial bandwidth allocation (IBA) protocol with an IBA Req. Node 3 (3306) may offer all of its idle steady state frames 4204 to node 9 (3308) in the IBA Req. During the exchange, nodes may have exchanged position information that may allow them to more precisely point at each other. In addition, other nodes such as nodes 1 (3304) and 11 (3310) may continue searching for potential neighbors.

Figure 43:
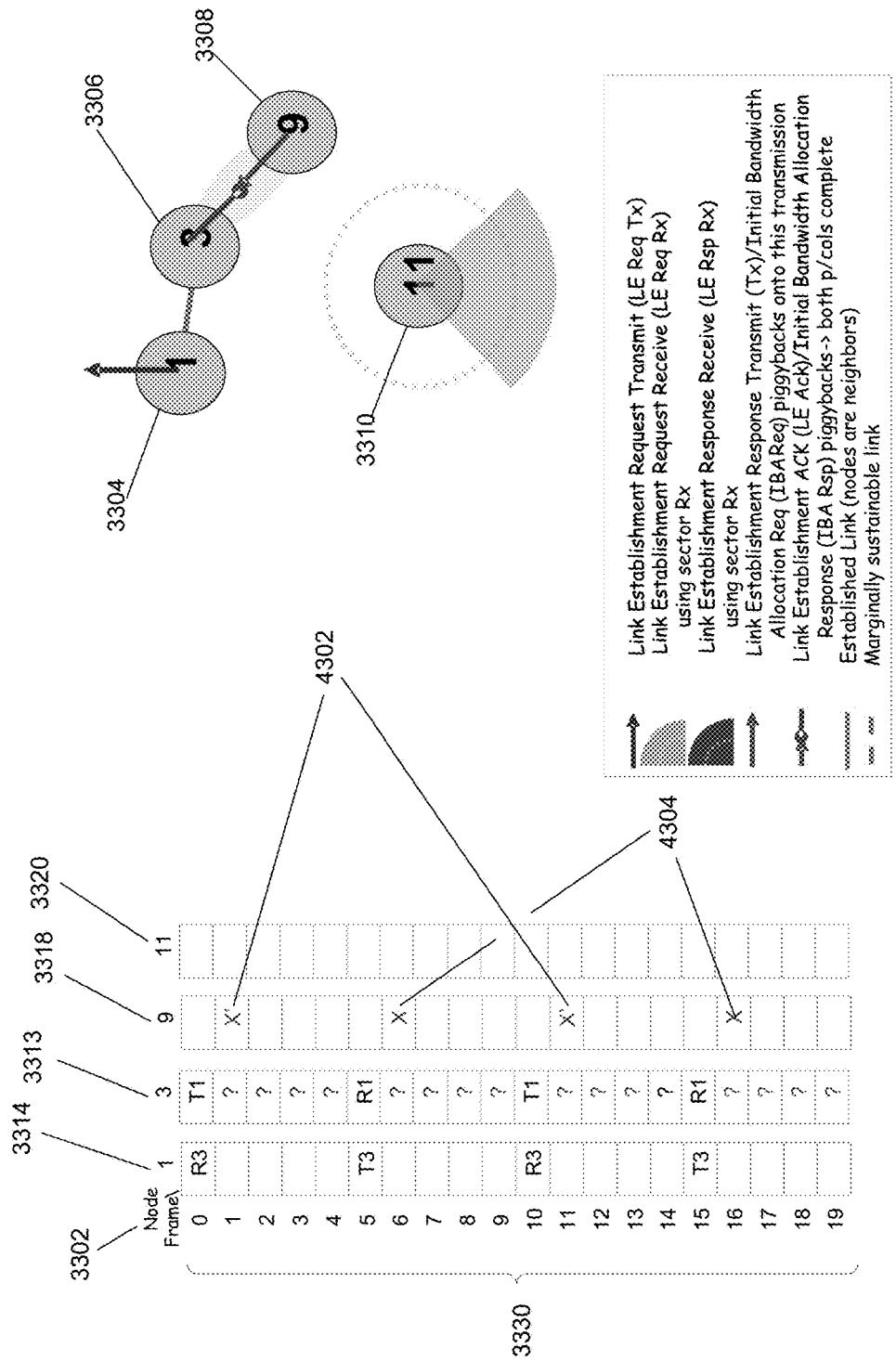
FIG. 43 illustrates the transmission of messages in accordance with an aspect of the invention.

In FIG. 43, node 9 (3308) may send its Le Ack along with its IBA Rsp to complete both protocols. The IBA Rsp may identify a few common idle frames between its schedule and node 3's schedule to communicate over both directions of the link with node 3 (3306). For example, node 9 (3308) may select idle frames 1 and 11 for transmission to Node 3 (3306) represented by X' (4302) and frames 6 and 16 for receiving information represented by X (4304) from Node 3 (3306). Moreover, Node 9 (3308) may strive to stagger like operations in order to satisfy maintenance cycle requirements.

Figure 44:
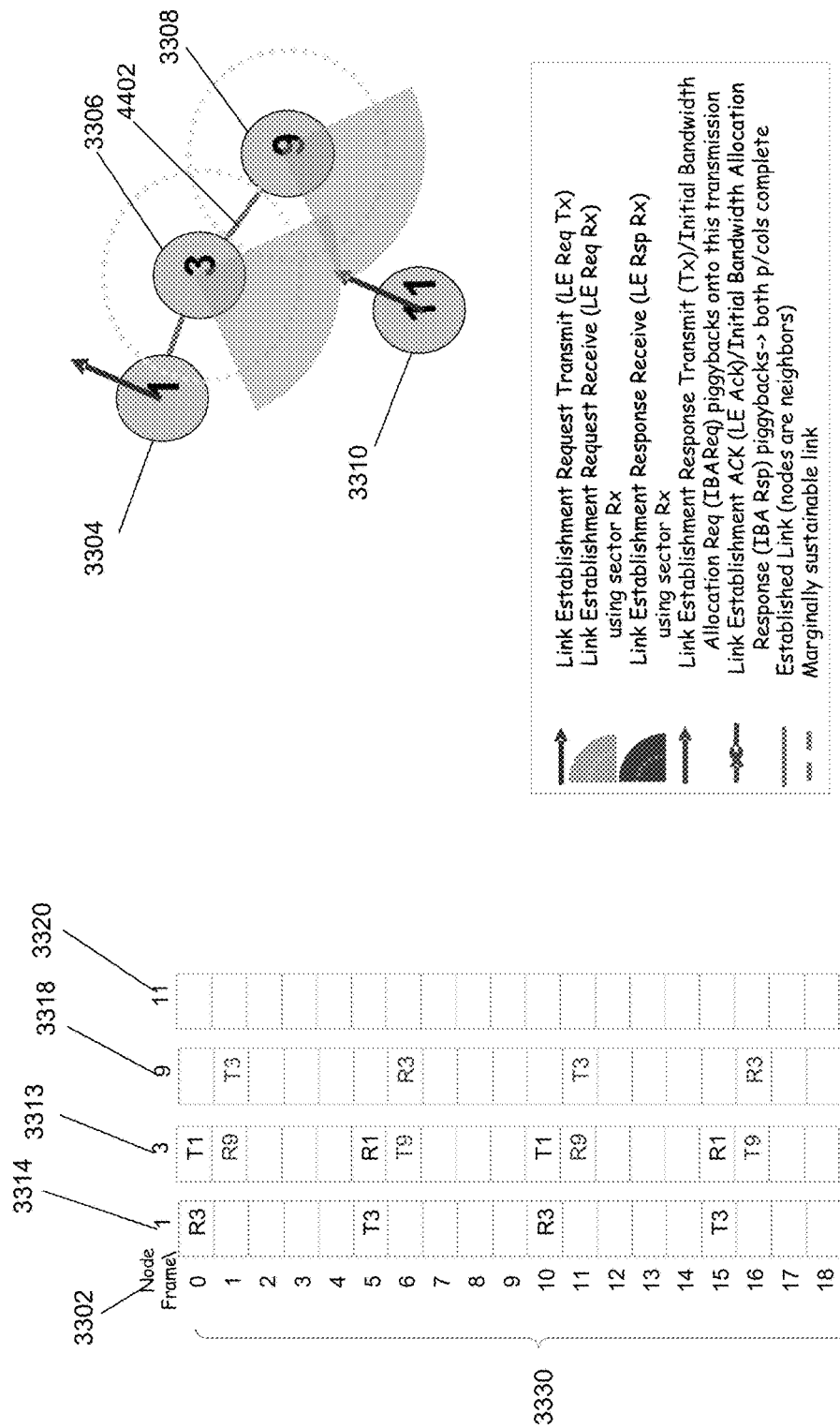
FIG. 44 illustrates the updating of nodes steady state schedules in accordance with an aspect of the invention.

Both nodes 3 (3306) and 9 (3308) have successfully coordinated their steady state communications opportunities between them and have become neighbors. The link 4402 may be maintained via steady state communications on a TDPA schedule as illustrated in FIG. 44. During time not reserved for steady-state communications with neighbors, nodes continue to search for peers. The process of network formation and steady-state schedule coordination may continue in a similar manner for nodes 9 and 11 and nodes 11 and 3. As illustrated above using a sectorized reception capability of a directional antenna, as link loads are monitored during steady state communications, bandwidth allocations may be updated independent of link establishments.

Figure 45:
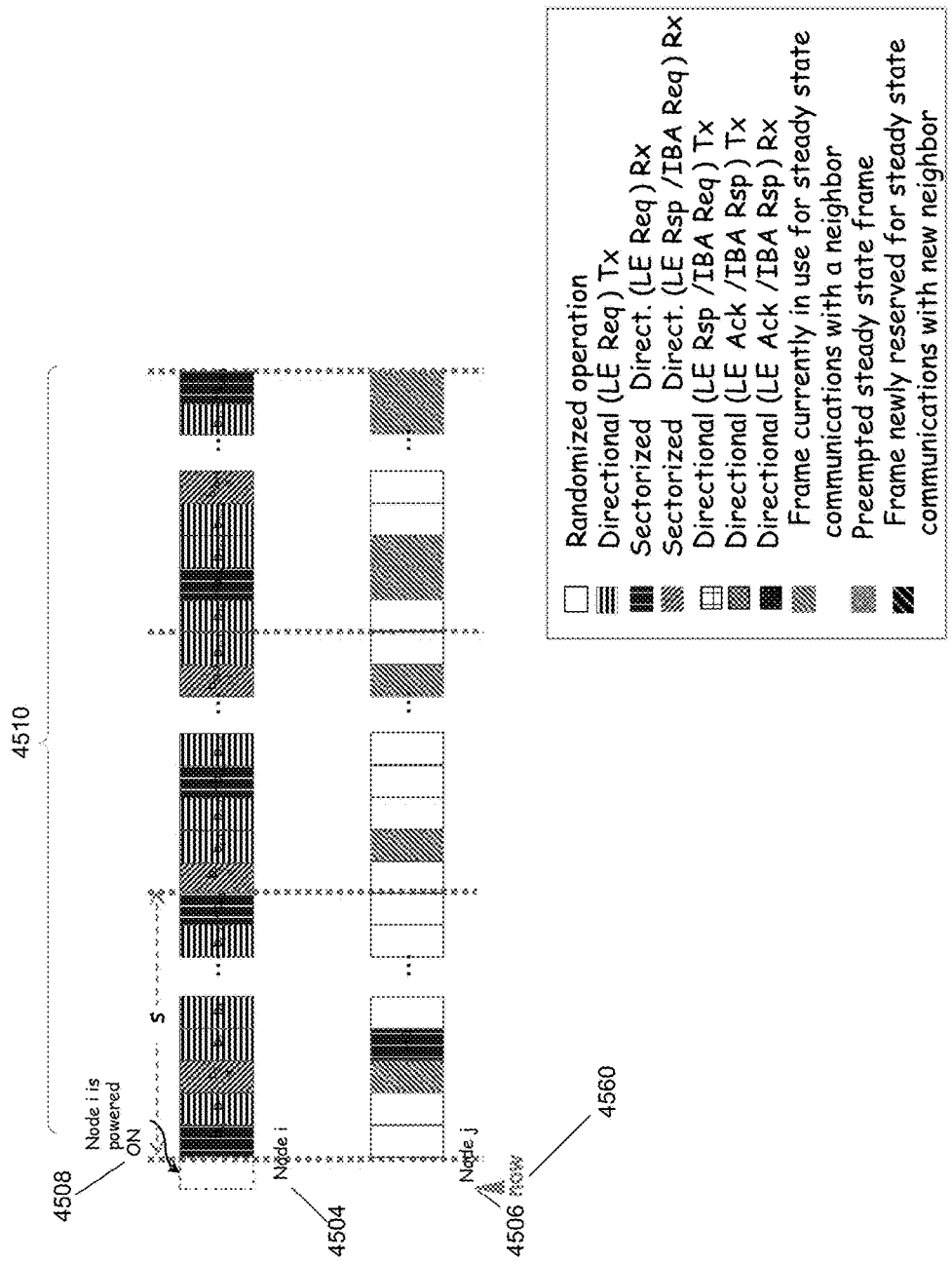
FIGS. 45-53 illustrate the use of sectorized directional reception and scheduling of the discovery scan in accordance with an aspect of the invention.

FIGS. 45-53 illustrate the use of sectorized directional reception and the scheduling of the discovery scan in accordance with an aspect of the invention. In FIG. 45, a node may be powered "on" and become operational. The node may participate in a discovery scan. For example, FIG. 45 illustrates two nodes: a node i (4504) and a node j (4506) wherein in node i (4504) is powered "on" (4508). Initially node i (4504) may schedule three random s-frame subtemplates (4510) of s frames each, where s may be at least the amount of time it takes for a node to turnaround a received message. The three subtemplates (4510) may be intended for use in either transmitting or receiving a link establishment request (LE Req) or a link establishment response (LE Rsp). The LE Rsp may also be piggybacked with an initial bandwidth allocation request (IBA Req). For illustrative purposes assume in FIG. 45 that node i (4504) is not aware of any other nodes on power up and node j (4506) is a node that is already part of an existing network. Furthermore, the arrow (4560) indicates a time reference to be used throughout the exemplary embodiment to depict time elapsing.

Figure 46:
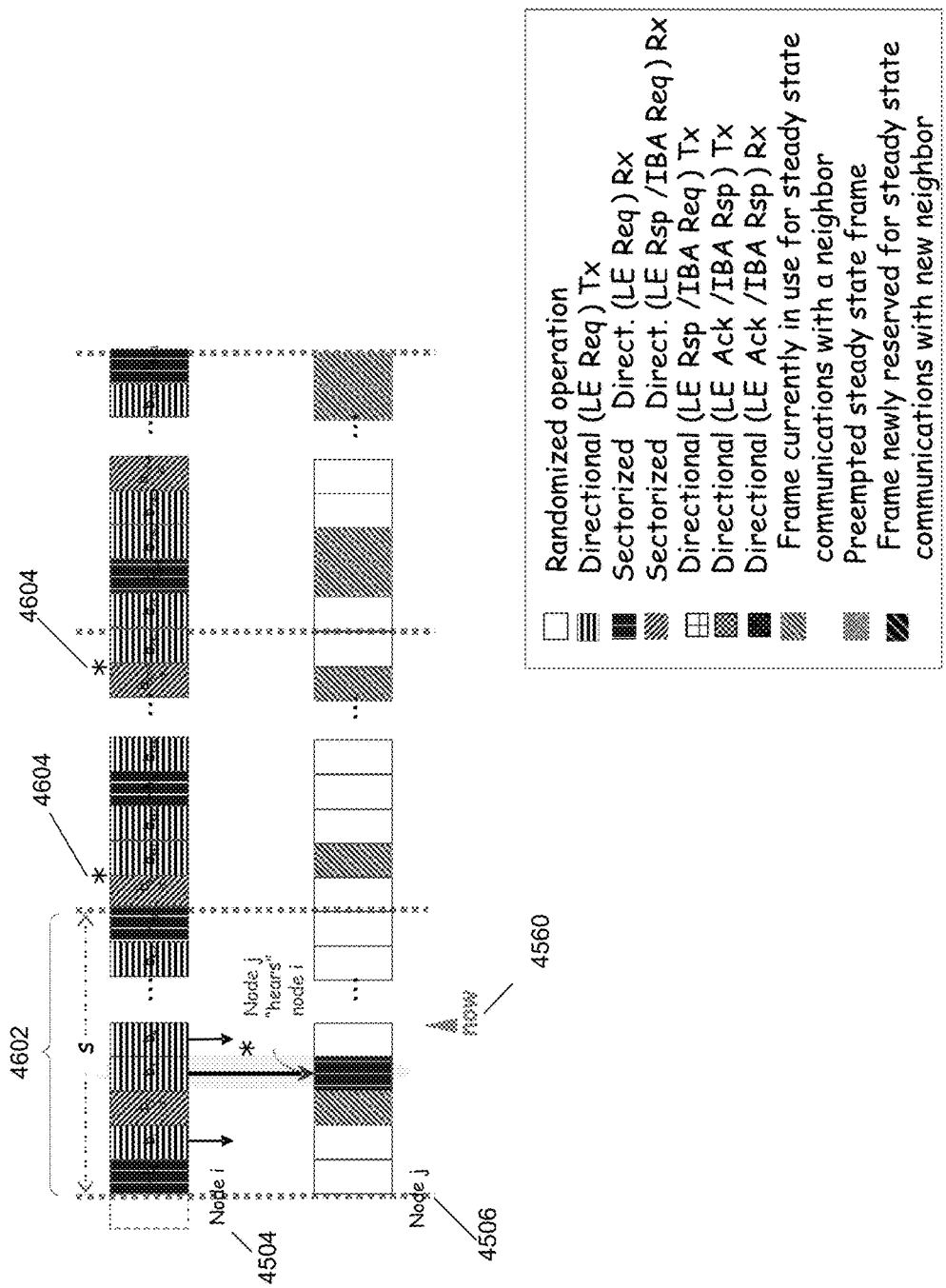
Figure 47:
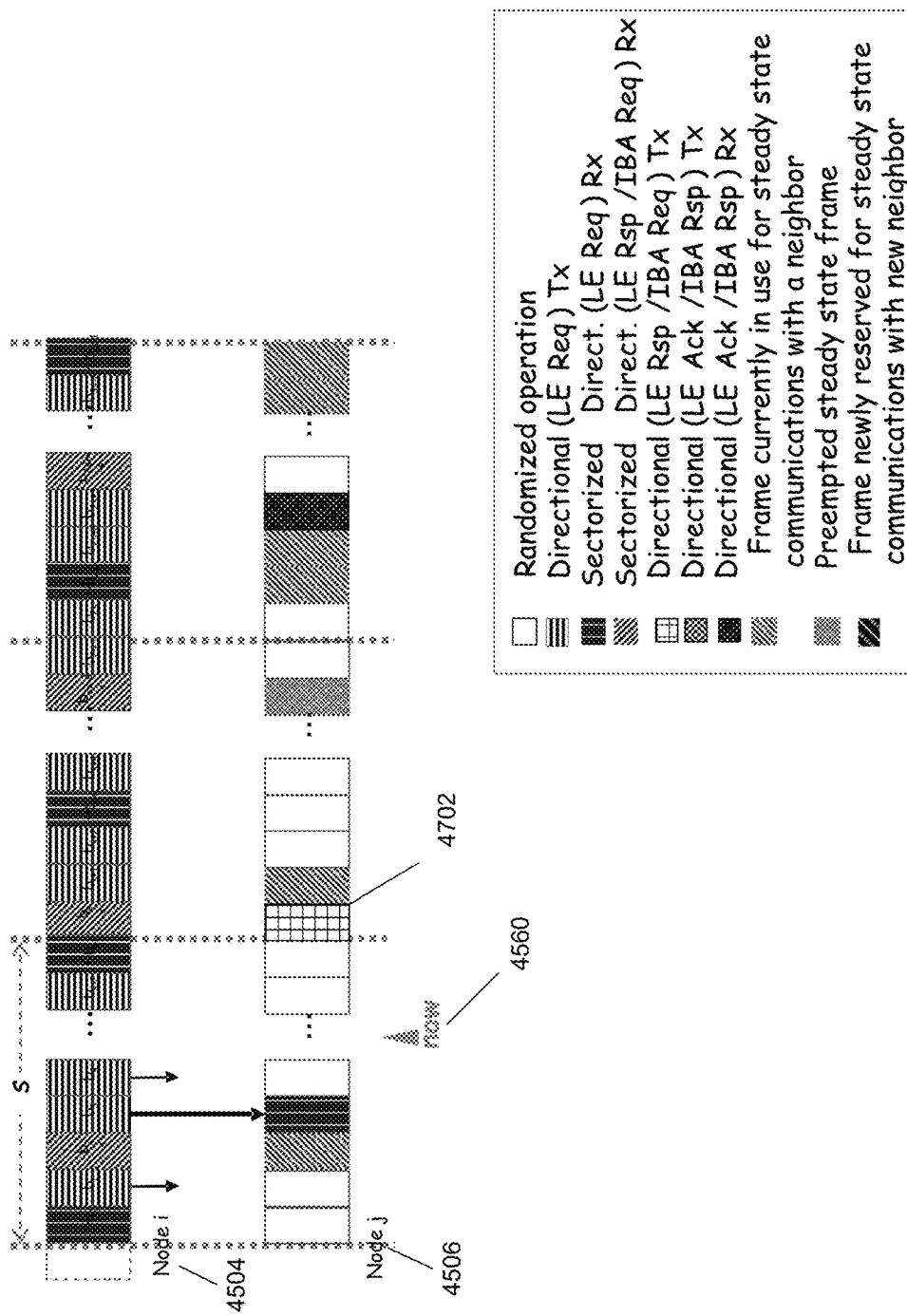

In accordance with an aspect of the invention, FIG. 46 shows that on all Tx frames of the first subtemplate 4602, node i (4504) sends a link establishment request (LE Req) in the direction given by FOD. Node i's transmitted LE Req identifies all LE Rsp Rx frames in the subsequent subtemplate as indicated by the asterisks 4604. Bearings assigned to LE Req Rx frames are reciprocal to those being assigned to LE Req Tx frames, hence on frame x of a subtemplate, $b_x$ denotes the bearing the LE Req transmitter would use while $\sim b_x$ denotes the bearing to use for LE Req Rx frames where $\sim b_x = b_x + 180$ normalized to [0,360]. Bearings assigned to LE Rsp/IBA Req Rx frames are in the same direction that the LE Reqs were transmitted in the previous subtemplate, hence on frame x of subtemplate y, $b_{x-s}$ is used, where $b_x$ is the bearing an LE Req transmitter would use at frame x of subtemplate y and s is the length of a subtemplate in frames FIG. 47 illustrates that node j (4506) which is participating in a network hears node i's LE Req and randomly selects n frames (4702) of those offered in the LE Req in which to respond with an LE Rsp in the next subtemplate. Node j (4506) may strive to avoid preemption of its own steady-state communication and overwrites whatever operations it had scheduled prior to receiving the LE Req. If all the frames offered in the LE Req are currently being used for node j's steady-state communications with its neighbors, then node j (4506) may preempt any frames for responding to node i (450404).

In an aspect of the invention, n may be a function of the maximum number of allowed neighbors and the number of Rx frames offered in node i's LE Req, where its minimum value may be 1. In the example, n=2 as depicted by the two frames that node j selects in which to transmit its response. Similarly, node j (4506) may also select one of its non-steady-state frames during the third subtemplate in which it is to point in node i's direction for receiving the third and last message in the link establishment handshake (as well as the piggy-backed last message in the initial bandwidth allocation handshake), an LE Ack/IBA Rsp. Node j (4506) may also look at its steady-state schedule so that it may convey to node i (4504) all of its idle frames within the steady-state communications schedule in the IBA Req.

Figure 48:
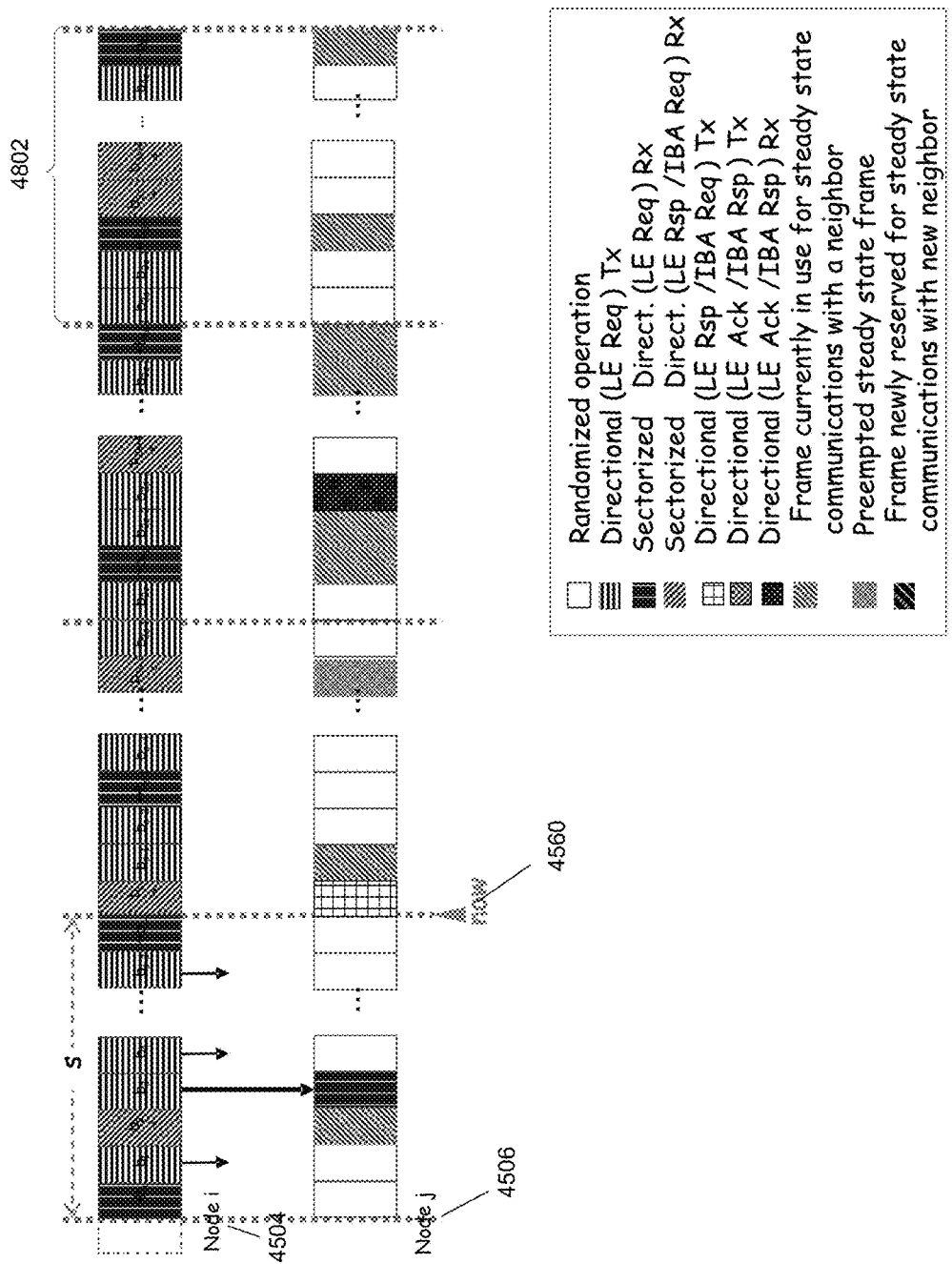

FIG. 48 illustrates that upon completion of a subtemplate t (reaching a subtemplate boundary) nodes randomly schedule any frames not reserved for steady-state communications (i.e., any idle frames) of subsequent subtemplate t+3. This gives nodes 3 s frames worth of look-ahead time. In an alternative embodiment, nodes may initially schedule 2 s-frame subtemplates and on every frame, schedule a new frame if not reserved for steady-state communications. For example, FIG. 48 shows a new subtemplate (4802) such that three subtemplates are prescheduled in advance.

Figure 49:
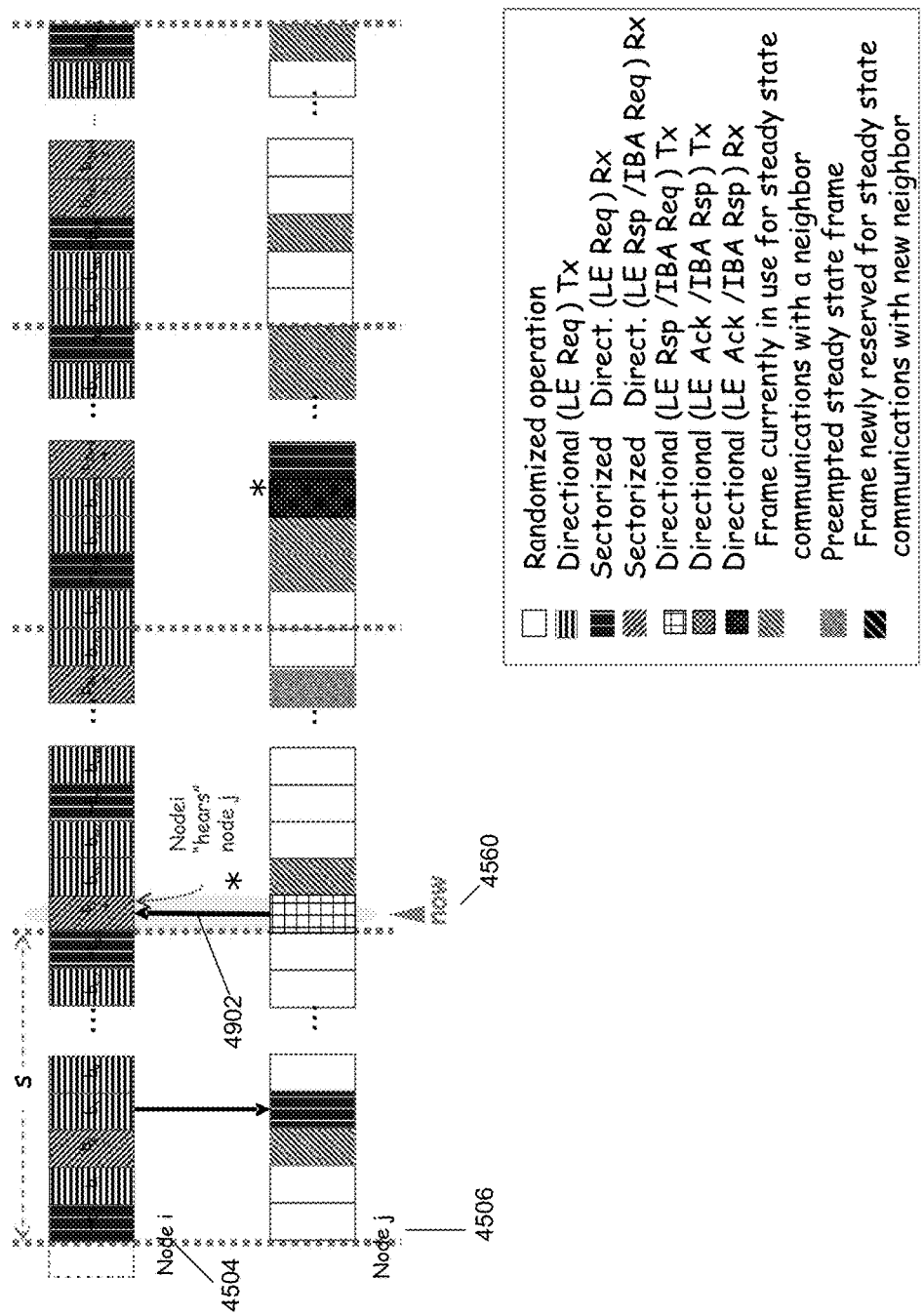

FIG. 49 illustrates that node j (4506) attempts to respond (with the LE Rsp/IBA Req 4902) on multiple opportunities on the frames that node j (4506) may have previously selected for responding to node i (4504). Node j (4506) may directly point toward node i (4504). To listen for responses, node i (4504) points in a direction that is close to that in which the LE Req that was heard by node j (4506) was sent. The LE Rsp conveys both the time in the subsequent subtemplate when node j (4506) is to be listening in node i's direction for its LE Ack/IBA Rsp, and the list of node j's idle frames within its steady-state schedule.

In an aspect of the invention, node i (4504) hears node j's LE Rsp/IBA Req (4902). Node i (4504) may ignore any subsequent responses and possibly LE requests from node j (4506) except maybe to update its knowledge of node j's position and thus its pointing angle toward node i (4504).

Figure 50:
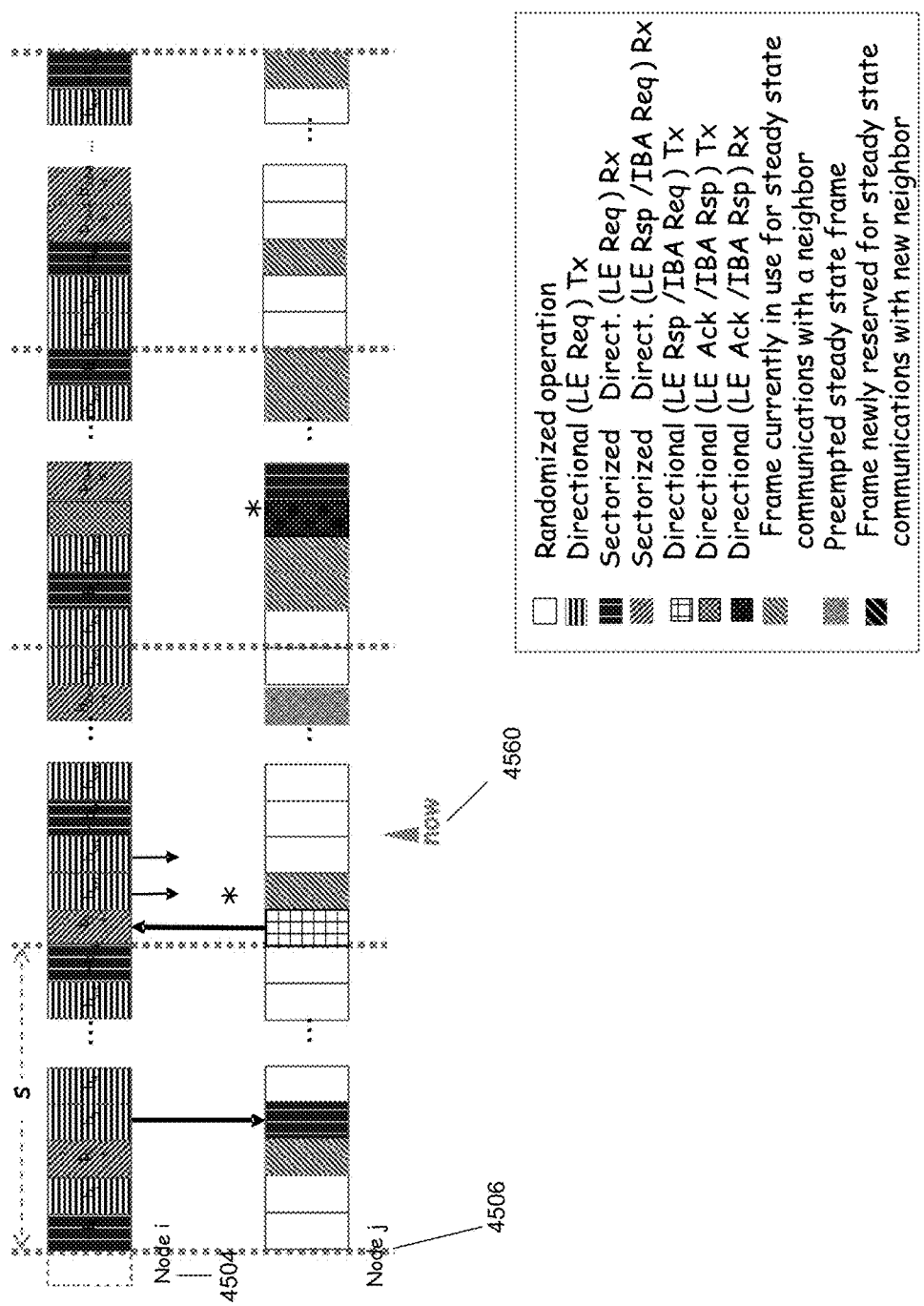

FIG. 50 illustrates that node i (4504) may now be aware of when node j (4506) may be listening in its direction and may point directly at node j (4506). Node i (4504) may look at its steady-state schedule and select 2*d frames that are commonly idle with those offered in the IBA Req, where d is the configured link load representing the initial bandwidth allocation which should correspond to at least the link maintenance rate. In an embodiment, d of those frames may be used for node i (4504) to transmit to node j (4506) and the other d may be for node j (4506) to transmit to node i (4504). Thus, the steady-state communications schedule between nodes i (4504) and node j (4506) is being coordinated (d frames are reserved for each direction of the link).

In addition, node i (4504) may reserve the opportunity within the subtemplate to transmit the LE Ack/IBA Rsp. In one aspect of the invention, if node i (4504) were also participating in a network, node i (4504) may have to preempt a steady-state communication frame, but only for this subtemplate.

Figure 51:
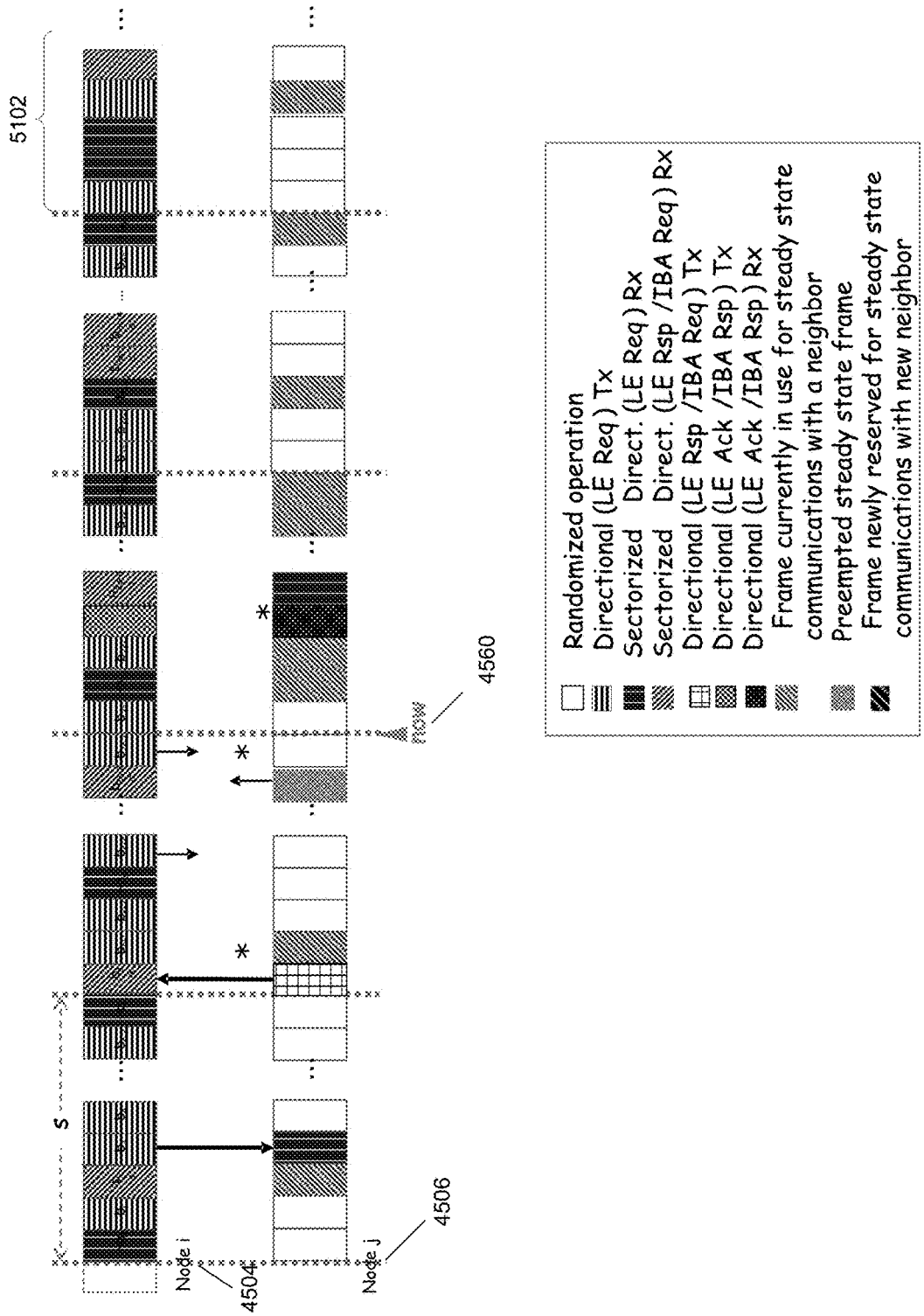

FIG. 51 illustrates that once again upon completion of a subtemplate, nodes randomly schedule any frames not reserved for steady-state communications (i.e., any idle frames) of subsequent subtemplate t+3. This gives nodes 3 s frames worth of look-ahead time. For example, FIG. 51 shows a new subtemplate (5102) such that three subtemplates are prescheduled in advance.

Figure 52:
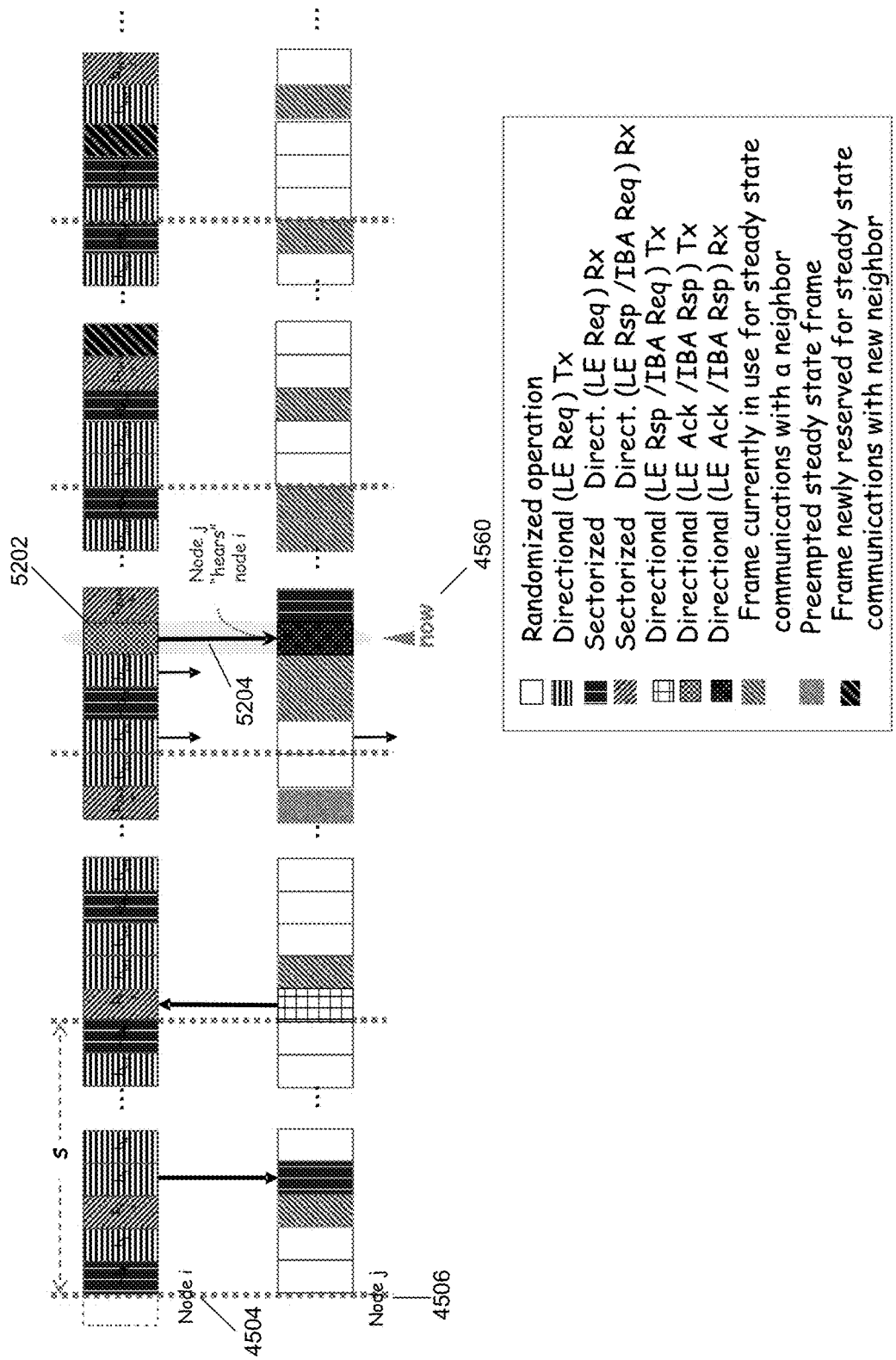

FIG. 52 illustrates that at the expected frame (5202), node i (4504) transmits a LE ACK/IBA Rsp (5204). The link may be considered established from node i's point of view and its schedule with node j (4506) may also be established at node i (4504). Node i (4504) may transition to use its steady-state communication opportunities with node j (4506) within the next subtemplate time interval.

Figure 53:
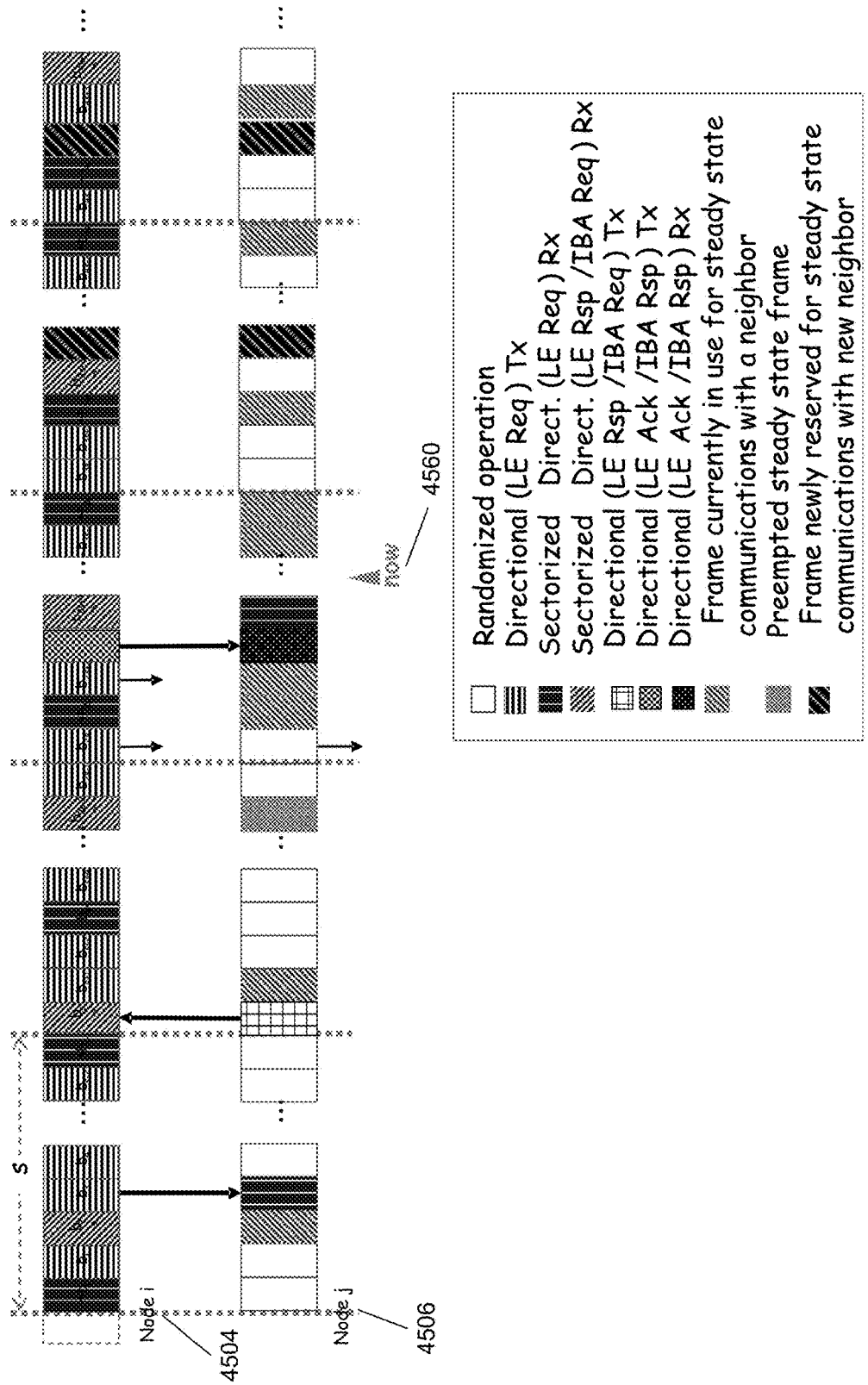

As shown in FIG. 53, upon reception of node i's LE Ack/IBA Rsp, the link is considered established from node j's point of view and its schedule with node i (4504) is also established at node j (4506). Regardless of any previously reserved communication opportunities with other peers, node j (4506) may participate in the handshake, establish the link, and coordinate bandwidth allocations with its newly acquired neighbor without disturbing or impacting the rest of the network.

Adaptive Component of Medium Access Control

In the event that during link establishment and initial bandwidth allocation, no set of common idle frames are found such that the even staggering of communications for satisfaction of the maintenance schedule cycle can be accommodated, the entire handshake may be considered unsuccessful. In this event, a mechanism may be put in place such that nodes may re-allocate bandwidth to other peers in order to "free" other frames within the cycle that will allow the previous link establishment attempt to succeed in a future attempt. Specifically, a node knowing the idle frames of a peer with which it recently attempted to establish a link, looks at its own schedule to determine which peers' allocation may be shifted.

Utilization of bandwidth may be averaged through the use of a link load monitoring cycle to prevent oscillation between allocations for varying instant traffic loads. Upon detecting the need to change the bandwidth allocated to a neighbor, a node may initiate a protocol with the neighbor so that the two nodes may coordinate changes to their local schedules. This may entail the addition or deletion of communication opportunities. Upon successful completion of the protocol, two nodes may immediately begin using their updated local schedules and thus in the event of increased bandwidth from a node to a neighbor, achieve prompt relief in that the amount of data previously sitting in the queue waiting to be sent to the neighbor may be sent, and any data that would follow would not need to be discarded because the new allocations would suffice. If instead, bandwidth allocations need to be decreased, the resulting deletion of communication opportunities would provide the two nodes involved additional idle frames to possibly use later for increasing the bandwidth allocation to another neighbor if needed.

Whenever the desired allocations may be accommodated within the current schedule, the resulting changes only affect the two nodes involved and have no effect on the schedules being followed by any other nodes in the network and may for this reason, be applied quickly without requiring network-wide coordination.

To determine whether or not the current bandwidth allocation is sufficient or excessive for the amount of data waiting to be sent to each neighbor, each node may periodically monitor the ingress data rate, i.e., the number of bytes being placed in the outbound queue corresponding to each neighbor over the length of the monitoring period. Specifically, as a node sources or receives a frame of data to be forwarded, it places it in the Data Link Layer's outbound queue corresponding to the neighbor that represents the next hop in the path toward the data's destination. To do this, an ingress byte counter for each neighbor's queue may be reset at the beginning of each load monitoring cycle and subsequently incremented by the size of the data being placed in the queue during its duration. As a frame is then transmitted (i.e., the data is removed from the queue for delivery), another counter may be kept to track the egress data rate which would be incremented by the size of the data being sent out.

For a node to determine the actual bandwidth allocated to each neighbor it may be aware of the following: the number of transmissions to that neighbor within a steady-state schedule cycle (or current load), the steady-state schedule cycle length, the data rate being sustained over that direction of the link, the duration of a frame, and the length of the monitoring period. To facilitate the computation of the ingress data rate and of bandwidth allocation, the length of the load monitoring cycle k may be a multiple of the schedule cycle length, where k>=2 when d=1, but k>=1 otherwise. This may allow for the bandwidth allocation update protocol that may be initiated at the end of a monitoring cycle to complete, which could take up to approximately 1.5 maintenance schedule cycles, before possibly triggering another instance of the protocol. By making this value a configurable resource, it may be fine-tuned to enhance network performance. Furthermore, while the protocol is conducted, monitoring should be disabled, because the "relief" being provided via the bandwidth allocation update protocol is not yet in place until the protocol completes.

From knowledge of the local schedule, each node may be aware of the number of transmissions to each neighbor i currently within a cycle or current load, (cTx_cnti). This value may in fact be initialized to the configured initial link load. Given the data rate currently being sustained over the link to each neighbor and the duration of a frame, the node may also calculate the current capacity of the link as the amount of data that may be sent in one frame (in one transmission) to each neighbor i. In other words, the link's data rate may be expressed in units of bytes per frame as $$doi=dr*f/8$$

where,
doi is the amount of data sent in one frame (in bytes per frame),
dr is the link data rate (in bits per second), and
f is the frame duration (in seconds per frame)

At the end of the load monitoring cycle, the ingress byte counter mentioned above, (iByte_cnti), reflects the number of bytes deposited into the queue for neighbor i for the duration of one monitoring cycle, compensated for the overhead that is to be added in the form of header/control information. This measure of overhead may be determined from previous monitoring periods and provides merely an estimate, as the actual size of the overhead is not known until the data is actually packaged.

Specifically, $$iByte\_cnti=NL\_Byte\_cnti+overhead$$

where,
NL_Byte_cnti is the byte count being deposited in the queue for neighbor i, and
overhead is the estimated amount (perhaps a running average) of header/control data to be added once the data is packaged to go out, To obtain the number of transmissions within a schedule cycle necessary to support that ingress data rate, a node uses the value in this counter, the data rate over the link, and the number of schedule cycles (k) within a monitoring cycle. The difference between what results and the number of transmissions currently in place within the schedule may yield the number of transmissions that if added, would have allowed for any data left in the queues to be sent. Namely, $$dTx\_cnti=\text{ceiling}[(iByte\_cnti/(doi*k)]-cTx\_cnti$$

where,
dTx_cnti is the number of transmissions to neighbor i to be "added" into the schedule cycle in order to meet its bandwidth demands (in frames),
iByte_cnti is the amount of data deposited into the queue for neighbor i during the monitoring cycle (in bytes),
doi is the amount of data that can be sent over the link in one frame (in bytes), and
k is as defined above.

It may be evident to those skilled in the art that the difference dTx_cnti may reflect a negative value, indicating that bandwidth is being underutilized, and thus the allocation to that particular neighbor may be reduced by removing transmissions from the schedule. A difference of 0 may reflect that the bandwidth allocation to a neighbor is just right and that the amount of data being placed in the queue should be successfully sent over the link. A positive value may indicate that the current bandwidth allocation is insufficient for the amount of data waiting to be sent out. In general, each observed difference value may reflect the number of transmissions to a neighbor that may be added/deleted to/from the two nodes' current local schedules. This does not present any problems in the event that transmissions are to be deleted, because that change may be readily accommodated at both nodes by making previously reserved communications into idle frames. However, for the case in which transmissions are to be added, there exists an issue of finding a sufficient number of common idle frames with the neighbor in order to change them into communication operations as explained below.

Whenever the observed value of dTx_cnti is non-zero, all the above parameters may be recorded for post-testing analysis and debugging purposes. The determination of the difference dTx_cnti can be made based on a fixed schedule length. In the event that the schedule is densely populated, or that the need to increase the allocation of bandwidth applies to numerous neighbors, it may eventually be increasingly difficult for the nodes involved to find enough common idle frames between them to accommodate all the desired updates, and thus a larger schedule may be required (i.e. schedule length would necessarily increase).

The use of the ceiling function in the equation in effect "rounds up" to the nearest whole transmission resulting in bandwidth allocation requests that indicate the need for the exact bandwidth or more than is actually needed.

Lastly, in the event that the desired relief can only be partially accommodated (i.e., only partial success of the update is possible), the approach will be to implement as much of it as possible. Specifically, if dTx_cnti holds a positive number, but fewer (1 or more but not quite dTx_cnti) can be accommodated, the node should initiate the protocol to coordinate the addition of as many temporary transmissions as can be added. The objective is to provide as much relief as quickly as possible. When only partial relief is accommodated and the situation requiring persists, a subsequent attempt would take place to try to increase the portion of the bandwidth allocation that was not accommodated. That instance of the protocol should then result in a total failure. A node could then use this information to prevent constantly trying to add bandwidth when none is available. To do this, a node should not attempt the protocol with a neighbor with which a previous attempt resulted in complete failure, until the node has decreased its allocations to any of its neighbors, thus freeing up bandwidth that could now possibly be allocated to the neighbor with which a previous attempt failed.

For healthy (i.e., physically sustainable) links for which bandwidth is underutilized (the difference dTx_cnti reflects a negative value), the bandwidth allocations are not allowed to drop below the initially configured value of d transmissions in a schedule cycle so as to continue to maintain the link (keep the link "alive") according to one embodiment. In another embodiment, only if a link was deemed physically unsustainable and this was consequently reflected as a connectivity change (lost link), would the current number of frames reserved for communication opportunities to the neighbor with which the link was lost, be returned to the pool of idle frames.

Upon partial or total success of the protocol, the two nodes involved update their local schedules to the extent possible, providing quick relief toward satisfying the bandwidth demands of the neighbor. The nodes can begin using any newly added communication opportunities immediately or dispose of newly made idle frames for increasing bandwidth allocations to other neighbors.

Even though the bandwidth allocations are evaluated for all neighbors during each monitoring cycle, one thing to consider is whether the node should respond to all its neighbors' situations simultaneously, or if instead, a single neighbor's situation should be handled during each cycle. Doing the former would cause the node to possibly attempt numerous instances of the bandwidth allocation update protocol with its neighbors. However, assuming the desired updates include only a few or no bandwidth allocation decreases the likelihood of being able to accommodate allocation increases to multiple neighbors, goes down as the number of neighbors requiring adjustment goes up since the number of idle frames in a node's schedule would be quickly consumed. A node in this situation might not even be able to complete the various protocol instances. If instead, the response for each monitoring cycle is applied to a single neighbor, the amount of possible network management traffic could be reduced at the cost of possibly delaying temporary relief required by other neighbors. However, if the relief needed by a node that is not being responded to is of a permanent nature, then it would follow that the demand would remain and eventually be accommodated as the particular neighbor's turn comes up. The approach could be to respond to each neighbor in turn (i.e., in round-robin order) for fairness, or alternatively, to respond to the neighbor that most needs relief (i.e., that for which the observed difference value is the highest, since this would be the neighbor in "worst shape"). Initially, the approach will be the latter, since it is expected that once its situation is addressed, a different neighbor's situation would become the one with most urgency.

An aspect of the invention provides for a bandwidth allocation update protocol. This protocol may be similar to the Initial Bandwidth Allocation protocol. Similar to the IBA handshake, it is defined as a two-way handshake between an initiating node and one of its neighbors. Rather than holding off monitoring while retrying additional attempts of the protocol when it fails (times out), a single attempt will be triggered at the end of a monitoring period (when dTx_cnti is not 0). If the protocol times out, and the situation that required the update in the first place persists, the subsequent monitoring period may result in triggering the protocol once again, with the added advantage that the update request will reflect a more current situation. If the protocol fails but the situation was merely temporary, the next monitoring period should have a different outcome. If the protocol succeeds and fixes a persistent situation, then the following monitoring period may result in the protocol not being triggered (dTx_cnti is 0). The timeout value to use for a single attempt may be estimated from knowledge of the resulting maintenance cycle length o, since at the very least, there will be communication opportunities within a single maintenance cycle to complete a two-way handshake. However, if the initiator node's transmission opportunity to the neighbor was just missed, the handshake may have to be attempted in the next maintenance schedule cycle. For this reason, the timeout for each attempt of the protocol may be set to 2*o.

In general, as a node assesses the demands of all its neighbors, at the end of each monitoring cycle, the node may select the neighbor needing the most substantial update for which, from knowledge of its own local schedule and the type of desired update, success of accommodating it is probable (i.e., the node has idle frames in its local schedule). Specifically, the success of an update in which communication opportunities are to be deleted is always highly probable. The partial or total success of an update in which communication opportunities are to be added however, is only probable if the initiating node has at least one idle frame in its local schedule. If a node has at least one idle frame that may be used to accommodate at least a partial, and hopefully total update, and without having up-to-date knowledge of the neighbor's local schedule and its set of currently idle frames, the node may attempt the protocol.

The exchange is successful if the two nodes can coordinate a complete update to their local schedules. When the exchange is used for the purpose of decreasing bandwidth allocation, it follows that the exchange should succeed as long as the link is healthy (i.e., environmental conditions support the currently assessed capacity of the link and the messages can get through to the nodes). However, the node may not want to initiate the protocol when the observed value of dTx_cnti is negative, if cTx_cnti=d. This ensures that even if underutilized, sufficient bandwidth remains allocated to at least maintain the link via the configured d transmissions within the cycle.

The first message in the handshake may be the Bandwidth Allocation Update Request (BAU Req), with which the initiating node informs the neighbor about the type of update and the desired amount of the update (i.e., addition or deletion of communications and how many). This may come from the value of the observed difference dTx_cnti where, a positive value denotes the addition of transmissions, and a negative value denotes the deletion of transmissions. In the case of adding bandwidth, the initiating node may also provide to the neighbor, information on where this update could be incorporated into the two nodes' local schedules via its list of idle frames.

Each time a node participates in an instance of the bandwidth allocation update protocol, the nodes involved, their role (initiator vs. responder), the type and amount of desired update, the nodes' schedules before and after the update, the selected frames to be changed, and the outcome (failure, partial success, or success) if possible, should be recorded at the node possessing such knowledge (which could be both nodes) for post-testing analysis and debugging purposes.

Figure 54:
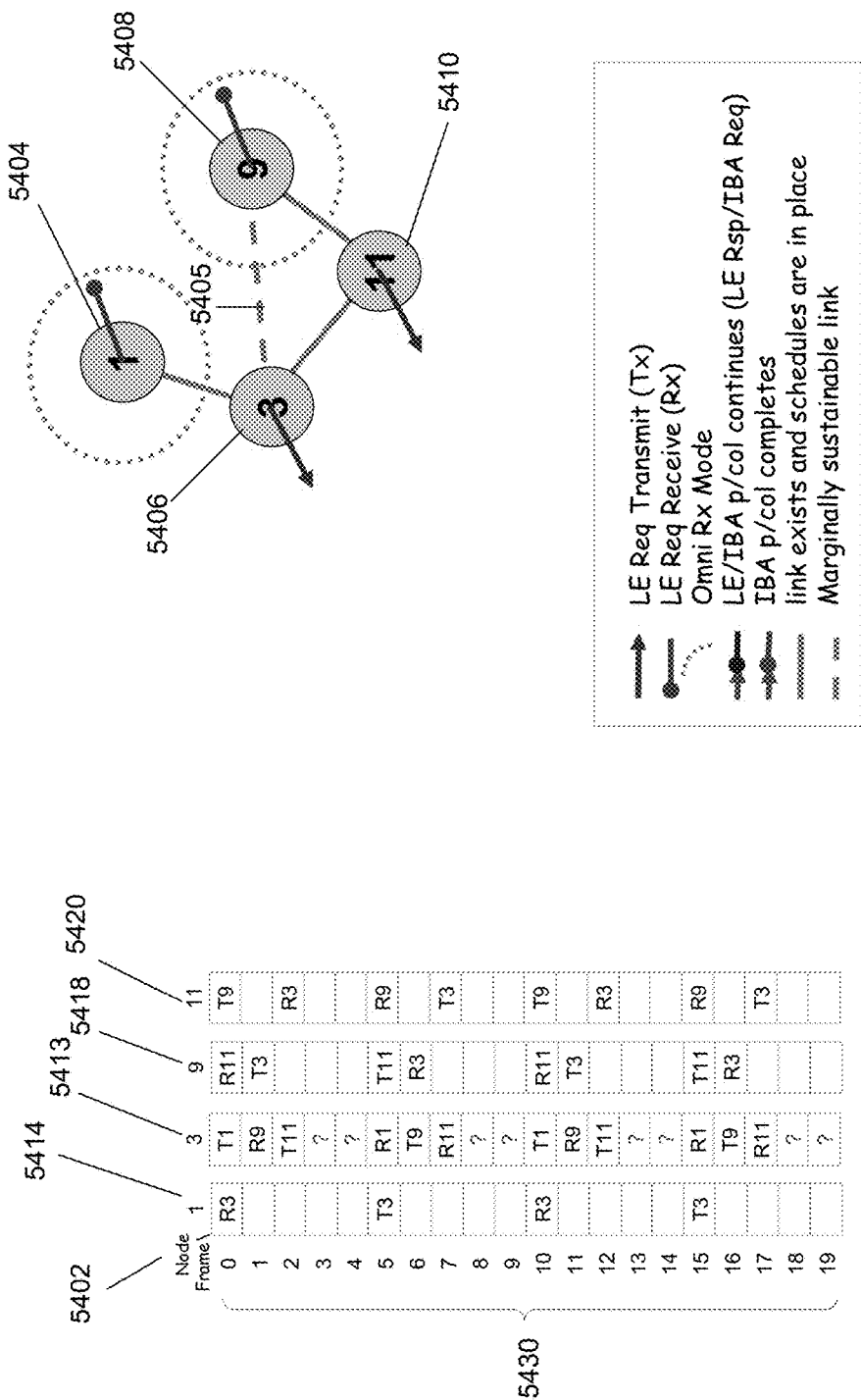
FIGS. 54-58 illustrate adaptive bandwidth allocation among nodes in accordance with an aspect of the invention.

An exemplary embodiment of the adaptive bandwidth allocation is illustrated below in FIGS. 54-60. In FIG. 54, a node 3 (5406) detects that perhaps due to a drop in data rate over its link (5405) to node 9 (5408), more data is being queued to go to node 9 (5408) than before. Node 3 (5406) may initiate a bandwidth allocation update (BAU) protocol in which it coordinates the addition of a number of transmissions to node 9 (5408) (1 in this example). Similar to IBA, node 3 (5406) may offer its idle frames to node 9 (5408) in a BAU Req.

Figure 55:
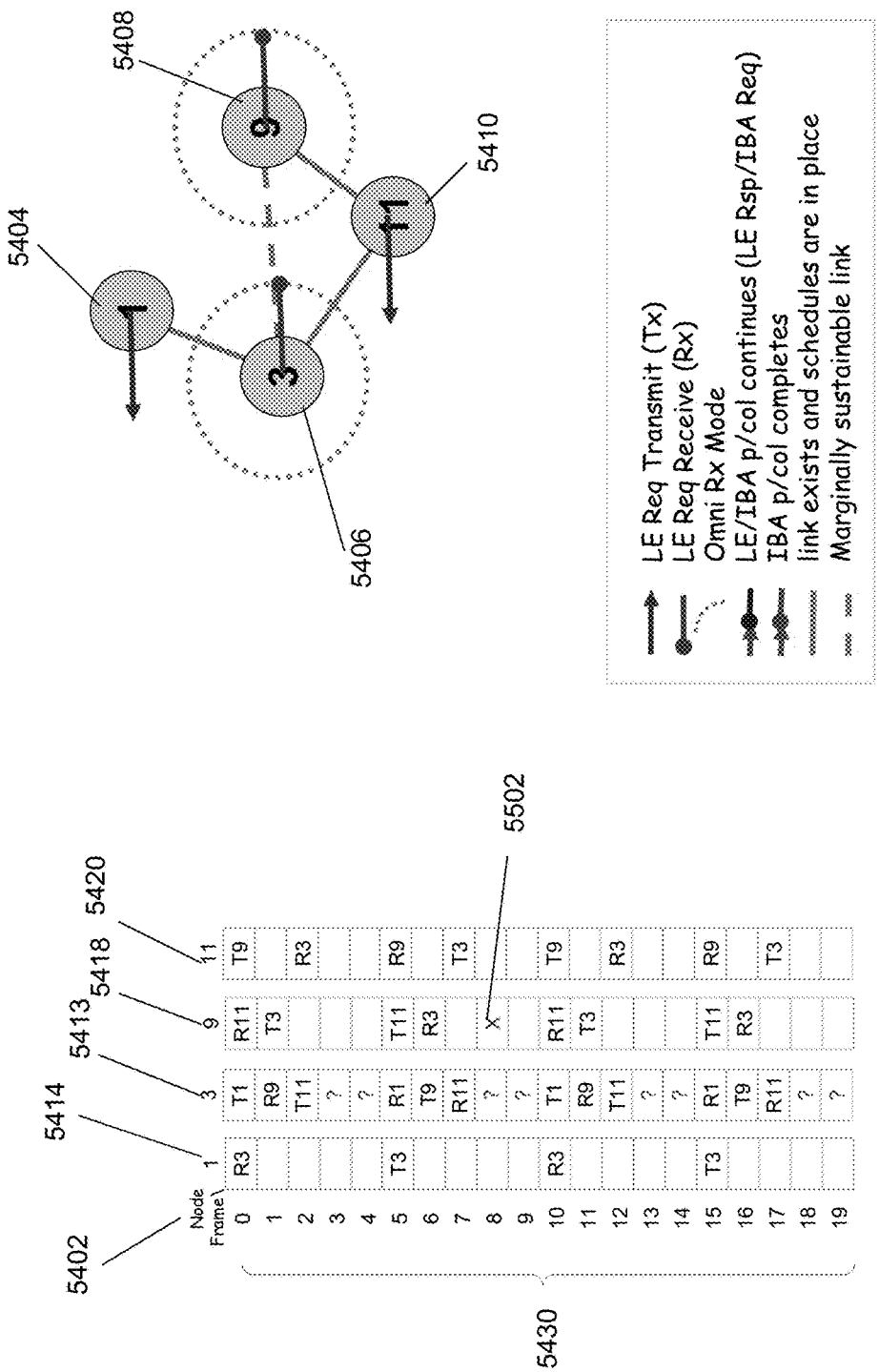

As illustrated in FIG. 55, a BAU handshake may take place on the already reserved communication opportunities within the steady state schedule between the two nodes. Node 9 (5408) may select an idle frame (5502) in common with node 3 and include its selection in the BAU Rsp.

Figure 56:
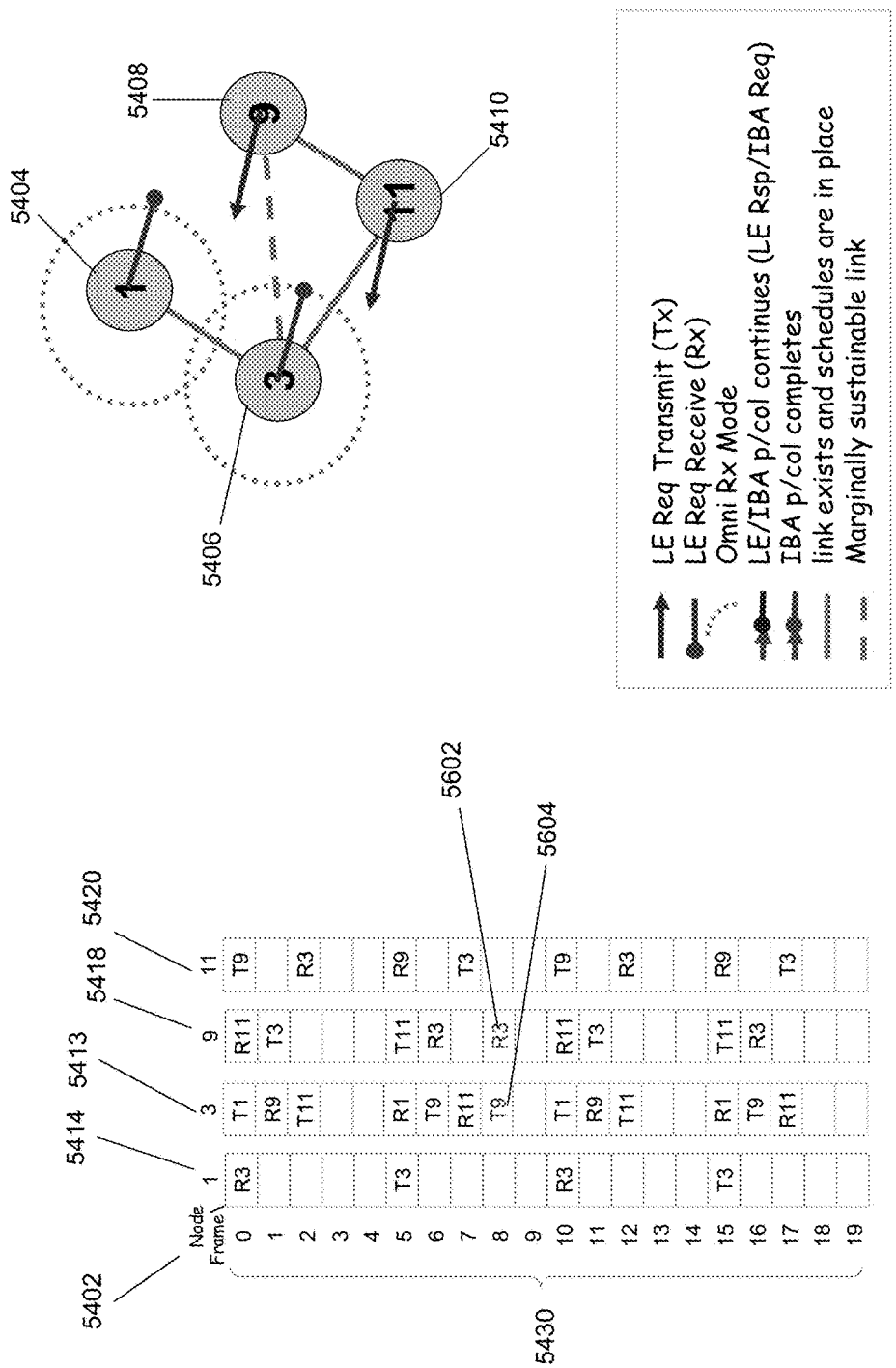

Upon completion of the handshake, both nodes 3 (5406) and 9 (5408) update their steady state schedules 5413 (at 5604) and 5418 (at 5602) as shown in FIG. 56. With added bandwidth, node 3 (5406) should be able to transmit the traffic being queued up for which node 9 (5408) is the next hop toward the destination.

Figure 57:
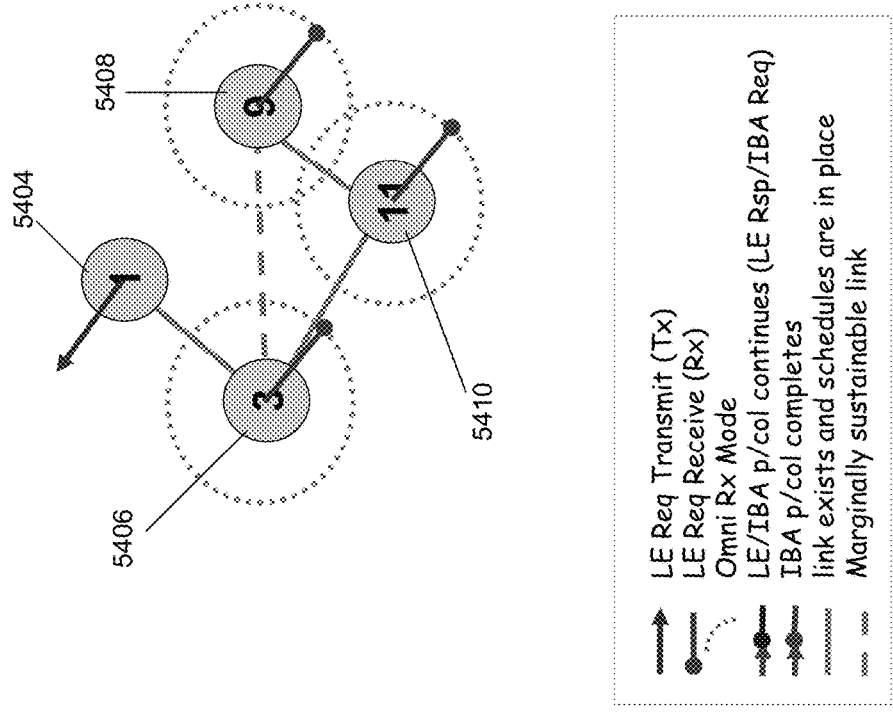
Figure 58:
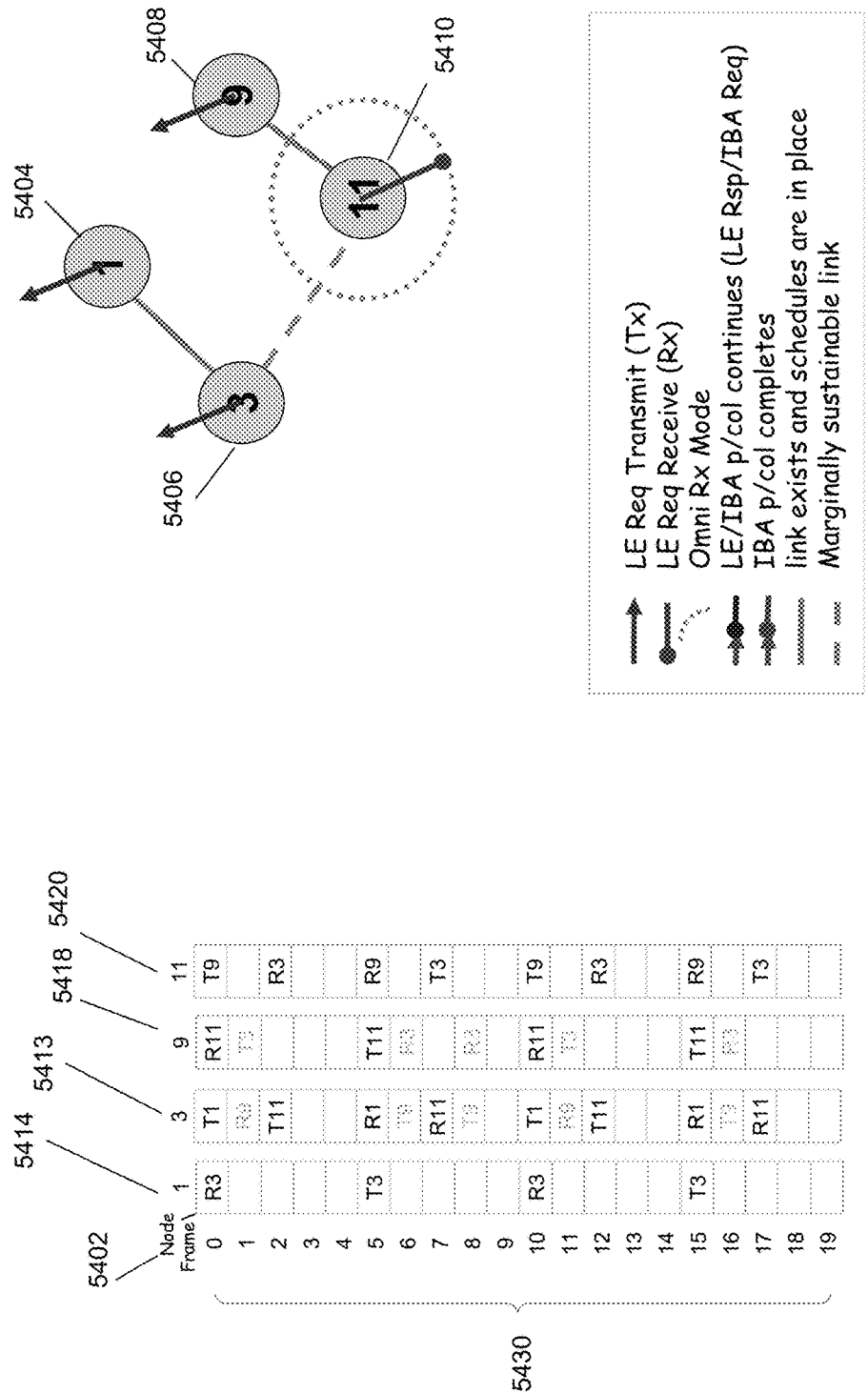

As illustrated in FIG. 57, during time not reserved for steady state communications with neighbors, nodes 1 (5404), 3 (5406), 9 (5408) and 11 (5410) continue to search for peers. Added bandwidth between nodes 3 (5406) and 9 (5408) stays in effect while the condition that provoked it persists. BAU may be used to also decrease bandwidth allocations In FIG. 58, a link between nodes 3 (5406) and 9 (5408) has become unsustainable. Link management function drops the link and the two nodes delete all communication operations between them. Note that the situation may apply to a single direction of a link. In this example however, both directions of the link are shown as being unsustainable due to both nodes moving beyond each others range.

Figure 59:
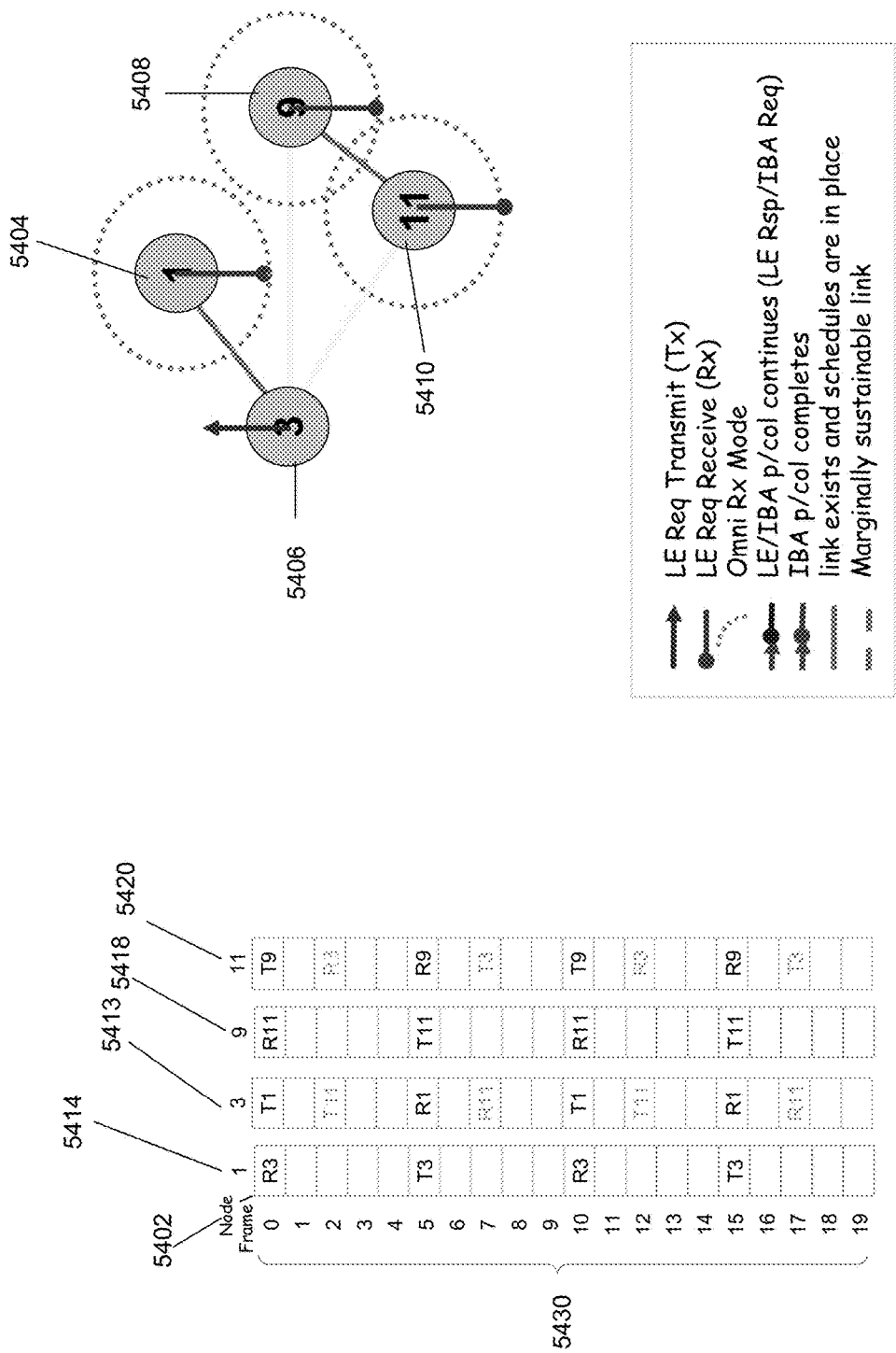

In FIG. 59, a link between nodes 3 (5406) and 11 (5410) also became unsustainable. However, not enough data was being sent over that link at the time and for this reason, bandwidth updates were not triggered between them and the link was subsequently dropped.

Figure 61:
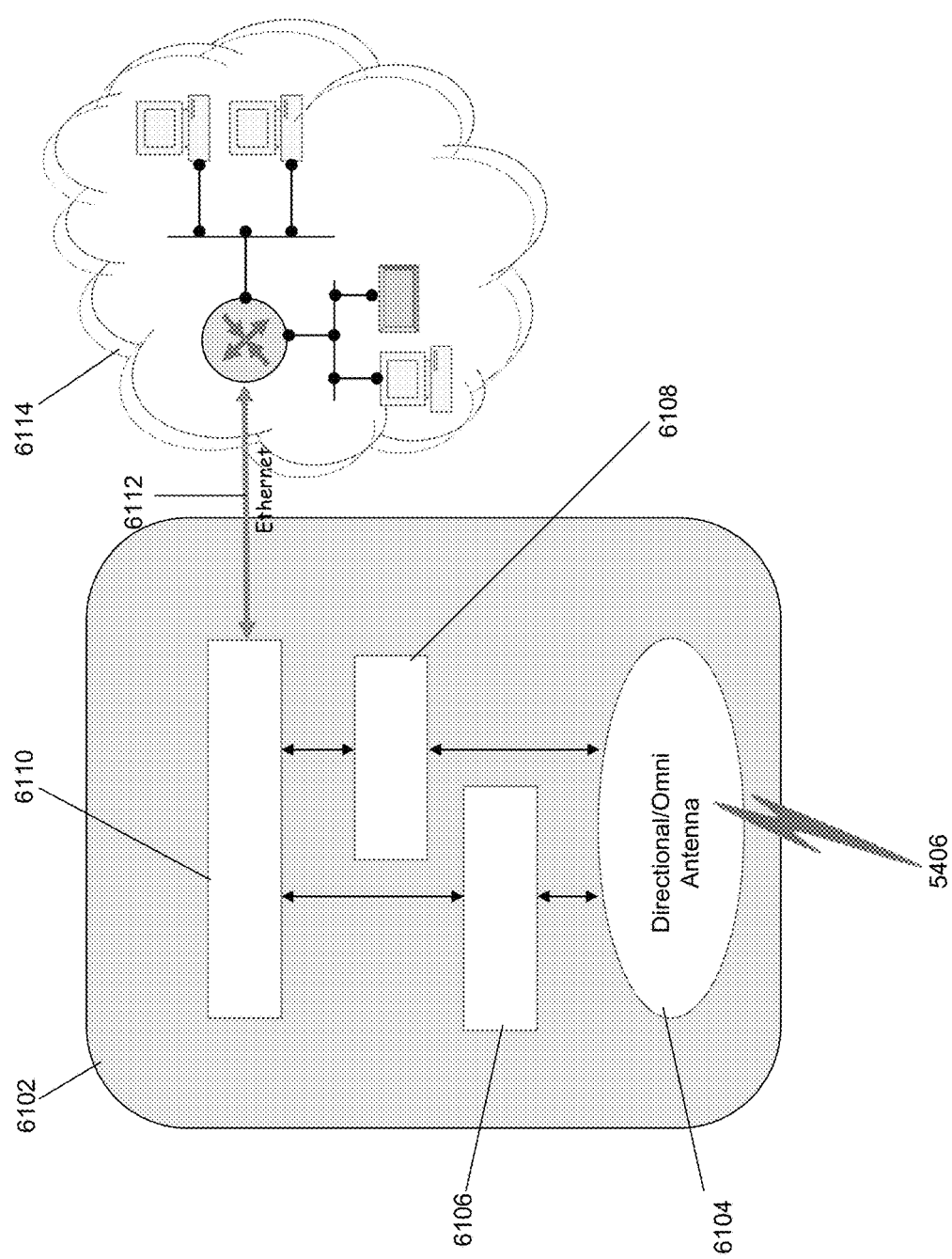
FIGS. 61-62 illustrate an exemplary configuration of a node in accordance with an aspect of the invention.

In FIG. 60, nodes may move beyond communications range or are no longer in line of sight. For example in FIG. 60, with links (3, 9) and (3, 11) now none existent, the original network has split into two networks the first network between nodes 1 and 3 (6002) and the second between nodes 9 and 11 (6004). Schedules of all nodes are adapted without impacting those of any other node in the previous or the two resulting networks In another aspect of the invention, an exemplary node 1 (6102) is illustrated in FIG. 61. Node 1 (6102) may include elements such as a directional/omni antenna 6104, antenna controller 6106, a modem 6108, and a processor 6110. Exemplary node 1 (6102) may further include memory (not shown) in the form of volatile and/or nonvolatile memory such as read only memory (ROM) and random access memory (RAM). It will be appreciated by those skilled in the art that other types of computer readable media that can store data that is accessible may be utilized. Furthermore, node 1 (6102) may be connected via Ethernet (6112) to an external network 6114.

Figure 62:
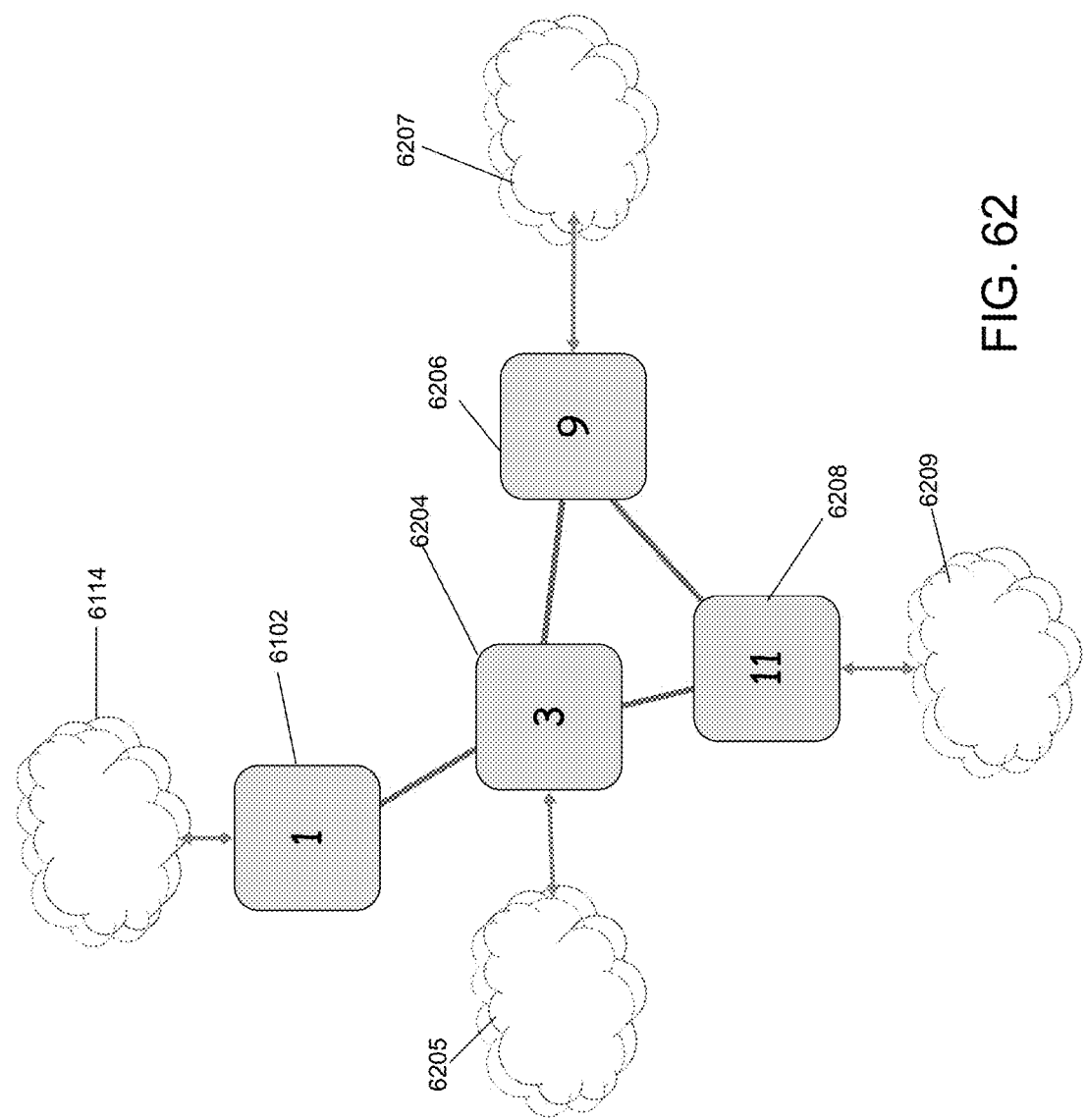

FIG. 62 illustrates that exemplary node 1 (6102) may be connected to other nodes such as node 3 (6204), node 9 (6206), and node 11 (6208). Each of node 3 (6204), 9 (6206), and 11 (6208) may also have Ethernet connections (6205, 6207, 6209) to enable allow each node to be connected to other external networks.

The invention has been described with respect to specific examples including various aspects of the invention. Those skilled in the art will appreciate that there are numerous variations and permutations of the above described systems and techniques. Thus, the spirit and scope of the invention should be construed broadly as set forth in the appended claims.

We claim:

1. A method comprising communicating in a network by:
   selecting to transmit from a wireless communication device based on a randomized choice between transmitting and receiving; and
   transmitting, by the wireless communication device in response to the selection to transmit, a message to one or more other wireless communication devices in the network,
   establishing, based on the message, a communication link in the network between the wireless communication device and a second wireless communication device; and
   forwarding, by the wireless communication device or the second wireless communication device via the communication link, data received from a third wireless communication device in the network.

2. The method of claim 1, wherein the message comprises a peer discovery communication indicating a time for receiving a response to the message.

3. The method of claim 1, further comprising:
   receiving, by the wireless communication device, a response to the message from the second wireless communication device, wherein the establishing of the communication link is further based on the response.

4. The method of claim 1, further comprising:
   allocating bandwidth for the communication link for a reserved time duration in a communication schedule unique to the wireless communication device.

5. The method of claim 1, further comprising:
   reserving a time interval for the communication link in a schedule unique to the wireless communication device; and
   exchanging data via the communication link during the reserved time interval.

6. An apparatus comprising:
   a processor;
   one or more antennas configured to transmit and receive wireless transmissions; and
   one or more memories having computer-executable instructions stored thereon, that when executed by the processor, cause the apparatus to:
   select to transmit from the one or more antennas based on a randomized choice between transmitting and receiving; and
   transmit, from the one or more antennas in response to the selection to transmit, a message to one or more other wireless communication devices in a network;
   receive a response to the message from a second apparatus in the network;
   establish, based on the message and the response, a communication link in the network; and forward, via the communication link, data received from a third apparatus in the network to the second apparatus.

7. A method comprising:
pointing, based on a function dependent on a time of day, a directional antenna of a wireless communication device to a bearing;
transmitting, by the wireless communication device from the directional antenna, a message in a direction of the bearing to one or more other wireless communication devices in a network;
listening, by the wireless communication device via the directional antenna pointed in the direction of the bearing, for a response from the one or more other wireless communication devices;
establishing, based on the message, a communication link in the network between the wireless communication device and a second wireless communication device; and
forwarding, by the wireless communication device or the second wireless communication device via the communication link, data received from a third wireless communication device in the network.

8. The method of claim 7, further comprising:
synchronizing, based on the function, the bearing of the directional antenna with bearings of directional antennas of the one or more other wireless communication devices.

9. The method of claim 7, further comprising:
allocating bandwidth for the communication link for a reserved time duration in a communication schedule unique to the wireless communication device.

10. An apparatus comprising:
a processor;
a directional antenna configured to wirelessly transmit messages; and
one or more memories having computer-executable instructions stored thereon, that when executed by the processor, cause the apparatus to:
point, based on a function dependent on a time of day, the directional antenna to a bearing;
transmit, from the directional antenna, a message in a direction of the bearing to one or more other apparatuses in a network;
listen for a response from the one or more other apparatuses;
establish, based on the message, a communication link in the network between the apparatus and a second apparatus; and
forward, via the communication link, data received from a third apparatus in the network to the second apparatus.

11. The apparatus of claim 10, wherein the computer-executable instructions, when executed by the processor, cause the apparatus to:
synchronize, based on the function, the bearing of the directional antenna with bearings of directional antennas of the one or more other apparatuses.

12. A method comprising:
establishing, by a plurality of wireless communication devices, communication links in a mesh network, each communication link implemented as scheduled wireless transmissions carrying network traffic exchanged between two different wireless communication devices of the plurality of wireless communications devices, wherein each wireless communication device of the plurality of wireless communication devices establishes one or more of the communication links by:
exchanging peer discovery communications with other wireless communication devices in the mesh network during unreserved time durations of a schedule maintained by the wireless communication device; and
updating the schedule to reserve time durations for each new communication link implemented by the wireless communication device as a result of the peer discovery communications, wherein the schedule maintained by each of the plurality of wireless communication devices is different.

13. The method of claim 12, wherein the exchanging of the peer discovery communications, by two or more of the plurality of wireless communication devices, comprises:
transmitting a message from a directional antenna pointed to a bearing, wherein the bearing is synchronized to a common direction for the two or more of the plurality of wireless communication devices.

14. The method of claim 12, wherein the exchanging of the peer discovery communications, by one or more of the plurality of wireless communication devices, comprises:
determining a bearing as a function dependent on a time of day; and
transmitting a message from a directional antenna pointed to the bearing.

15. The method of claim 12, wherein the exchanging of the peer discovery communications, by one or more of the plurality of wireless communication devices, comprises:
transmitting a peer discovery message based on a randomized choice between transmitting and receiving.

* * * * *